(12) United States Patent
Fujitaka et al.

(10) Patent No.: US 10,215,451 B2
(45) Date of Patent: Feb. 26, 2019

(54) COMPRESSOR AND REFRIGERATION CYCLE DEVICE USING SAME

(71) Applicant: Panasonic Intellectual Property Management Co., Ltd., Osaka-shi, Osaka (JP)

(72) Inventors: Akira Fujitaka, Shiga (JP); Fuminori Sakima, Shiga (JP); Yoshikazu Kawabe, Shiga (JP); Atsushi Sakuda, Shiga (JP); Hiroaki Nakai, Shiga (JP); Shigehiro Sato, Shiga (JP); Kenji Takaichi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/309,567

(22) PCT Filed: Apr. 27, 2015

(86) PCT No.: PCT/JP2015/002256
§ 371 (c)(1),
(2) Date: Nov. 8, 2016

(87) PCT Pub. No.: WO2015/174032
PCT Pub. Date: Nov. 19, 2015

(65) Prior Publication Data
US 2017/0138641 A1    May 18, 2017

(30) Foreign Application Priority Data

May 12, 2014 (JP) ................................ 2014-098337
May 12, 2014 (JP) ................................ 2014-098339
(Continued)

(51) Int. Cl.
*F25B 1/04*     (2006.01)
*C09K 5/04*     (2006.01)
(Continued)

(52) U.S. Cl.
CPC ............... *F25B 1/04* (2013.01); *C09K 5/045* (2013.01); *C10M 171/008* (2013.01);
(Continued)

(58) Field of Classification Search
CPC ...... F25B 1/04; F25B 31/002; F25B 2600/01; F25B 2600/0262; F04C 18/0292;
(Continued)

(56) References Cited

U.S. PATENT DOCUMENTS 3,720,612 A * 3/1973 Bosniack .................. C10M 3/00
508/253
5,369,287 A * 11/1994 Sunaga ................ C10M 169/04
252/68
(Continued)

FOREIGN PATENT DOCUMENTS

CN     2438967 Y    7/2001
CN     1598319 A    3/2005
(Continued)

OTHER PUBLICATIONS

The Extended European Search Report dated Jun. 29, 2017 for the related European Patent Application No. 5793246.8.
(Continued)

*Primary Examiner* — Emmanuel Duke
(74) *Attorney, Agent, or Firm* — Hamre, Schumann, Mueller & Larson, P.C.

(57) ABSTRACT

A compressor uses a refrigerant containing R1123 (1,1,2-trifluoroethylene) as a working fluid, and uses a polyol ester oil as a compressor lubricating oil. In addition, a fixed scroll and a revolving scroll each having a spiral lap rising from an end plate, and a compression chamber which is formed by meshing the fixed scroll and the revolving scroll, are provided. In addition, a discharge hole which is provided at a center position of the end plate of the fixed scroll, and is
(Continued)

open to a discharge chamber, a bypass hole which is provided in the end plate of the fixed scroll, and communicates with the compression chamber and the discharge chamber at a timing different from a timing at which the compression chamber communicates with the discharge hole, and a check valve which is provided in the bypass hole, and allows a flow from the compression chamber side to the discharge chamber side.

20 Claims, 36 Drawing Sheets

(30) Foreign Application Priority Data

Mar. 3, 2015 (JP) .................. 2015-040848
Mar. 3, 2015 (JP) .................. 2015-040850

(51) Int. Cl.
| | | |
|---|---|---|
| C10M 171/00 | (2006.01) | |
| F04C 18/02 | (2006.01) | |
| F04C 29/00 | (2006.01) | |
| F04C 29/02 | (2006.01) | |
| F04C 29/12 | (2006.01) | |
| F25B 31/00 | (2006.01) | |
| F04C 23/00 | (2006.01) | |
| F04C 27/00 | (2006.01) | |
| F04C 28/26 | (2006.01) | |

(52) U.S. Cl.
CPC ...... *F04C 18/0215* (2013.01); *F04C 18/0253* (2013.01); *F04C 18/0269* (2013.01); *F04C 18/0292* (2013.01); *F04C 23/008* (2013.01); *F04C 27/005* (2013.01); *F04C 29/0085* (2013.01); *F04C 29/02* (2013.01); *F04C 29/12* (2013.01); *F25B 31/002* (2013.01); *C09K 2205/122* (2013.01); *C09K 2205/126* (2013.01); *C09K 2205/22* (2013.01); *C09K 2205/32* (2013.01); *C10M 2203/04* (2013.01); *C10M 2207/026* (2013.01); *C10M 2207/2835* (2013.01); *C10M 2223/04* (2013.01); *C10N 2220/302* (2013.01); *C10N 2240/30* (2013.01); *F04C 28/26* (2013.01); *F04C 2210/26* (2013.01); *F04C 2240/30* (2013.01); *F04C 2240/40* (2013.01); *F04C 2240/803* (2013.01); *F25B 2600/01* (2013.01); *F25B 2600/0262* (2013.01)

(58) Field of Classification Search
CPC ...... F04C 29/02; F04C 18/0215; F04C 29/12; F04C 29/0085; C09K 5/045; C09K 2205/22; C09K 2205/126; C09K 2205/122; C10M 171/008; C10M 2207/2835
See application file for complete search history.

(56) References Cited

U.S. PATENT DOCUMENTS

| | | | |
|---|---|---|---|
| 2005/0053508 A1 | 3/2005 | Morozumi et al. | |
| 2006/0217577 A1* | 9/2006 | Mukhopadhyay | C07C 17/23 570/156 |
| 2010/0234256 A1* | 9/2010 | Sato | C09K 5/045 508/463 |
| 2010/0257881 A1 | 10/2010 | Perti | |
| 2010/0288965 A1* | 11/2010 | Howell | C09K 5/045 252/68 |
| 2011/0000253 A1* | 1/2011 | Sato | C09K 5/041 62/468 |
| 2011/0011123 A1 | 1/2011 | Matsuura et al. | |
| 2011/0100042 A1 | 5/2011 | Yamashita et al. | |
| 2012/0087811 A1* | 4/2012 | Yamada | F04B 35/04 417/410.1 |
| 2012/0132848 A1 | 5/2012 | Sawada et al. | |
| 2012/0322706 A1* | 12/2012 | Matsumoto | C10M 141/10 508/440 |
| 2013/0108496 A1* | 5/2013 | Nakai | F04C 18/0215 418/55.1 |
| 2014/0070132 A1* | 3/2014 | Fukushima | F25B 9/002 252/67 |
| 2014/0077123 A1 | 3/2014 | Fukushima | |
| 2014/0097379 A1* | 4/2014 | Carr | C09K 5/045 252/68 |
| 2014/0134018 A1* | 5/2014 | Tolbert, Jr. | F04B 25/005 417/410.1 |
| 2017/0146265 A1 | 5/2017 | Fujitaka et al. | |

FOREIGN PATENT DOCUMENTS

| | | |
|---|---|---|
| CN | 101835869 A | 9/2010 |
| CN | 102444584 A | 5/2012 |
| CN | 102712871 A | 10/2012 |
| CN | 102985697 A | 3/2013 |
| CN | 103562338 A | 2/2014 |
| EP | 2711405 A1 | 3/2014 |
| JP | 9-503498 | 4/1997 |
| JP | 9-138012 A | 5/1997 |
| JP | 11-022664 A | 1/1999 |
| JP | 2006-352962 | 12/2006 |
| JP | 2007-170253 | 7/2007 |
| JP | 2011-043276 | 3/2011 |
| JP | 2011-162766 | 8/2011 |
| JP | 2013-060815 | 4/2013 |
| WO | 2009/157320 A1 | 12/2009 |
| WO | 2012/157764 | 11/2012 |
| WO | 2012/157765 | 11/2012 |

OTHER PUBLICATIONS

English Translation of Chinese Search Report dated Mar. 19, 2018 for the related Chinese Patent Application No. 201580026285.9, 2 pages.
U.S. Appl. No. 15/309,576, filed Nov. 8, 2016, dated May 25, 2017, US 2017/0146265.
Singapore Search Report dated Feb. 22, 2018 for the related Singapore Patent Application No. 11201609315W, 2 pages.
English Translation of Chinese Search Report dated Mar. 21, 2018 for the related Chinese Patent Application No. 2015800247891.
The Extended European Search Report dated Jun. 27, 2017 for the related European Patent Application No. 15793082.7, 9 pages.
Chinese Search Report dated Jun. 27, 2018 for the related Chinese Patent Application No. 201580024789.7, 3 pages.

\* cited by examiner

FIG. 2

| REFRIGERANT | | R410A | R32/R1123 60/40 | R32/R1123 50/50 | R32/R1123 40/60 | R32/R1123 30/70 | R1123 |
|---|---|---|---|---|---|---|---|
| GWP | - | 2090 | 410 | 350 | 280 | 210 | 5 |
| CONDENSATION PRESSURE | MPa | 2.73 | 3.17 | 3.23 | 3.28 | 3.33 | 3.44 |
| EVAPORATION PRESSURE | MPa | 1.25 | 1.48 | 1.51 | 1.55 | 1.59 | 1.70 |
| DISCHARGE TEMPERATURE | °C | 62 | 69 | 68 | 67 | 66 | 65 |
| REFRIGERATION PERFORMANCE | % | 100% | 118% | 119% | 120% | 121% | 125% |
| COP | % | 100% | 97% | 96% | 95% | 94% | 91% |

FIG. 3

| REFRIGERANT | | R410A | R32/R1123 60/40 | R32/R1123 50/50 | R32/R1123 40/60 | R32/R1123 30/70 | R1123 |
|---|---|---|---|---|---|---|---|
| GWP | - | 2090 | 410 | 350 | 280 | 210 | 5 |
| CONDENSATION PRESSURE | MPa | 2.30 | 2.69 | 2.75 | 2.79 | 2.84 | 2.95 |
| EVAPORATION PRESSURE | MPa | 0.87 | 0.96 | 0.99 | 1.01 | 1.03 | 1.14 |
| DISCHARGE TEMPERATURE | °C | 56 | 65 | 64 | 63 | 62 | 60 |
| REFRIGERATION PERFORMANCE | % | 100% | 118% | 119% | 120% | 121% | 125% |
| COP | % | 100% | 97% | 96% | 95% | 94% | 91% |

FIG. 4

| REFRIGERANT | | R410A | R125/1123 60/40 | R125/1123 50/50 | R125/1123 40/60 | R125/1123 30/70 | R1123 |
|---|---|---|---|---|---|---|---|
| GWP | | 2090 | 2100 | 1760 | 1410 | 1060 | 5 |
| CONDENSATION PRESSURE | MPa | 2.73 | 2.73 | 2.85 | 2.97 | 3.09 | 3.44 |
| EVAPORATION PRESSURE | MPa | 1.25 | 1.29 | 1.36 | 1.43 | 1.50 | 1.70 |
| DISCHARGE TEMPERATURE | °C | 62 | 60 | 61 | 62 | 63 | 65 |
| REFRIGERATION PERFORMANCE | % | 100% | 96% | 101% | 105% | 110% | 125% |
| COP | % | 100% | 95% | 94% | 93% | 93% | 91% |

FIG. 5

| REFRIGERANT | | R410A | R125/1123 60/40 | R125/1123 50/50 | R125/1123 40/60 | R125/1123 30/70 | R1123 |
|---|---|---|---|---|---|---|---|
| GWP | | 2090 | 2100 | 1760 | 1410 | 1060 | 5 |
| CONDENSATION PRESSURE | MPa | 2.30 | 2.33 | 2.43 | 2.53 | 2.64 | 2.95 |
| EVAPORATION PRESSURE | MPa | 0.85 | 0.86 | 0.91 | 0.95 | 1.00 | 1.14 |
| DISCHARGE TEMPERATURE | °C | 56 | 58 | 58 | 58 | 59 | 60 |
| REFRIGERATION PERFORMANCE | % | 100% | 96% | 101% | 106% | 111% | 125% |
| COP | % | 100% | 96% | 95% | 94% | 93% | 91% |

FIG. 6

| REFRIGERANT | | R410A | R32/R125/R1123 30/30/40 | R32/R125/R1123 25/25/50 | R32/R125/R1123 20/20/60 | R32/R125/R1123 15/15/70 | R1123 |
|---|---|---|---|---|---|---|---|
| GWP | | 2090 | 1260 | 1050 | 840 | 630 | 5 |
| CONDENSATION PRESSURE | MPa | 2.73 | 2.69 | 2.68 | 2.67 | 2.66 | 2.62 |
| EVAPORATION PRESSURE | MPa | 1.25 | 1.24 | 1.23 | 1.23 | 1.22 | 1.21 |
| DISCHARGE TEMPERATURE | °C | 62 | 63 | 64 | 64 | 65 | 65 |
| REFRIGERATION PERFORMANCE | % | 100% | 107% | 110% | 113% | 116% | 125% |
| COP | % | 100% | 96% | 95% | 94% | 93% | 91% |

FIG. 7

| REFRIGERANT | | R410A | R32/R125/R1123 30/30/40 | R32/R125/R1123 25/25/50 | R32/R125/R1123 20/20/60 | R32/R125/R1123 15/15/70 | R1123 |
|---|---|---|---|---|---|---|---|
| GWP | | 2090 | 1260 | 1050 | 840 | 630 | 5 |
| CONDENSATION PRESSURE | MPa | 2.30 | 2.27 | 2.27 | 2.26 | 2.25 | 2.21 |
| EVAPORATION PRESSURE | MPa | 0.85 | 0.84 | 0.84 | 0.83 | 0.83 | 0.82 |
| DISCHARGE TEMPERATURE | °C | 56 | 58 | 58 | 59 | 59 | 60 |
| REFRIGERATION PERFORMANCE | % | 100% | 107% | 110% | 113% | 116% | 125% |
| COP | % | 100% | 96% | 96% | 95% | 94% | 91% |

| REFRIGERANT | | R410A | R32/R1123 60/40 | R32/R1123 50/50 | R32/R1123 40/60 | R32/R1123 30/70 | R1123 |
|---|---|---|---|---|---|---|---|
| GWP | - | 2090 | 410 | 350 | 280 | 210 | 5 |
| CONDENSATION PRESSURE | MPa | 2.73 | 3.17 | 3.23 | 3.28 | 3.33 | 3.44 |
| EVAPORATION PRESSURE | MPa | 1.25 | 1.48 | 1.51 | 1.55 | 1.59 | 1.70 |
| DISCHARGE TEMPERATURE | °C | 62 | 69 | 68 | 67 | 66 | 65 |
| REFRIGERATION PERFORMANCE | % | 100% | 118% | 119% | 120% | 121% | 125% |
| COP | % | 100% | 97% | 96% | 95% | 94% | 91% |

FIG. 25

| REFRIGERANT | | R410A | R32/R1123 60/40 | R32/R1123 50/50 | R32/R1123 40/60 | R32/R1123 30/70 | R1123 |
|---|---|---|---|---|---|---|---|
| GWP | - | 2090 | 410 | 350 | 280 | 210 | 5 |
| CONDENSATION PRESSURE | MPa | 2.30 | 2.69 | 2.75 | 2.79 | 2.84 | 2.95 |
| EVAPORATION PRESSURE | MPa | 0.87 | 0.96 | 0.99 | 1.01 | 1.03 | 1.14 |
| DISCHARGE TEMPERATURE | °C | 56 | 65 | 64 | 63 | 62 | 60 |
| REFRIGERATION PERFORMANCE | % | 100% | 118% | 119% | 120% | 121% | 125% |
| COP | % | 100% | 97% | 96% | 95% | 94% | 91% |

FIG. 26

| REFRIGERANT | | R410A | R125/1123 60/40 | R125/1123 50/50 | R125/1123 40/60 | R125/1123 30/70 | R1123 |
|---|---|---|---|---|---|---|---|
| GWP | | 2090 | 2100 | 1760 | 1410 | 1060 | 5 |
| CONDENSATION PRESSURE | MPa | 2.73 | 2.73 | 2.85 | 2.97 | 3.09 | 3.44 |
| EVAPORATION PRESSURE | MPa | 1.25 | 1.29 | 1.36 | 1.43 | 1.50 | 1.70 |
| DISCHARGE TEMPERATURE | °C | 62 | 60 | 61 | 62 | 63 | 65 |
| REFRIGERATION PERFORMANCE | % | 100% | 96% | 101% | 105% | 110% | 125% |
| COP | % | 100% | 95% | 94% | 93% | 93% | 91% |

FIG. 27

| REFRIGERANT | | R410A | R125/1123 60/40 | R125/1123 50/50 | R125/1123 40/60 | R125/1123 30/70 | R1123 |
|---|---|---|---|---|---|---|---|
| GWP | | 2090 | 2100 | 1760 | 1410 | 1060 | 5 |
| CONDENSATION PRESSURE | MPa | 2.30 | 2.33 | 2.43 | 2.53 | 2.64 | 2.95 |
| EVAPORATION PRESSURE | MPa | 0.85 | 0.86 | 0.91 | 0.95 | 1.00 | 1.14 |
| DISCHARGE TEMPERATURE | °C | 56 | 58 | 58 | 58 | 59 | 60 |
| REFRIGERATION PERFORMANCE | % | 100% | 96% | 101% | 106% | 111% | 125% |
| COP | % | 100% | 96% | 95% | 94% | 93% | 91% |

FIG. 28

| REFRIGERANT | | R410A | R32/R125/ R1123 30/30/40 | R32/R125/ R1123 25/25/50 | R32/R125/ R1123 20/20/60 | R32/R125/ R1123 15/15/70 | R1123 |
|---|---|---|---|---|---|---|---|
| GWP | | 2090 | 1260 | 1050 | 840 | 630 | 5 |
| CONDENSATION PRESSURE | MPa | 2.73 | 2.69 | 2.68 | 2.67 | 2.66 | 2.62 |
| EVAPORATION PRESSURE | MPa | 1.25 | 1.24 | 1.23 | 1.23 | 1.22 | 1.21 |
| DISCHARGE TEMPERATURE | °C | 62 | 63 | 64 | 64 | 65 | 65 |
| REFRIGERATION PERFORMANCE | % | 100% | 107% | 110% | 113% | 116% | 125% |
| COP | % | 100% | 96% | 95% | 94% | 93% | 91% |

FIG. 29

| REFRIGERANT | | R410A | R32/R125/ R1123 30/30/40 | R32/R125/ R1123 25/25/50 | R32/R125/ R1123 20/20/60 | R32/R125/ R1123 15/15/70 | R1123 |
|---|---|---|---|---|---|---|---|
| GWP | | 2090 | 1260 | 1050 | 840 | 630 | 5 |
| CONDENSATION PRESSURE | MPa | 2.30 | 2.27 | 2.27 | 2.26 | 2.25 | 2.21 |
| EVAPORATION PRESSURE | MPa | 0.85 | 0.84 | 0.84 | 0.83 | 0.83 | 0.82 |
| DISCHARGE TEMPERATURE | °C | 56 | 58 | 58 | 59 | 59 | 60 |
| REFRIGERATION PERFORMANCE | % | 100% | 107% | 110% | 113% | 116% | 125% |
| COP | % | 100% | 96% | 96% | 95% | 94% | 91% |

COMPRESSOR AND REFRIGERATION CYCLE DEVICE USING SAME

TECHNICAL FIELD

The present invention relates to a compressor which uses a working fluid containing R1123, and a refrigeration cycle device using the same.

BACKGROUND ART

In general, in a refrigeration cycle device, a refrigeration cycle circuit is configured by connecting a compressor, a reversing valve (as necessary), a heat radiator (or a condenser), a decompressor, such as a capillary tube or an expansion valve, and an evaporator to each other with piping. In addition, by circulating a refrigerant in the inside thereof, a cooling action or a heating action is performed.

As the refrigerant in the refrigeration cycle device, halogenated hydrocarbons which are called fluorocarbons (fluorocarbons are defined by the standard ANSI/ASHRAE 34 and are described as ROO or ROOO, and hereinafter, simply referred to as ROO or ROOO), and which are derived from methane or ethane, are known.

As a refrigerant for the above-described refrigeration cycle device, R410A is widely used. However, the global warming potential (GWP) of the refrigerant R410A is 1730 which is high, and there is a problem from a viewpoint of preventing global warming.

Here, from the viewpoint of preventing global warming, as a refrigerant having a low GWP, for example, R1123 (1,1,2-trifluoroethylene) and R1132 (1,2-difluoroethylene) have been suggested (for example, refer to PTL 1 or PTL 2).

However, the stability of R1123 (1,1,2-trifluoroethylene) and R1132 (1,2-difluoroethylene) is low compared to that of refrigerants of the related art, such as R410A, and in a case where radicals are generated, there is a concern that the refrigerant may change into another compound due to a disproportionation reaction. Since a disproportionation reaction is accompanied by large thermal emission, there is a concern that the reliability of the compressor and the refrigeration cycle device may deteriorate. Therefore, in a case where R1123 or R1132 is used in the compressor and the refrigeration cycle device, it is necessary to suppress a disproportionation reaction.

CITATION LIST

Patent Literature

PTL 1: International Publication No. 2012-157764
PTL 2: International Publication No. 2012-157765

SUMMARY OF THE INVENTION

Considering the above-described problem of the related art, for example, in a compressor which is used for an air conditioner or the like, the present invention specifies an aspect of a more appropriate compressor in using a working fluid containing R1123. In addition, the present invention provides a more appropriate refrigeration cycle device in using a working fluid containing R1123.

According to the present invention, there is provided a compressor which uses a refrigerant containing 1,1,2-trifluoroethylene as a working fluid, and uses a polyol ester oil as a compressor lubricating oil. In addition, a fixed scroll and a revolving scroll each has a spiral lap rising from an end plate; and a compression chamber which is formed by meshing the fixed scroll and the revolving scroll, are provided. Furthermore, a discharge hole which is provided at a center position of the end plate of the fixed scroll, and is open to a discharge chamber; and a bypass hole which is provided in the end plate of the fixed scroll, and communicates with the compression chamber and the discharge chamber at a timing different from a timing at which the compression chamber communicates with the discharge hole, are provided. In addition, a check valve which is provided in the bypass hole, and allows a flow from the compression chamber side to the discharge chamber side, is provided.

In addition, according to the present invention, there is provided a compressor which uses a refrigerant containing 1,1,2-trifluoroethylene as a working fluid, and uses a polyol ester oil as a compressor lubricating oil. In addition, a fixed scroll and a revolving scroll each having a spiral lap rising from an end plate; a compression chamber which is formed by engaging the fixed scroll and the revolving scroll; a first compression chamber which is formed on an outer wall side of the lap of the revolving scroll; and a second compression chamber which is formed on an inner wall side of the lap of the revolving scroll, are provided. In addition, a suction volume of the first compression chamber is greater than a suction volume of the second compression chamber.

According to the present invention, there is provided a refrigeration cycle device including: the above-described compressor; a condenser which cools a refrigerant gas that is compressed by the compressor and has a high pressure; a throttle mechanism which reduces the pressure of the high-pressure refrigerant which is liquefied by the condenser; an evaporator which gasifies the refrigerant of which the pressure is reduced by the throttle mechanism; and piping which links the compressor, the condenser, the throttle mechanism, and the evaporator to each other.

As described above, according to the present invention, it is possible to obtain a compressor which is more appropriate in using a working fluid containing R1123, and a refrigeration cycle device.

BRIEF DESCRIPTION OF DRAWINGS

FIG. 2 is a view comparing R410A and R1123 with each other by computing a refrigeration performance in a case where a pressure and a temperature in the refrigeration cycle, and a displacement volume of the compressor are the same, and cycle efficiency (COP), at proportions of 30% by weight to 60% by weight of R32, in a mixed working fluid of R1123 and R32 in the first embodiment of the present invention.

FIG. 3 is a view comparing R410A and R1123 with each other by computing a refrigeration performance in a case where a pressure and a temperature in the refrigeration cycle, and a displacement volume of the compressor are the same, and cycle efficiency (COP), at proportions of 30% by weight to 60% by weight of R32, in a mixed working fluid of R1123 and R32 in the first embodiment of the present invention.

FIG. 4 is a view comparing R410A and R1123 with each other by computing a refrigeration performance in a case where a pressure and a temperature in the refrigeration cycle, and a displacement volume of the compressor are the same, and cycle efficiency (COP), at proportions of 30% by weight to 60% by weight of R125, in a mixed working fluid of R1123 and R125 in the first embodiment of the present invention.

FIG. 5 is a view comparing R410A and R1123 with each other by computing a refrigeration performance in a case where a pressure and a temperature in the refrigeration cycle, and a displacement volume of the compressor are the same, and cycle efficiency (COP), at proportions of 30% by weight to 60% by weight of R125, in a mixed working fluid of R1123 and R125 in the first embodiment of the present invention.

FIG. 6 is a view comparing R410A and R1123 with each other by computing a refrigeration performance in a case where a pressure and a temperature in the refrigeration cycle, and a displacement volume of the compressor are the same, and cycle efficiency (COP), in a case where proportions of each of R32 and R125 is fixed to 50% by weight, and R32 and R125 are mixed with R1123 in the first embodiment of the present invention.

FIG. 7 is a view comparing R410A and R1123 with each other by computing a refrigeration performance in a case where a pressure and a temperature in the refrigeration cycle, and a displacement volume of the compressor are the same, and cycle efficiency (COP), in a case where proportions of each of R32 and R125 is fixed to 50% by weight, and R32 and R125 are mixed with R1123 in the first embodiment of the present invention.

FIG. 24 is a view comparing R410A and R1123 with each other by computing a refrigeration performance in a case where a pressure and a temperature in the refrigeration cycle, and a displacement volume of the compressor are the same, and cycle efficiency (COP), at proportions of 30% by weight to 60% by weight of R32, in a mixed working fluid of R1123 and R32 in the sixth embodiment of the present invention.

FIG. 25 is a view comparing R410A and R1123 with each other by computing a refrigeration performance in a case where a pressure and a temperature in the refrigeration cycle, and a displacement volume of the compressor are the same, and cycle efficiency (COP), at proportions of 30% by weight to 60% by weight of R32, in a mixed working fluid of R1123 and R32 in the sixth embodiment of the present invention.

FIG. 26 is a view comparing R410A and R1123 with each other by computing a refrigeration performance in a case where a pressure and a temperature in the refrigeration cycle, and a displacement volume of the compressor are the same, and cycle efficiency (COP), at proportions of 30% by weight to 60% by weight of R125, in a mixed working fluid of R1123 and R125 in the sixth embodiment of the present invention.

FIG. 27 is a view comparing R410A and R1123 with each other by computing a refrigeration performance in a case where a pressure and a temperature in the refrigeration cycle, and a displacement volume of the compressor are the same, and cycle efficiency (COP), at proportions of 30% by weight to 60% by weight of R125, in a mixed working fluid of R1123 and R125 in the sixth embodiment of the present invention.

FIG. 28 is a view comparing R410A and R1123 with each other by computing a refrigeration performance in a case where a pressure and a temperature in the refrigeration cycle, and a displacement volume of the compressor are the same, and cycle efficiency (COP), in a case where proportions of each of R32 and R125 is fixed to 50% by weight, and R32 and R125 are mixed with R1123 in the sixth embodiment of the present invention.

FIG. 29 is a view comparing R410A and R1123 with each other by computing a refrigeration performance in a case where a pressure and a temperature in the refrigeration cycle, and a displacement volume of the compressor are the same, and cycle efficiency (COP), in a case where proportions of each of R32 and R125 is fixed to 50% by weight, and R32 and R125 are mixed with R1123 in the sixth embodiment of the present invention.

DESCRIPTION OF EMBODIMENTS

Hereinafter, embodiments of the present invention will be described with reference to the drawings. In addition, the present invention is not limited to the embodiments.
(First Embodiment)

First, a first embodiment of the present invention will be described.

Figure 1:
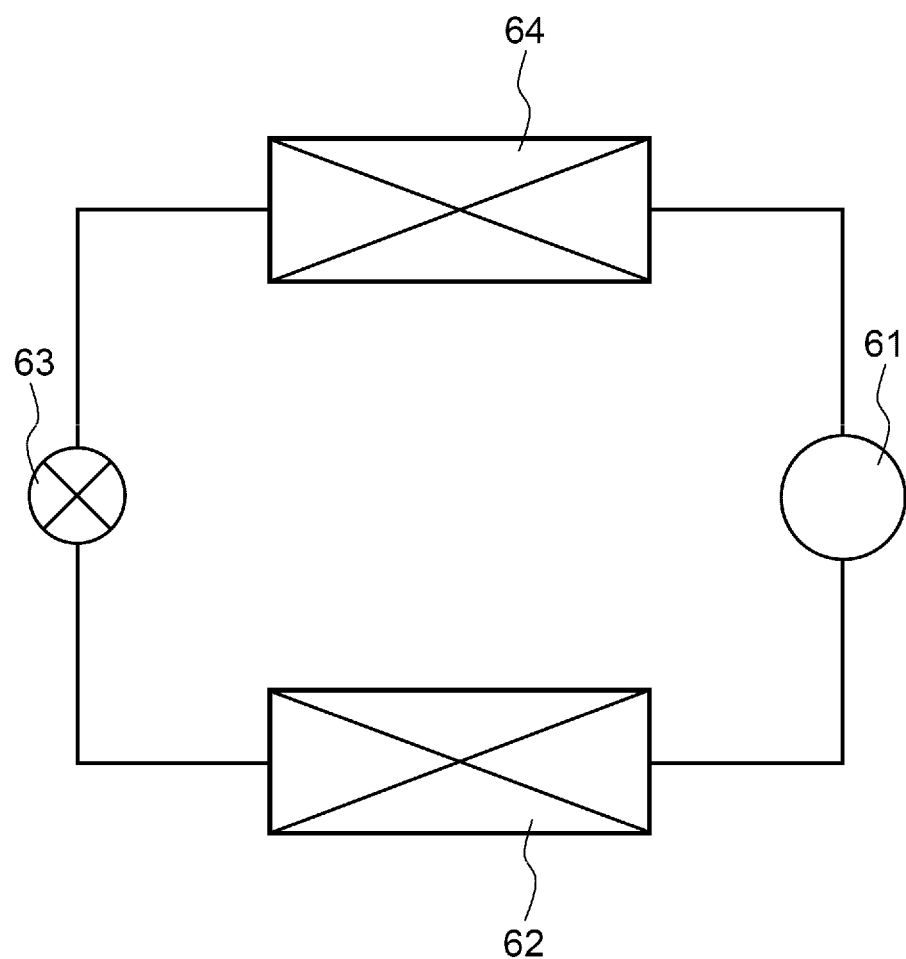
FIG. 1 is a system configuration view of a refrigeration cycle device which uses a compressor according to a first embodiment of the present invention.

FIG. 1 is a system configuration view of refrigeration cycle device 100 which uses compressor 61 according to the first embodiment of the present invention.

As illustrated in FIG. 1, refrigeration cycle device 100 of the embodiment is mainly configured of compressor 61, condenser 62, throttle mechanism 63, and evaporator 64, for example, in a case of a cycle exclusively for cooling. In addition, the equipment is linked to each other so that a working fluid (refrigerant) circulates by piping.

In refrigeration cycle device 100 configured as described above, the refrigerant changes to liquid by at least any of pressurizing and cooling, and changes to gas by at least any of pressurizing and heating. Compressor 61 is driven by a motor, and transports a low-temperature and low-pressure gas refrigerant to condenser 62 by pressurizing the gas refrigerant to a high-temperature and high-pressure gas refrigerant. In condenser 62, the high-temperature and high-pressure gas refrigerant is cooled by air blown by a fan or the like, is condensed, and becomes a low-temperature and high-pressure liquid refrigerant. A pressure of the liquid refrigerant is reduced by throttle mechanism 63, a part of the liquid refrigerant becomes the low-temperature and low-pressure gas refrigerant, a remaining part becomes a low-temperature and low-pressure liquid refrigerant, and the liquid refrigerant is transported to evaporator 64. In evaporator 64, the low-temperature and low-pressure liquid refrigerant is heated and evaporated by the air blown by the fan or the like, becomes the low-temperature and low-pressure gas refrigerant, is suctioned to compressor 61 again, and is pressurized. The cycle is repeatedly performed.

In addition, in the description above, refrigeration cycle device 100 exclusively for cooling is described, but by using reversing valve or the like, it is certainly possible to operate refrigeration cycle device 100 as a cycle device for heating.

In addition, it is desirable that a heat transfer pipe which configures a refrigerant flow path of a heat exchanger in at least any of condenser 62 and evaporator 64, is an aluminum refrigerant pipe including aluminum or aluminum alloy. In particular, it is desirable that the heat transfer pipe is a flattened pipe provided with a plurality of refrigerant flow holes on a condition that a condensation temperature is lowered or an evaporation temperature is raised.

The working fluid (refrigerant, working refrigerant) which is sealed in refrigeration cycle device 100 of the embodiment is a two-component mixed working fluid made of (1) R1123 (1,1,2-trifluoroethylene) and (2) R32 (difluoromethane), and in particular, is a mixed working fluid in which there is 30% by weight to 60% by weight of R32.

In a case of employment to scroll compressor 200 which will described later, by mixing 30% by weight or more of R32 with R1123, it is possible to suppress a disproportionation reaction of R1123. As a concentration of R32 increases, it is possible to further suppress a disproportionation reaction. This is because it is possible to suppress a disproportionation reaction of R1123 by an action of reducing a chance of a disproportionation reaction due to integrated behaviors during a phase change, such as condensation and evaporation since an action of R32 for mitigating a disproportionation reaction by small polarization to a fluorine atom, and physical properties of R1123 and R32 are similar to each other.

In addition, a mixed refrigerant of R1123 and R32 can be handled as a single refrigerant since the mixed refrigerant of R1123 and R32 has an azeotropic point when R32 is 30% by weight and R1123 is 70% by weight, and a temperature does not slip. In addition, when 60% by weight or more of R32 is mixed with R1123, the temperature slide increases, and since there is a possibility that it is difficult to handle the single refrigerant in a similar manner, it is desirable to mix 60% by weight or less of R32 with R1123. In particular, in order to prevent disproportionation, to further reduce the temperature slide when approaching the azeotropic point, and to easily design the equipment, it is desirable that R32 is mixed at a ratio of 40% by weight to 50% by weight with R1123.

FIGS. 2 and 3 are views comparing R410A and R1123 with each other by computing a refrigeration performance in a case where a pressure and a temperature in the refrigeration cycle, and a displacement volume of the compressor are the same, and cycle efficiency (COP), at proportions of 30% by weight to 60% by weight of R32, in a mixed working fluid of R1123 and R32 in the first embodiment of the present invention.

First, the computation condition of FIGS. 2 and 3 will be described. In recent years, in order to improve the cycle efficiency of the equipment, the performance of the heat exchanger is improved, and in an actual operation state, there is a tendency for a condensation temperature to decrease, and for an evaporation temperature to increase, and there is also a tendency for a discharge temperature to decrease. Therefore, considering the actual operation condition, a cooling computation condition of FIG. 2 is a condition which corresponds to the time when a cooling operation of an air conditioner (an indoor dry-bulb temperature is 27° C., a wet-bulb temperature is 19° C., and an outdoor dry-bulb temperature is 35° C.) is performed, and the evaporation temperature is 15° C., the condensation temperature is 45° C., an overheating degree of suctioned refrigerant of the compressor is 5° C., and an overcooling degree of an outlet of the condenser is 8° C.

In addition, a heating computation condition of FIG. 3 is a computation condition which corresponds to the time when a heating operation of the air conditioner (an indoor dry-bulb temperature is 20° C., an outdoor dry-bulb temperature is 7° C., and a dry-bulb temperature is 6° C.) is performed, the evaporation temperature is 2° C., the condensation temperature is 38° C., an overheating degree of suctioned refrigerant of the compressor is 2° C., and an overcooling degree of an outlet of the condenser is 12° C.

As illustrated in FIGS. 2 and 3, by mixing R32 at a ratio of 30% by weight to 60% by weight with R1123, when performing the cooling operation and the heating operation, comparing with R410A, it is ascertained that a refrigeration performance increases approximately by 20%, the cycle efficiency (COP) is 94 to 97%, and the global warming potential can be reduced to 10 to 20% of R410A.

As described above, in a two-component system of R1123 and R32, when comprehensively considering prevention of disproportionation, a size of temperature slide, a performance when the cooling operation is performed and when the heating operation is performed, and COP (that is, when specifying the proportions employed in the air conditioner which uses scroll compressor 200 that will be described later), a mixture containing R32 at a ratio of 30% by weight to 60% by weight is desirable. More desirably, a mixture containing R32 at a ratio of 40% by weight to 50% by weight is desirable.

<Modification Example 1 of Working Fluid>

In addition, the working fluid sealed in refrigeration cycle device 100 of the embodiment is a two-component mixed working fluid made of (1) R1123 (1,1,2-trifluoroethylene) and (2) R125 (tetrafluoroethane), and in particular, is a mixed working fluid in which there is 30% by weight to 60% by weight of R125.

In a case of employment to scroll compressor 200 which will described later, by mixing 30% by weight or more of R125 with R1123, it is possible to suppress a disproportionation reaction of R1123. As a concentration of R125 increases, it is possible to further suppress a disproportionation reaction. This is because it is possible to suppress a disproportionation reaction of R1123 by an action of reducing a chance of a disproportionation reaction due to integrated behaviors during a phase change, such as condensation and evaporation since an action of R125 for mitigating a disproportionation reaction by small polarization to a fluorine atom, and physical properties of R1123 and R125 are similar to each other. In addition, since R125 is a nonflammable refrigerant, R125 can reduce flammability of R1123.

FIGS. 4 and 5 are views comparing R410A and R1123 with each other by computing a refrigeration performance in a case where a pressure and a temperature in the refrigeration cycle, and a displacement volume of the compressor are the same, and cycle efficiency (COP), at proportions of 30% by weight to 60% by weight of R125, in a mixed working fluid of R1123 and R125 in the first embodiment of the present invention. In addition, each of the computation conditions of FIGS. 4 and 5 is similar to those of FIGS. 2 and 3.

As illustrated in FIGS. 4 and 5, by mixing R125 at a ratio of 30% by weight to 60% by weight with R1123, comparing with R410A, it is ascertained that a refrigeration performance increases by 96% to 110%, and the cycle efficiency (COP) is 94 to 97%.

In particular, by mixing R125 at a ratio of 40% by weight to 50% by weight with R1123, since disproportionation of R1123 can be prevented and the discharge temperature can be lowered, a design of the equipment when a high-load operation is performed and when freezing and refrigerating are performed for increasing the discharge temperature becomes easy. Furthermore, the global warming potential can be reduced to 50 to 100% of R410A.

As described above, in a two-component system of R1123 and R125, when comprehensively considering prevention of disproportionation, reduction of flammability, a performance when the cooling operation is performed and when the heating operation is performed, COP, and the discharge temperature (that is, when specifying the proportions employed in the air conditioner which uses scroll compressor 200 that will be described later), a mixture containing R125 at a ratio of 30% by weight to 60% by weight is desirable. More desirably, a mixture containing R125 at a ratio of 40% by weight to 50% by weight is desirable.

<Modification Example 2 of Working Fluid>

In addition, the working fluid sealed in the refrigeration cycle device of the embodiment may be a three-component mixed working fluid made of (1) R1123 (1,1,2-trifluoroethylene), (2) R32 (difluoromethane), and (3) R125 (tetrafluoroethane). In particular, the working fluid is a mixed working fluid in which the proportions of R32 and R125 is equal to or greater than 30% and less than 60% by weight, and the proportions of R1123 is equal to or greater than 40% by weight and less than 70% by weight.

In a case of employment to scroll compressor 200 which will described later, by making proportions of R32 and R125 be equal to or greater than 30% by weight, it is possible to suppress a disproportionation reaction of R1123. In addition, as proportions of R32 and R125 increases, it is possible to further suppress a disproportionation reaction. In addition, R125 can reduce flammability of R1123.

FIGS. 6 and 7 are views comparing R410A and R1123 with each other by computing a refrigeration performance in a case where a pressure and a temperature in the refrigeration cycle, and a displacement volume of the compressor are the same, and cycle efficiency (COP), in a case where proportions of each of R32 and R125 is fixed to 50% by weight, and R32 and R125 are mixed with R1123 in the first embodiment of the present invention. In addition, calculation conditions of FIG. 6 and FIG. 7 are respectively similar to calculation conditions of FIG. 2 and FIG. 3.

As illustrated in FIGS. 6 and 7, by making proportions of each of R32 and R125 30% by weight to 60% by weight, comparing with R410A, it is ascertained that a refrigeration performance becomes 107 to 116%, and the cycle efficiency (COP) is 93 to 96%.

In particular, by making proportions of R32 and R125 40% by weight to 50% by weight, disproportionation can be prevented, the discharge temperature can be lowered, and flammability can be reduced. Furthermore, the global warming potential can be reduced to 60 to 30% of R410A.

In addition, in <Modification Example 2 of Working Fluid>, it is described that proportions of each of R32 and R125 of three-component working fluid is made to be 50% by weight, but proportions of R32 may be 0% by weight to 100% by weight, and proportions of R32 may be raised in a case where the refrigeration performance is desired to be improved. On the contrary, when reducing proportions of R32 and increasing proportions of R125, the discharge temperature can be lowered, and additionally, flammability can be reduced.

As described above, in a three-component system of R1123, R32, and R125, when comprehensively considering prevention of disproportionation, reduction of flammability, a performance when the cooling operation is performed and when the heating operation is performed, COP, and the discharge temperature (that is, when specifying the proportions employed in the air conditioner which uses scroll compressor 200 that will be described later), a mixture in which R32 and R125 are mixed and a sum of R32 and R125 is 30% by weight to 60% by weight is desirable. More desirably, a mixture in which a sum of R32 and R125 is 40% by weight to 50% by weight is desirable.

Next, a configuration of scroll compressor 200 which is an example of compressor 61 according to the embodiment will be described.

Figure 8:
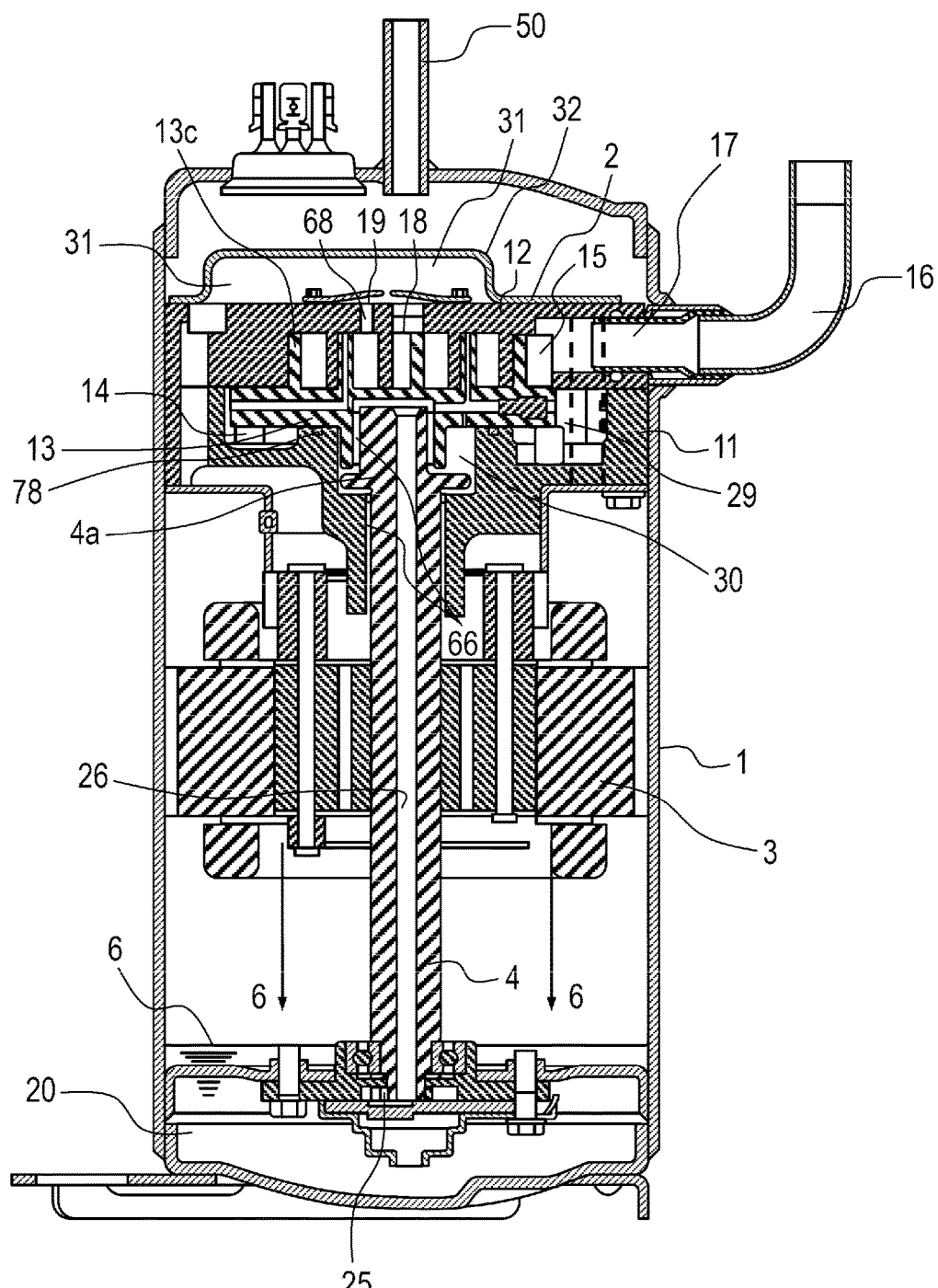
FIG. 8 is a longitudinal sectional view of a scroll compressor according to the first embodiment of the present invention.
Figure 9:
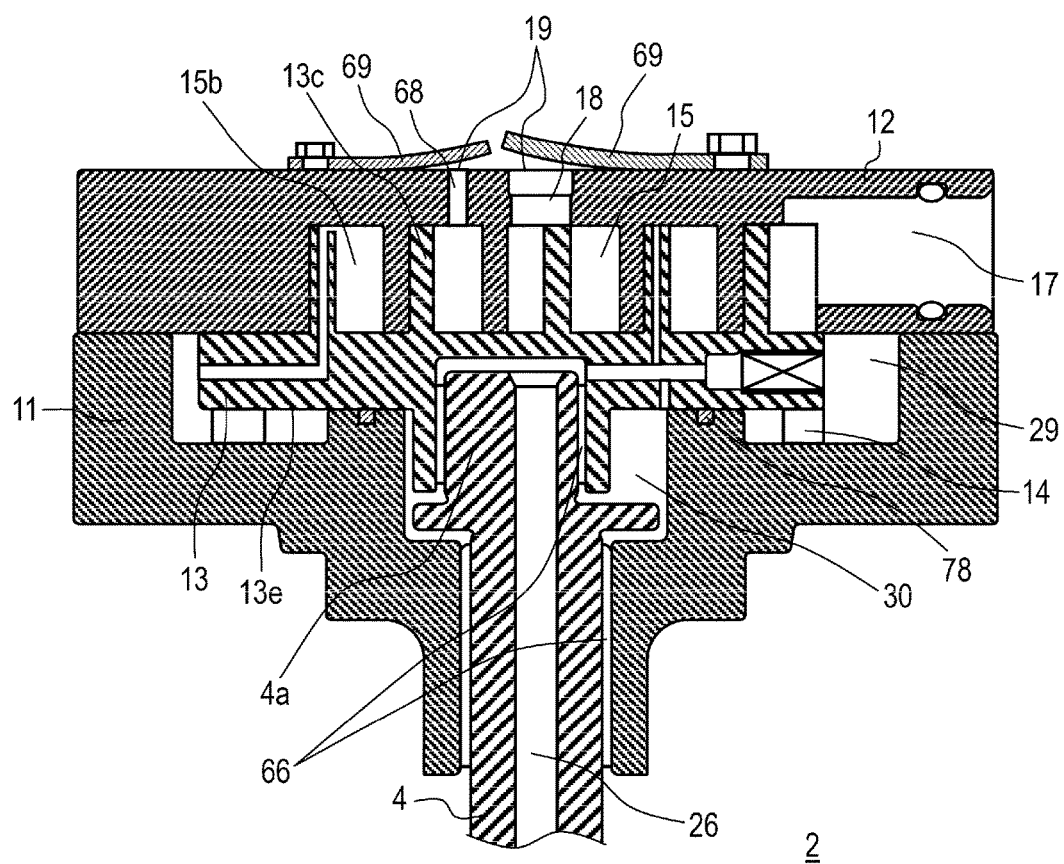
FIG. 9 is a sectional view in which main portions of a compression mechanism portion of the scroll compressor according to the first embodiment of the present invention are enlarged.
Figure 10:
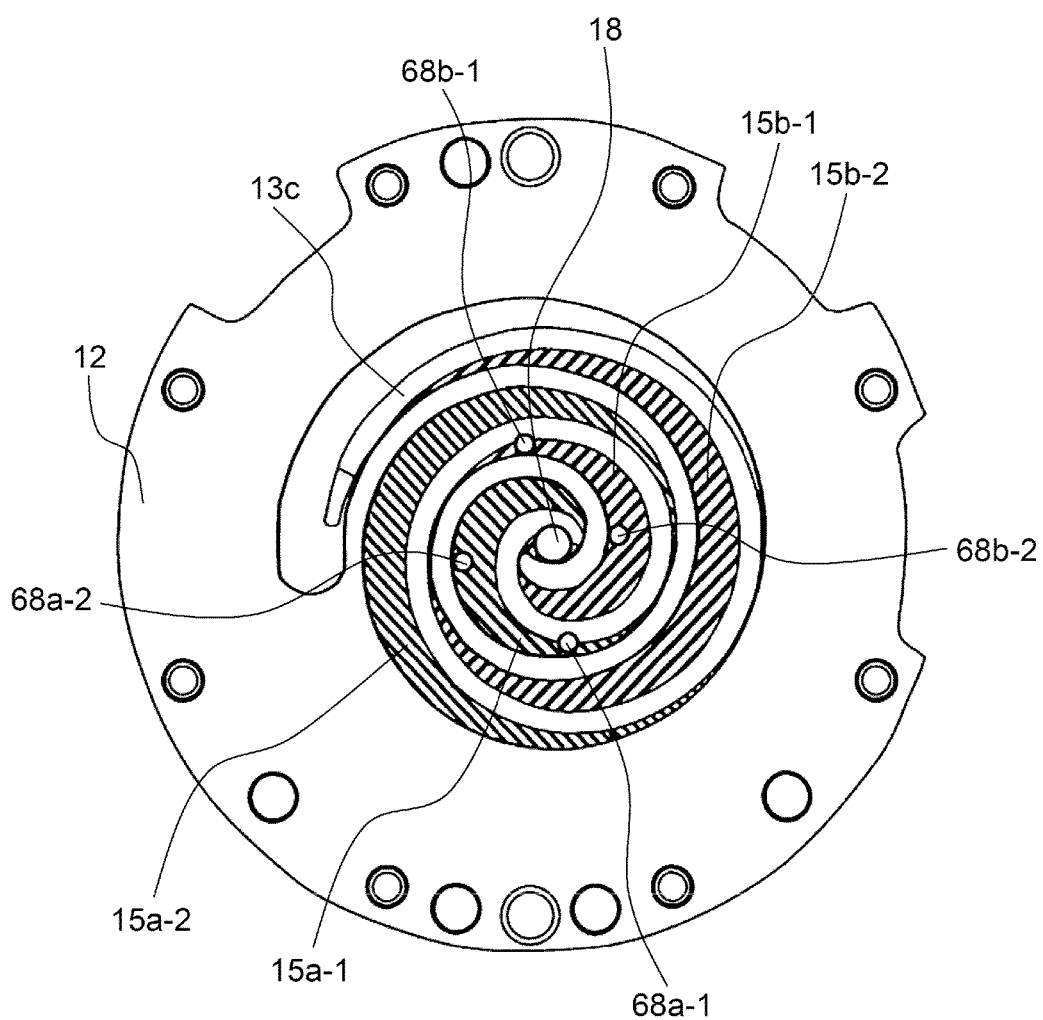
FIG. 10 is a plan view illustrating a configuration of a compression chamber of the compression mechanism portion of the scroll compressor according to the first embodiment of the present invention.

FIG. 8 is a longitudinal sectional view of scroll compressor 200 according to the first embodiment of the present invention, FIG. 9 is a sectional view in which main portions of compression mechanism portion 2 of the same scroll compressor 200, and FIG. 10 is a plan view illustrating a configuration of compression chamber 15 of compression mechanism portion 2 of the same scroll compressor 200. Hereinafter, the configuration, the operation, and the action of scroll compressor 200 will be described.

As illustrated in FIG. 8, scroll compressor 200 of the first embodiment of the present invention includes airtight container 1, compression mechanism portion 2 in the inside thereof, motor portion 3, and oil storage portion 20.

By using FIG. 9, compression mechanism portion 2 will be described in detail. Compression mechanism portion 2 includes main bearing member 11 which is fixed to the inside of airtight container 1 by welding or shrink-fitting, shaft 4 which is pivotally supported by main bearing member 11, and fixed scroll 12 which is bolted on main bearing member 11. Compression mechanism portion 2 is configured as revolving scroll 13 which meshes with fixed scroll 12 is interposed between main bearing member 11 and fixed scroll 12.

Between revolving scroll 13 and main bearing member 11, rotation restraining mechanism 14 using an Oldham ring or the like, which guides revolving scroll 13 to be operated following a circular orbit by preventing rotation of revolving scroll 13, is provided. It is possible to operate revolving scroll 13 following a circular orbit by eccentrically driving revolving scroll 13 using eccentric shaft portion 4a which is at an upper end of shaft 4. In addition, fixed scroll 12 and revolving scroll 13 respectively have a structure in which a spiral lap rises (protrudes) from an end plate.

Accordingly, compression chamber 15 which is formed between fixed scroll 12 and revolving scroll 13 performs compression after suctioning and confining a working refrigerant in compression chamber 15 via suction pipe 16 which passes through the outside of airtight container 1 and suction port 17 of an outer circumferential portion of fixed scroll 12 by moving the working refrigerant toward a center portion from an outer circumferential side while contracting an interval volume. The working refrigerant of which a pressure reaches a predetermined pressure is discharged to discharge chamber 31 by pushing and opening discharge hole 18 which is a through hole formed at the center portion (end plate center portion) of fixed scroll 12, and reed valve 19 (check valve) which is formed at a position different from that of discharge hole 18 on the end plate of fixed scroll 12 and is from circular bypass hole 68 which is a through hole.

Discharge chamber 31 is a space which is provided to cover discharge hole 18, and is formed by muffler 32. The working refrigerant discharged to discharge chamber 31 is discharged to the inside of airtight container 1 via a communication path provided in compression mechanism portion 2. Working refrigerant discharged to the inside of airtight container 1 is discharged to refrigeration cycle device 100 from airtight container 1 via discharge pipe 50.

In addition, in order to avoid damage due to excessive deformation of reed valve 19, valve stop 69 which suppresses a lift amount is provided. In addition, reed valve 19 is provided, for example, on an end plate surface at a position at which bypass hole 68 of the end plate of fixed scroll 12 is formed.

In addition, as illustrated in FIG. 8, pump 25 is provided at the other end of shaft 4, and a suction port of pump 25 is disposed to be present in the inside of oil storage portion 20. Since pump 25 is driven together with scroll compressor 200 at the same time, and compressor lubricating oil 6 (oil, refrigerator oil) which is in oil storage portion 20 provided on a bottom portion of airtight container 1 can be reliably suctioned up regardless of a pressure condition and an operation speed, and a concern about shortage of oil is solved.

Compressor lubricating oil 6 which is suctioned up by pump 25 is supplied to compression mechanism portion 2 through oil supply hole 26 (refer to FIG. 9) which penetrates the inside of shaft 4. In addition, before compressor lubricating oil 6 is suctioned up by pump 25, or after compressor lubricating oil 6 is suctioned up, by removing foreign materials by an oil filter or the like, it is possible to prevent the foreign materials from being incorporated into compression mechanism portion 2, and further, to improve the reliability.

Compressor lubricating oil 6 guided to compression mechanism portion 2 also becomes a backpressure source with respect to revolving scroll 13, which has a pressure having substantially equivalent to a discharge pressure of scroll compressor 200. Accordingly, revolving scroll 13 stably achieves a predetermined compression performance without being separated from or abuts against fixed scroll 12 being biased. Furthermore, by a supply pressure and a self-weight, a part of compressor lubricating oil 6 infiltrates into a fitting portion between eccentric shaft portion 4a and revolving scroll 13, and into bearing portion 66 between shaft 4 and main bearing member 11, by obtaining a means of escape, and after each part is lubricated, the part of compressor lubricating oil 6 is dropped and returns to oil storage portion 20.

In addition, by disposing seal member 78 on rear surface 13e of the end plate of revolving scroll 13, an inner side of seal member 78 is defined as high-pressure region 30, and an outer side of seal member 78 is defined as backpressure chamber 29. In this manner, since it is possible to completely separate a pressure of high-pressure region 30 and a pressure of backpressure chamber 29 from each other, it is possible to stably control a pressure load from rear surface 13e of revolving scroll 13.

Next, by using FIG. 10, a pressure rise of compression chamber 15 which is formed by fixed scroll 12 and revolving scroll 13 will be described. In compression chamber 15 which is formed by fixed scroll 12 and revolving scroll 13, first compression chambers 15a-1 and 15a-2 which are formed on a lap outer wall side of revolving scroll 13, and second compression chambers 15b-1 and 15b-2 which are formed on a lap inner wall side, are present (this configuration in which the compression chambers are formed on each of the outer wall side and the inner wall side of the lap, is described as "a configuration in which the compression chambers are formed in both directions"). Gas which is suctioned to each of compression chambers 15 moves to the center while contracting an interval volume according to a revolving operation of revolving scroll 13. In addition, when a pressure of the inside of compression chamber 15 reaches the discharge pressure, and the inside of compression chamber 15 communicates with discharge hole 18 or bypass holes 68a-1, 68a-2, 68b-1, and 68b-2, the working refrigerant of compression chamber 15 is discharged to discharge chamber 31 by pushing and opening reed valve 19. At this time, comparison of pressures of compression chambers 15 in each of a case where bypass holes 68a-1, 68a-2, 68b-1, and 68b-2 are provided (the embodiment) and a case where bypass holes 68a-1, 68a-2, 68b-1, and 68b-2 are not provided (comparative example), will be described.

Figure 11:
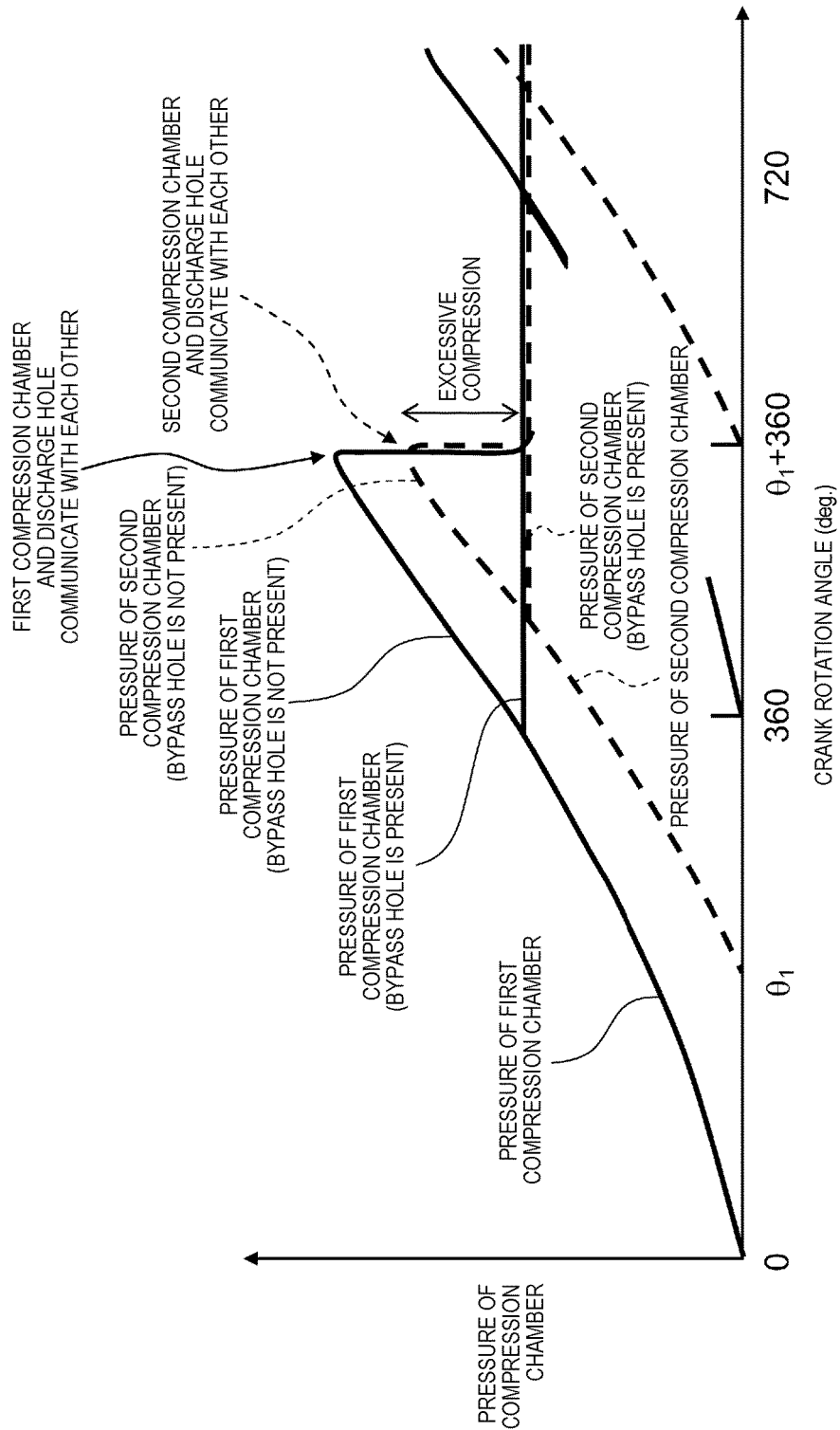
FIG. 11 is a view illustrating comparison of pressures of the compression chambers in each of a case of the first embodiment (a case where a bypass hole is provided) of the present invention and a case where the bypass hole is not provided (comparative example).

FIG. 11 is a view illustrating comparison of pressures of compression chambers 15 in each of a case of the first embodiment (a case where bypass holes 68a-1, 68a-2, 68b-1, and 68b-2 are provided) of the present invention and a case where bypass holes 68a-1, 68a-2, 68b-1, and 68b-2 are not provided (comparative example).

As illustrated in FIG. 11, in a case where bypass holes 68a-1, 68a-2, 68b-1, and 68b-2 are not provided (both in a case illustrated by a solid line and in a case illustrated by a broken line), the pressure of compression chamber 15 continues to increase until compression chamber 15 communicates with discharge hole 18. Therefore, there is a possibility that the pressure excessively increases to be higher than the discharge pressure of discharge chamber 31, and the discharge temperature increases more than necessary.

Here, in the embodiment, bypass holes 68a-1, 68a-2, 68b-1, and 68b-2 are disposed at a position of communicating with compression chamber 15 earlier (at an early timing) than discharge hole 18. Accordingly, at the same time when the pressure of compression chamber 15 reaches the discharge pressure, the discharge to discharge chamber 31 is started through bypass holes 68a-1, 68a-2, 68b-1, and 68b-2, and a configuration which can suppress a discharge temperature rise due to the excessive pressure rise, can be realized.

In addition, by considering bypass holes 68a-1, 68a-2, 68b-1, and 68b-2 as a circular communication hole, it is possible to configure flow path resistance with respect to areas of bypass holes 68a-1, 68a-2, 68b-1, and 68b-2 to be the minimum resistance compared that in a case of other shapes. Furthermore, as illustrated in FIG. 11, in each of the first compression chambers 15a-1 and 15a-2 (solid line) and the second compression chambers 15b-1 and 15b-2 (broken line), a crank rotation angle which reaches a discharge pressure varies. Accordingly, in the embodiment, bypass holes 68a-1 and 68a-2 are provided at an appropriate position of communicating only with first compression chambers 15a-1 and 15a-2, and bypass holes 68b-1 and 68b-2 are provided at an appropriate position of communicating only with the second compression chambers 15b-1 and 15b-2. Accordingly, immediately before ejection from discharge hole 18, since it is possible to suppress a temperature rise due to the excessive compression of the refrigerant, it is possible to suppress a disproportionation reaction of R1123.

Next, a modification example of the above-described scroll compressor 200 will be described.

Figure 12:
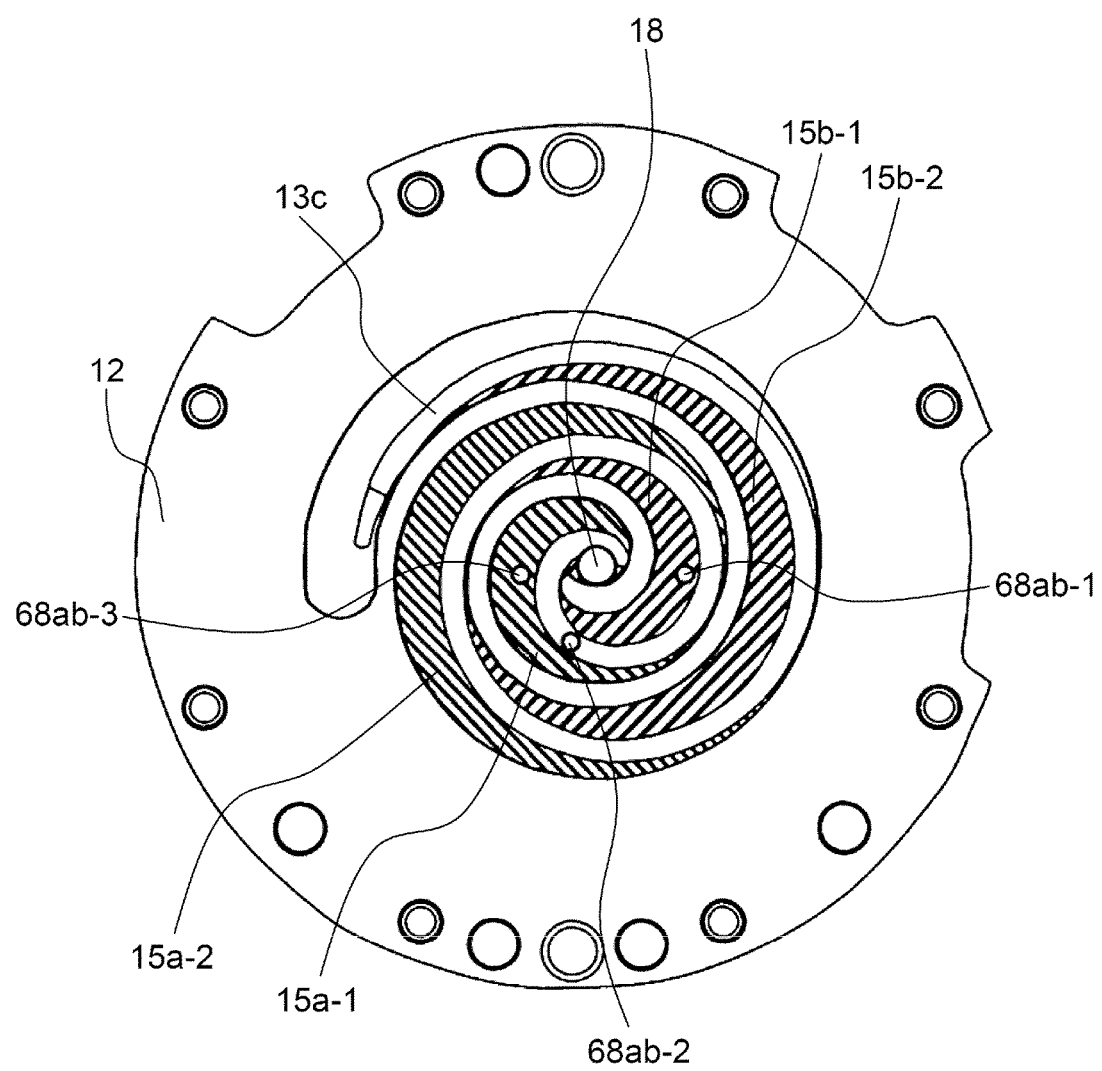
FIG. 12 is a plan view illustrating a configuration of the compression chamber of the compression mechanism portion of the scroll compressor according to a modification example of the first embodiment of the present invention.

FIG. 12 is a plan view illustrating a configuration of compression chamber 15 of compression mechanism portion 2 of scroll compressor 200 according to a modification example of the first embodiment of the present invention.

Since configuration elements other than bypass hole 68ab are similar to those described in FIG. 10, in FIG. 12, the configuration elements which are the same as those in FIG. 10 use the same reference numerals, and only bypass hole 68ab will be described, and description of other configuration elements is omitted.

In scroll compressor 200 illustrated in FIG. 12, by the revolving operation of revolving scroll 13, bypass hole 68ab is provided at a position which communicates with both of a first compression chamber 15a and a second compression chamber 15b by a revolving movement of revolving scroll 13. In addition, at the same time, a diameter of bypass hole 68ab is configured to be smaller than a thickness of a revolving scroll lap 13c not to be open to the first compression chamber 15a and the second compression chamber 15b. Accordingly, in the crank rotation angle in FIG. 12, respectively, bypass hole 68ab-1 communicates with the second compression chamber 15b-1, and bypass hole 68ab-3 communicates with first compression chamber 15a-1, and bypass hole 68ab-1 and bypass hole 68ab-3 play a role of preventing excessive compression communicating with each other. In addition, by making such a diameter, similar to bypass hole 68ab-2 of FIG. 12, when the revolving scroll lap 13c is across bypass hole 68ab, bypass hole 68ab does not communicate with either the first compression chamber 15a-1 and the second compression chamber 15b-1. Accordingly, since working refrigerant leakage does not occur between the compression chambers, and the temperature rise can be suppressed, it is possible to suppress a disproportionation reaction of R1123.

In the compressor of the embodiment, as the compressor lubricating oil, polyol ester oil is used. Polyol ester of the present invention is not limited to a specific type, but by using at least one type selected from the group of neopentylglycol, trimethylolpropane, pentaerythritol, and dipentaerythritol as a constituent alcohol, it is possible to adjust viscosity of the refrigerator oil across a wide width. According to this configuration, since it is possible to freely adjust the viscosity of the refrigerator oil, it is possible to ensure an oil film between a vane and a piston, and to suppress generation of sliding heat. In addition, a carbonyl group of the polyol ester oil captures radicals which are a cause of start of a disproportionation reaction, it is possible to suppress a disproportionation reaction of R1123.

In addition, a constituent fatty acid of polyol ester of the present invention is not limited to a specific type, and it is appropriate to use a fatty acid having 6 to 12 carbons. The constituent fatty acid may be a straight chain fatty acid and may be branched-chain fatty acid, but since a carbonyl group is not three-dimensionally shielded with an alkyl group in the straight chain fatty acid, a performance of trapping the radicals is high.

In addition, as an additive which is added to compressor lubricating oil 6, it is possible to use an anti-wear agent, an antioxidant, a polymerization inhibitor, or a reactant adsorbent. As the anti-wear agent, a phosphate ester, phosphorous acid ester, or thiophosphate may be employed, but the phosphate ester which is unlikely to give a negative influence to the refrigeration cycle device is appropriate.

Specific examples of the phosphate ester include tributylphosphate, tripentyl phosphate, trihexyl phosphate, triheptyl phosphate, trioctyl phosphate, trinonyl phosphate, tridecyl phosphate, triundecylic phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyl diphenyl phosphate, and diphenyl xylenyl phosphate. In general, by adding 0.1 to 3 wt % of the phosphate ester anti-wear agent into the refrigerator oil, by effectively adsorbing the phosphate ester anti-wear agent to a front surface of a sliding portion, and by creating a film having a small shearing force on a sliding surface, it is possible to obtain an anti-wear effect.

According to this configuration, as the anti-wear agent is adsorbed to the front surface of the sliding portion and reduces wear, it is possible to suppress heat generation, and to suppress self-degradable reaction of the refrigerant R1123.

In addition, specific examples of a phenolic antioxidant include propyl gallate, 2,4,5-trihydroxybutyrophenone, t-butylhydroquinone, nordihydroguaiaretic acid, butyl hydroxyanisole, 4-hydroxymethyl-2, 6-di-t-butylphenol, octyl gallate, butylhydroxytoluene, and dodecyl gallate. By adding 0.1 to 1 wt % of antioxidant to base oil, it is possible to effectively captures the radicals, and to prevent the reaction. In addition, minimize coloring of the base oil itself due to the antioxidant.

According to this configuration, as the phenolic antioxidant effectively captures the radicals generated in the inside of airtight container 1, it is possible to obtain an effect of suppressing a disproportionation reaction of R1123.

In addition, limonene may be added in an amount of approximately 5% of the refrigerant amount of R1123 in order to prevent the reaction of highly reactive molecules containing a double bond and fluorine atom like R1123. Scroll compressor 200 of the embodiment and refrigeration cycle device 100 which uses the same have a closed system, and as described above, the lubricating oil is sealed as the base oil. In general, the viscosity of the lubricating oil which becomes the base oil sealed in scroll compressor 200 is generally approximately 32 mm$^2$/s to 68 mm$^2$/s. Meanwhile, the viscosity of limonene is very low which is approximately 0.8 mm$^2$/s. Therefore, the viscosity of the lubricating oil rapidly decreases to be 60 mm$^2$/s in a case where approximately 5% of limonene is mixed therein, 48 mm$^2$/s in a case where 15% of limonene is mixed therein, and 32 mm$^2$/s in a case where 35% of limonene is mixed therein. Therefore, in order to prevent the reaction of R1123, when a large amount of limonene is mixed therein, the reliability of scroll compressor 200 and refrigeration cycle device 100 is influenced by the decrease in viscosity of the lubricating oil, for example, wear due to a lubricating defect and generation of metallic soap due to a contact state of metal on the sliding surface.

Meanwhile, in order to compensate for the decrease in viscosity of the base oil caused by mixing limonene having an amount appropriate for preventing the reaction therein, by employing high-viscosity lubricating oil as a base, or by mixing super-high-viscosity lubricating oil having an amount which is equal to or greater than a mixing amount of limonene, the lubricating oil of scroll compressor 200 of the embodiment ensures appropriate viscosity of the lubricating oil.

Specifically, when lubricating oil of which the viscosity is 78 mm$^2$/s in a case where 5% of limonene is mixed therein, and lubricating oil of which the viscosity is approximately 230 mm$^2$/s in a case where 35% of limonene is mixed therein, are selected, it is possible to ensure 68 mm$^2$/s in viscosity after the mixing. In addition, in order to maximize an effect of preventing the reaction of R1123 using limonene, an extreme example, such as increase in the mixing amount of limonene to 70% or 80%, is also considered. However, in this case, the viscosity of the high-viscosity lubricating oil which becomes the base becomes 8500 mm$^2$/s or 25000 mm$^2$/s, respectively, and exceeds 3200 mm$^2$/s that is the maximum value of ISO standard. In addition, since it is also difficult to uniform mix limonene therein, actual employment is difficult to be considered.

In addition, in a case where super-high viscosity lubricating oil is mixed with limonene by an amount equivalent to each other, by mixing 800 mm$^2$/s to 1000 mm$^2$/s of lubricating oil with limonene, viscosity of 32 mm$^2$/s to 68 mm$^2$/s is obtained. In addition, in a case where the limonene and the super-high viscosity oil which have different viscosity are mixed with each other, when performing the mixing while adding the super-high viscosity oil to the limonene little by little, lubricating oil of which composition viscosity is relatively uniform, can be obtained.

In addition, limonene is described as an example in the embodiment, but similar effects can also be obtained by a terpene type or a terpenoid type. For example, it is possible to select hemiterpene type isoprene, prenol, 3-methyl butanoic acid and monoterpene type geranyl diphosphate, cineole farnesyl diphosphate of pinene and sesquiterpene, artemisinin, bisabolol, diterpene type geranylgeranyl diphosphate, retinol, retinal, phytol, paclitaxel, forskolin, aphidicolin and triterpene type squalene, and lanosterol, in accordance with a use temperature of scroll compressor 200 and refrigeration cycle device 100, and required viscosity of the lubricating oil.

In addition, the exemplified viscosity is a specific example in scroll compressor 200 having a high-pressure container, but in scroll compressor 200 which uses the lubricating oil having comparatively low viscosity of 5 mm$^2$/s to 32 mm$^2$/s, and has a low-pressure container, similar embodiment is also possible, and similar effects can be obtained.

In addition, the terpene type and the terpenoid type, such as limonene, has solubility with respect to plastic, but when limonene having an amount which is equal to or less than 30% is mixed therein, the influence thereof is small, and electric insulation required for plastic in scroll compressor 200 does not have a problem. However, in a case where there is a problem, for example, in a case where the reliability is required for a long period of time, and in a case where a general use temperature is high, it is desirable to use polyimide, polyimidoamide, or polyphenylene sulfide which has chemical resistant properties.

In addition, a winding wire of motor portion 3 of scroll compressor 200 of the embodiment, a conductor is coated with varnish (thermosetting insulating material) and baked with an insulating film therebetween. Examples of the thermosetting insulating material include a polyimide resin, an epoxy resin, and an unsaturated polyester resin. Among these, the polyimide resin can be obtained by coating in a state of polyamic acid which is a precursor, and baking the polyamic acid approximately at 300° C. to achieve polyimidation. It is known that imide reaction occurs due to reaction between amine and carboxylic acid anhydride. Since there is a possibility that the refrigerant R1123 also reacts in a short circuit between electrodes, by coating a motor winding with polyimidic acid varnish (polyimide precursor which can allow aromatic diamine and aromatic tetracarboxylic dianhydride to react is a main component), it is possible to prevent a short circuit between electrodes.

Therefore, even in a state where a coil of motor portion 3 infiltrates into a liquid refrigerant, it is possible to maintain high resistance between windings, to suppress discharge between windings, and to obtain an effect of suppressing self-degradable reaction of the refrigerant R1123.

Figure 13:
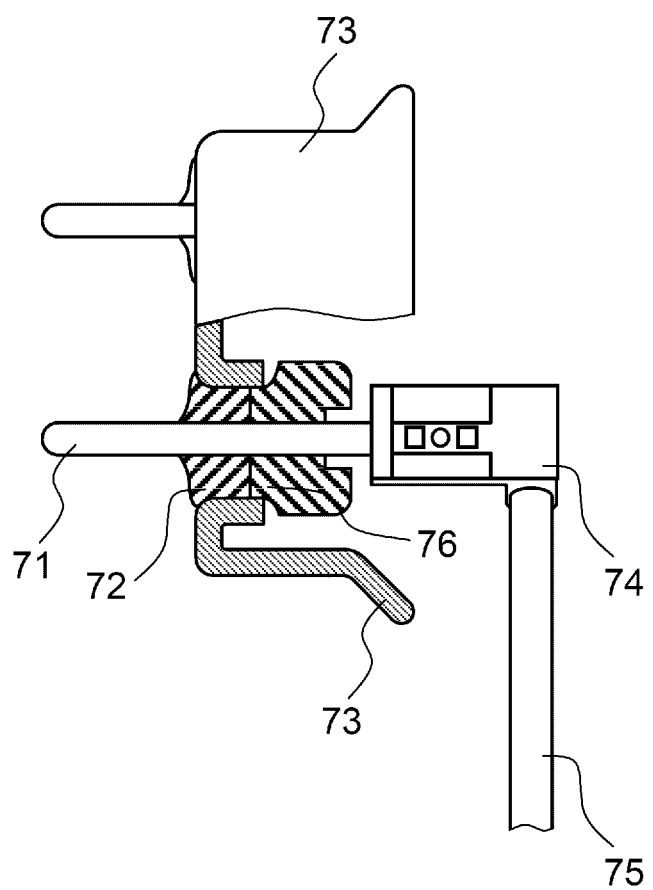
FIG. 13 is a partial sectional view illustrating a structure in the vicinity of a power supply terminal of the compressor according to the first embodiment of the present invention.

FIG. 13 is a partial sectional view illustrating a structure in the vicinity of a power supply terminal of scroll compressor 200 according to the first embodiment of the present invention.

In FIG. 13, power supply terminal 71, glass insulating material 72, metal lid body 73 which holds the power supply terminal, flag terminal 74 which is connected to power supply terminal 71, and lead wire 75, are illustrated. In scroll compressor 200 according to the embodiment, a doughnut-like insulating member 76 which adheres to glass insulating material 72 which is an insulating member, is pipe-connected onto power supply terminal 71 on an inner side of airtight container 1 of scroll compressor 200. As doughnut-like insulating member 76, a member which maintains insulation properties and has resistance against fluorinated acid, is appropriate. For example, a ceramic insulator or a HNBR rubber doughnut-like spacer is employed. It is mandatory that doughnut-like insulating member 76 adheres to glass insulating material 72, but it is preferable doughnut-like insulating member 76 also adheres to a connection terminal.

In power supply terminal 71 configured in this manner, due to doughnut-like insulating member 76, a creeping distance on the power supply terminal and an inner surface of scroll compressor 200 of a lid body becomes long, terminal tracking can be prevented, and ignition caused by discharge energy of R1123 can be prevented. In addition, it is possible to prevent fluorinated acid generated by decomposing R1123 from corroding glass insulating material 72.

In addition, scroll compressor 200 of the embodiment may be a so-called high-pressure shell type compressor in which a discharge port is open to the inside of airtight container 1, and the inside of airtight container 1 is filled with refrigerant compressed in compression chamber 15. Meanwhile, scroll compressor 200 may be a so-called low-pressure shell type scroll compressor 200 in which suction port 17 is open to the inside of airtight container 1, and the inside of airtight container 1 is filled with refrigerant which is before being pressed in compression chamber 15. This case is desirable because the temperature substantially decreases due to the introduction of a low-temperature refrigerant in compression chamber 15, and a disproportionation reaction of R1123 is suppressed, in a configuration in which a temperature is likely to increase until the refrigerant is heated in the inside of airtight container 1 and is introduced to compression chamber 15.

In addition, in high-pressure shell type scroll compressor 200, after the refrigerant discharged from the discharge port passes through the periphery of motor portion 3, and is heated by motor portion 3 in the inside of airtight container 1, the refrigerant may be discharged to the outside of airtight container 1 from discharge pipe 50. This configuration is desirable because a disproportionation reaction of R1123 is suppressed since it is possible to decrease the temperature of the refrigerant in compression chamber 15, even when the temperature of the refrigerant discharged from discharge pipe 50 is equivalent.

(Second Embodiment)

Next, a second embodiment of the present invention will be described.

Figure 14:
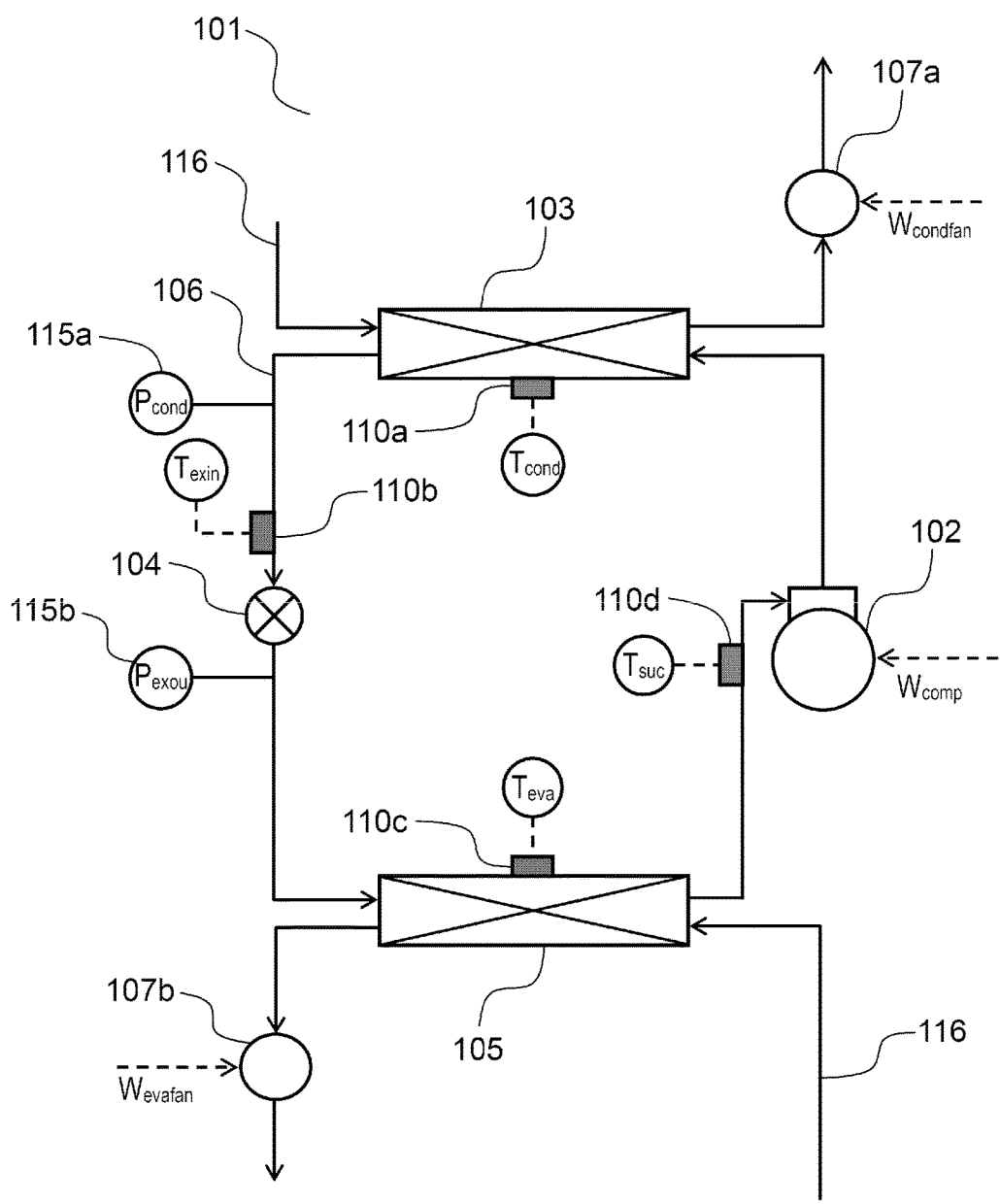
FIG. 14 is a view illustrating a configuration of a refrigeration cycle device according to a second embodiment of the present invention.

FIG. 14 is a view illustrating a configuration of refrigeration cycle device 101 according to the second embodiment of the present invention.

Refrigeration cycle device 101 of the embodiment is connected to compressor 102, condenser 103, expansion valve 104 which is a throttle mechanism, and evaporator 105 in order by refrigerant piping 106, and a refrigeration cycle circuit is configured. In the refrigeration cycle circuit, the working fluid (refrigerant) is sealed.

Next, a configuration of refrigeration cycle device 101 will be described.

As condenser 103 and evaporator 105, in a case where a surrounding medium is air, a fin and tube type heat exchanger or a parallel flow type (micro tube type) heat exchanger are used.

Meanwhile, as condenser 103 and evaporator 105 in a case where the surrounding medium is brine or a refrigerant of two-dimensional type refrigeration cycle device, a double pipe heat exchanger, a plate type heat exchanger, or a shell and tube type heat exchanger, are used.

As expansion valve 104, for example, an electronic expansion valve which uses a pulse motor driving method, or the like is used.

In refrigeration cycle device 101, in condenser 103, fluid machinery 107a which is a first transporting portion and drives (flows) the surrounding medium (first medium) which exchanges heat with the refrigerant to a heat exchanging surface of condenser 103, is installed. In addition, in evaporator 105, fluid machinery 107b which is a second transporting portion and drives (flows) the surrounding medium (second medium) which exchanges heat with the refrigerant to a heat exchanging surface of evaporator 105, is installed. In addition, flow path 116 of the surrounding medium is provided in each of the surrounding mediums.

Here, as the surrounding medium, when the air in the atmosphere is used, there is a case where water or brine, such as ethylene glycol, is used. In addition, in a case where refrigeration cycle device 101 is the two-dimensional type refrigeration cycle device, a refrigerant which is preferable for the refrigeration cycle circuit and a working temperature region, for example, hydrofluorocarbons (HFC), hydrocarbons (HC), or carbon dioxide, is used.

As fluid machineries 107a and 107b which drive the surrounding medium, in a case where the surrounding medium is air, an axial flow blower, such as a propeller fan, a cross flow fan, or a centrifugal blower, such as a turbo blower, is used, and in a case where the surrounding medium is brine, a centrifugal pump is used. In addition, in a case where refrigeration cycle device 101 is a two-dimensional type refrigeration cycle device, as fluid machineries 107a and 107b for transporting the surrounding medium, compressor 102 plays a role thereof.

In condenser 103, at a location (hereinafter, in the specification, referred to as "two-phase pipe of condenser") at which the refrigerant that flows in the inside thereof flows in two phases (a state where gas and liquid are mixed with each other), condensation temperature detecting portion 110a is installed, and it is possible to measure the temperature of the refrigerant.

In addition, between an outlet of condenser 103 and an inlet of expansion valve 104, condenser outlet temperature detecting portion 110b is installed. Condenser outlet temperature detecting portion 110b can detect overcooling degree (a value obtained by subtracting the temperature of condenser 103 from an inlet temperature of expansion valve 104) of inlet of expansion valve 104.

In evaporator 105, at a location (hereinafter, in the specification, referred to as "two-phase pipe of evaporator") at which the refrigerant that flows in the inside thereof flows in two phases, evaporation temperature detecting portion 110c is provided, and it is possible to measure the temperature of the refrigerant in the inside of evaporator 105.

In a suction portion (between an outlet of evaporator 105 and an inlet of compressor 102) of compressor 102, suction temperature detecting portion 110d is provided. Accordingly, it is possible to measure the temperature (suction temperature) of the refrigerant suctioned to compressor 102.

In a case where, for example, an electronic thermostat which is connected to the working fluid in a contact state at the piping in which the refrigerant flows or an outer pipe of a heat transfer pipe is used as each of the above-described temperature detecting portion, there is also a case where a sheath pipe type electronic thermostat which directly comes into contact with the working fluid, is used.

Between the outlet of condenser 103 and the inlet of expansion valve 104, high-pressure side pressure detecting portion 115a which detects a pressure on a high pressure side (a region in which the refrigerant from the outlet of compressor 102 to the inlet of expansion valve 104 is present at a high pressure) of the refrigeration cycle circuit, is installed.

At the outlet of expansion valve 104, low-pressure side pressure detecting portion 115b which detects a pressure on a low pressure side (a region in which the refrigerant from the outlet of expansion valve 104 to the inlet of compressor 102 is present at a low pressure) of the refrigeration cycle circuit, is installed.

As high-pressure side pressure detecting portion 115a and low-pressure side pressure detecting portion 115b, for example, a member which converts displacement of a diaphragm into an electric signal, or the like is used. In addition, instead of high-pressure side pressure detecting portion 115a and low-pressure side pressure detecting portion 115b, a differential pressure gauge (measuring means for measuring a pressure difference between the outlet and the inlet of expansion valve 104), may be used.

In addition, in the above-described description of the configuration, an example in which refrigeration cycle device 101 is provided with all of each temperature detecting portion and each pressure detecting portion, is described, but in control which will be described later, a detecting portion which does not use a detected value can be omitted.

Next, a control method of refrigeration cycle device 101 will be described. First, control when a general operation is performed will be described.

When a general operation is performed, the overheating degree of the working fluid at the suction portion of compressor 102, which is a temperature difference between suction temperature detecting portion 110d and evaporation temperature detecting portion 110c, is computed. In addition, expansion valve 104 is controlled so that the overheating degree becomes a target overheating degree (for example, 5K) determined in advance.

In addition, at a discharge portion of compressor 102, a discharge temperature detecting portion (not illustrated) is further provided, and it is possible to perform the control by using the detected vale. In this case, the overheating degree of the working fluid at the discharge portion of compressor 102, which is a temperature difference between the discharge temperature detecting portion and condensation temperature detecting portion 110a, is computed. In addition, expansion valve 104 is controlled so that the overheating degree becomes a target overheating degree determined in advance.

Next, control in a case where a possibility of occurrence of a disproportionation reaction increases, and a special operation state is achieved, will be described.

In the embodiment, in a case where a temperature detected value of condensation temperature detecting portion 110a becomes excessive, control of opening expansion valve 104, and decreasing the pressure and the temperature of the high-pressure side working fluid in the inside of refrigeration cycle device 101, is performed.

In general, it is necessary to perform the control so that a supercritical condition which exceeds a critical point (a point described as $T_{cri}$ in FIG. 15 which will be described later) is not achieved by the refrigerant excluding carbon dioxide. This is because, in a supercritical state, a material is placed in a state where either gas or liquid is not present, and the behavior thereof is unstable and active.

Here, in the embodiment, considering a temperature (critical temperature) at the critical point as one criterion, using the temperature, an opening degree of expansion valve 104 is controlled so that the condensation temperature does not approach approximately a value (5K) determined in advance. In addition, in a case where the working fluid (mixed refrigerant) containing R1123 is used, by using the critical temperature of the mixed refrigerant, the control is performed so that the temperature of the working fluid does not become equal to or greater than the critical temperature (−5° C.).

Figure 15:
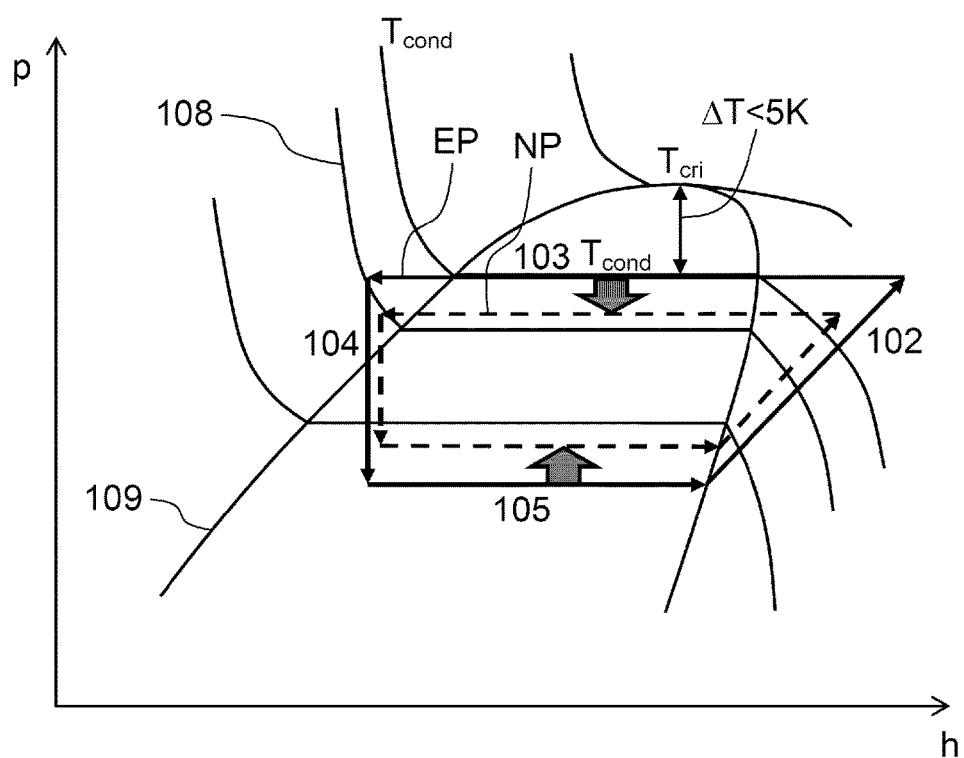
FIG. 15 is a Mollier diagram illustrating an operation of the refrigeration cycle device in the second embodiment of the present invention.

FIG. 15 is a Mollier diagram illustrating an operation of refrigeration cycle device 101 in the second embodiment of the present invention. In FIG. 15, isotherm 108 and saturation liquid line and saturation vapor line 109 are illustrated.

In FIG. 15, a refrigeration cycle which is under an excessive pressure condition which becomes a cause of occurrence of a disproportionation reaction, is illustrated by a solid line (EP), and a refrigeration cycle which is under a normal operation condition, is illustrated by a broken line (NP).

If a temperature value in condensation temperature detecting portion 110a provided in two-phase pipe of condenser 103 is equal to or less than 5K (EP in FIG. 15) with respect to the critical temperature stored in a control device in advance, the control device controls the opening degree of expansion valve 104 to be high. As a result, similar to NP of FIG. 15, since the condensation pressure which is on the high-pressure side of refrigeration cycle device 101 decreases, it is possible to suppress a disproportionation reaction which occurs due to an excessive pressure rise of the refrigerant, or to suppress the pressure rise even in a case where a disproportionation reaction occurs.

In addition, the above-described control method is a method for controlling the opening degree of expansion valve 104 by indirectly grasping the pressure in the inside of condenser 103 from the condensation temperature measured by condensation temperature detecting portion 110a. The method is particularly preferable since it is possible use the condensation temperature as a target instead of the condensation pressure in a case where the working fluid containing R1123 is azeotrope or pseudoazeotrope, and a temperature difference (temperature gradient) between a dew point and a boiling point of the working fluid containing R1123 in condenser 103, is zero or small.

<Modification Example 1 of Control Method>

In addition, as described above, by comparing the critical temperature and the condensation temperature, by indirectly detecting a high pressure state (the pressure of the refrigerant in the inside of condenser 103) of refrigeration cycle device 101, instead of the control method which commands an appropriate operation to expansion valve 104 or the like, based on the pressure which is directly measured, a method for controlling the opening degree of expansion valve 104 may be used.

Figure 16:
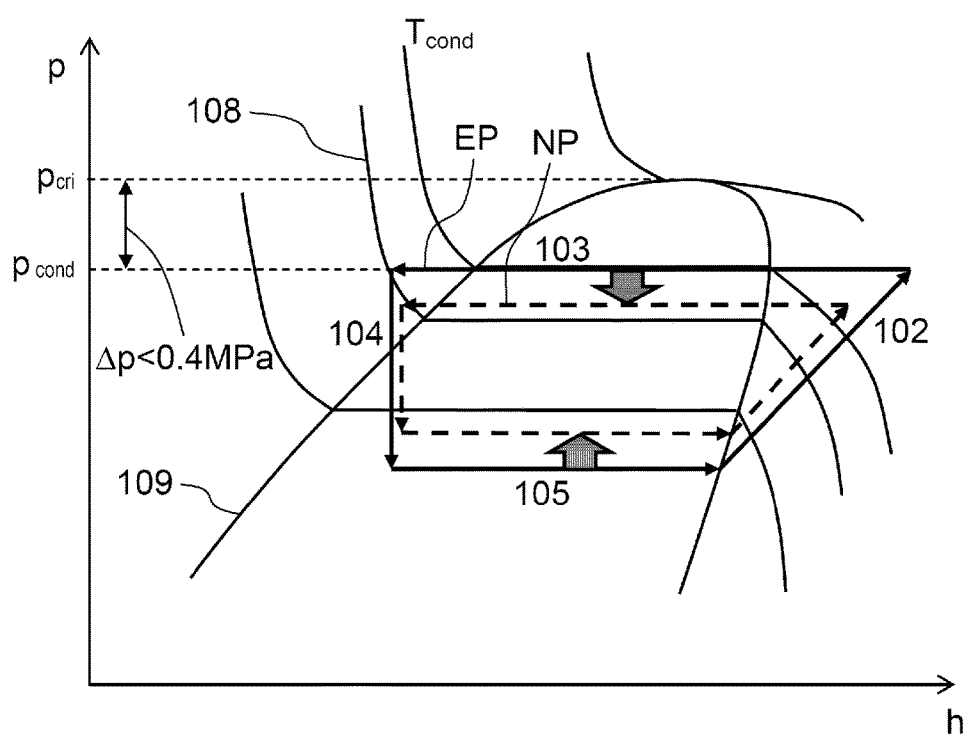
FIG. 16 is a Mollier diagram illustrating a control operation of Modification Example 1 in the second embodiment of the present invention.

FIG. 16 is a Mollier diagram illustrating a control operation of Modification Example 1 in the second embodiment of the present invention.

In FIG. 16, from the discharge portion of compressor 102 to the inlets of condenser 103 and expansion valve 104, the refrigeration cycle in a state where an excessive pressure rise continues to be generated, is illustrated by a solid line (EP), and the refrigeration cycle in a state which is out of the above-described excessive-pressure state, is illustrated by a broken line (NP).

In the operation, in a case where a pressure difference obtained by subtracting, for example, a pressure $P_{cond}$ at the outlet of condenser 103 detected by high-pressure side pressure detecting portion 115a from a pressure (critical pressure) $P_{cri}$ at the critical point stored in the control device in advance, is smaller than a value (for example, $\Delta p=0.4$ MPa) determined in advance (EP of FIG. 16), from the discharge port of compressor 102 to the inlet of expansion valve 104, by determining that a disproportionation reaction occurs in the working fluid containing R1123, or there is a concern about occurrence of a disproportionation reaction, the opening degree of expansion valve 104 is controlled to be high to avoid continuity under the high-pressure condition.

As a result, as illustrated by NP in FIG. 16, the refrigeration cycle in FIG. 16 acts on the high pressure (condensation pressure) to decrease, and it is possible to suppress the pressure rise that causes occurrence of a disproportionation reaction and occurs after a disproportionation reaction.

In the working fluid containing R1123, it is preferable to use the control method in a case of a non-azeotropic state, in particular, in a case where a temperature gradient is large in the condensation pressure.

<Modification Example 2 of Control Method>

In addition, instead of the control method using the above-described critical temperature or the critical pressure as a standard, a control method based on the overcooling degree may be used.

Figure 17:
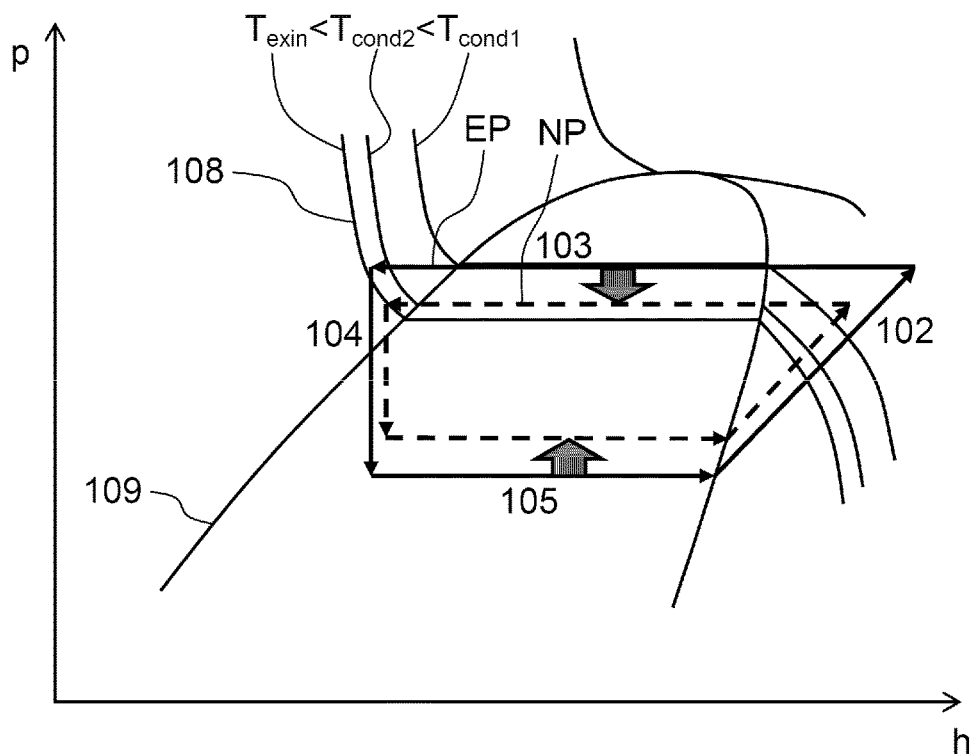
FIG. 17 is a Mollier diagram illustrating a control operation of Modification Example 2 of a control method of the refrigeration cycle device in the second embodiment of the present invention.

FIG. 17 is a Mollier diagram illustrating a control operation of Modification Example 2 of the control method of refrigeration cycle device 101 in the second embodiment of the present invention.

In FIG. 17, the refrigeration cycle which is under an excessive pressure condition which is a cause of occurrence of a disproportionation reaction, is considered as EP, and is illustrated by a solid line, and the refrigeration cycle which is under a normal operation is considered as NP, and is illustrated by a broken line.

In general, in refrigeration cycle device 101, by appropriately controlling the refrigeration cycle of expansion valve 104 or compressor 102, and by making the size of the heat exchanger and the refrigerant filling amount appropriate, the temperature of the refrigerant in the inside of condenser 103 is set so that the temperature increases by a certain degree with respect to the surrounding medium. In addition, in general, the overcooling degree is a value which is approximately 5K. Even in the working fluid which is similarly used in refrigeration cycle device 101 and contains R1123, similar measures are taken.

In refrigeration cycle device 101 in which the above-described measure is taken, if the pressure of refrigerant is excessively high, there is also a tendency for the overcooling degree of the inlet of expansion valve 104 to increase as illustrated by EP of FIG. 17. In addition, in the embodiment, considering the overcooling degree of the refrigerant of the inlet of expansion valve 104 as a standard, the opening degree of expansion valve 104 is controlled.

In addition, in the embodiment, considering the overcooling degree of the refrigerant at the inlet of expansion valve 104 when the normal operation is performed as 5K, using 15K which is three times the value as a criterion, the opening degree of expansion valve 104 is controlled. The overcooling degree which is a threshold value is three times the value, because there is a possibility that the overcooling degree changes within the range according to the operation condition.

Specifically, first, the overcooling degree is calculated from the detected value of condensation temperature detecting portion 110a and the detected value of condenser outlet temperature detecting portion 110b. The overcooling degree is a value obtained by subtracting the detected value of condenser outlet temperature detecting portion 110b from the detected value of condensation temperature detecting portion 110a. In addition, when the overcooling degree at the inlet of expansion valve 104 reaches the value (15K) determined in advance, an operation of controlling the opening degree of expansion valve 104 to be high is performed, and the condensation pressure at a high-pressure part of refrigeration cycle device 101 is controlled to decrease (from a solid line to a broken line of FIG. 17).

Since the decrease in condensation pressure is the same as the decrease in condensation temperature, the condensation temperature decreases from $T_{cond1}$ to $T_{cond2}$, and the overcooling degree at the inlet of expansion valve 104 decreases from $T_{cond1}$-$T_{exin}$ to $T_{cond2}$-$T_{exin}$ (here, a working fluid temperature of the inlet of expansion valve 104 does not change, and is $T_{exin}$). As described above, since the overcooling degree also decreases according to the decrease in condensation pressure in the inside of refrigeration cycle device 101, it is understood that the control in condensation pressure in the inside of refrigeration cycle device 101 is possible even in a case where the overcooling degree is considered as a standard.

Figure 18:
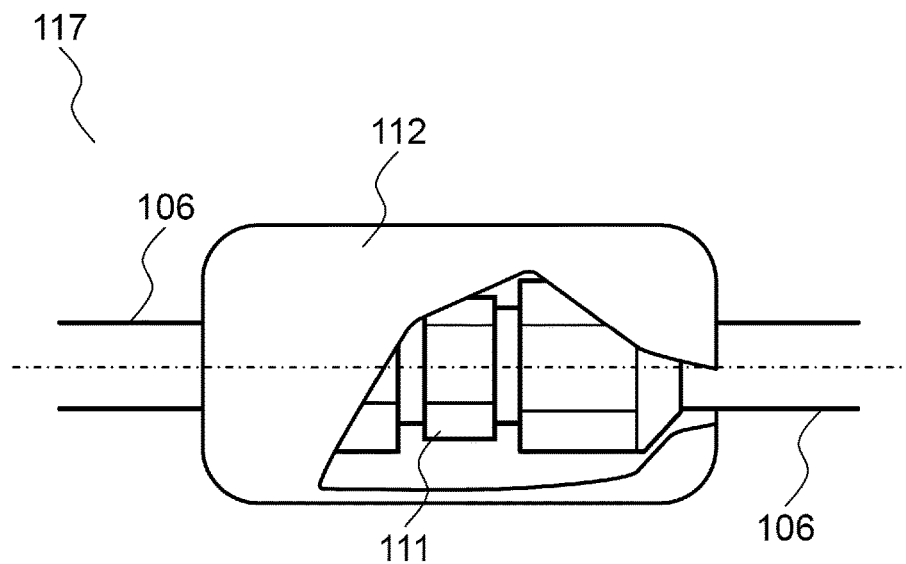
FIG. 18 is a view illustrating a piping joint which configures a part of piping of the refrigeration cycle device of the second embodiment of the present invention.

FIG. 18 is a view illustrating piping joint 117 which configures a part of the piping of refrigeration cycle device 101 of the second embodiment of the present invention.

In a case where refrigeration cycle device 101 of the present invention is used, for example, in home spilt type air conditioner (air conditioner), the refrigeration cycle device 101 is configured of an outdoor unit including an outdoor heat exchanger and an indoor unit including an indoor heat exchange. The outdoor unit and the indoor unit cannot be integrated with each other in the configuration. Accordingly, by using a mechanical joint which is illustrated in FIG. 18 similar to union flare 111, the outdoor unit and the indoor unit are connected to each other at an installation location.

If a connection state of the mechanical joint deteriorates due to a cause when the work is not sufficient, or the like, the refrigerant leaks from the joint part, and this causes the negative influence on the equipment performance. In addition, since the working fluid containing R1123 itself is greenhouse gas having a greenhouse effect, there is also a concern about a negative influence on global environment. Accordingly, the refrigerant leakage is rapidly detected and repaired.

Examples of a method for detecting the refrigerant leakage include a method of coating the part with a detection agent, and detecting whether or not bubbles are generated, and a method of using a detection sensor, but it takes time and effort in each method.

Here, in the embodiment, by winding seal 112 containing a polymerization promoter on an outer circumference of union flare 111, the detection of refrigerant leakage becomes easy, and reduction of leakage amount is achieved.

Specifically, in the working fluid containing R1123, when polymerization reaction occurs, generation of polytetrafluoroethylene which is one of a fluorinated carbon resin is used. Specifically, by intentionally bringing the working fluid containing R1123 and polymerization promoter into contact with each other at the location of leakage, at the location of leakage, polytetrafluoroethylene is configured to be extracted and solidified. As a result, since the leakage is likely to be detected easily and visually, it is possible to shorten the time which is taken for finding the leakage and performing the repair.

Furthermore, since a part at which polytetrafluoroethylene is generated is a part of leakage of the working fluid containing R1123, spontaneously, since a polymerization product is generated and adheres to a part at which the leakage is prevented, it is also possible to reduce the leakage amount.

(Third Embodiment)

Next, a third embodiment of the present invention will be described.

Figure 19:
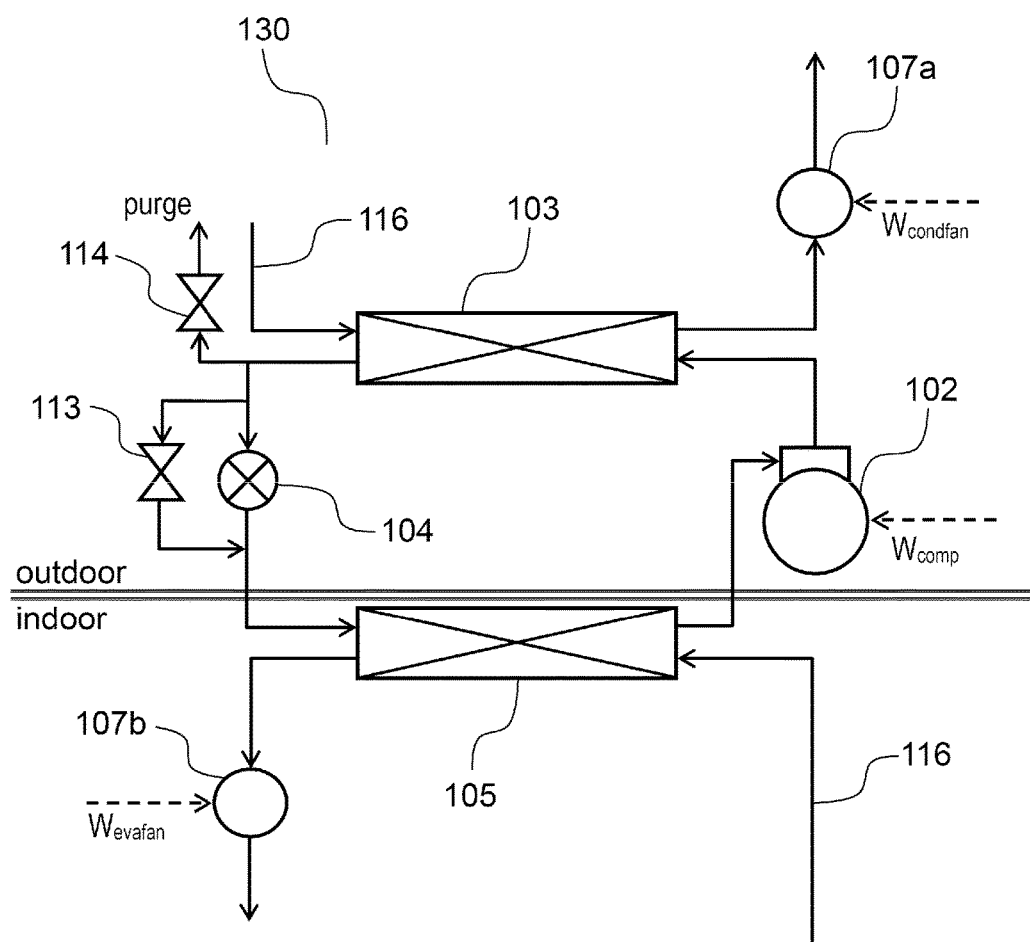
FIG. 19 is a view illustrating a configuration of a refrigeration cycle device according to a third embodiment of the present invention.

FIG. 19 is a view illustrating a configuration of refrigeration cycle device 130 according to a third embodiment of the present invention.

Refrigeration cycle device 130 illustrated in FIG. 19 and refrigeration cycle device 101 of the second embodiment, are different from each other in that bypass pipe 113 provided with an opening and closing valve, and is connected to the inlet and the outlet of expansion valve 104 is newly installed. In addition, refrigeration cycle device 130 and refrigeration cycle device 101 are also different from each other in that a purge line having relief valve 114 is provided between the outlet of condenser 103 and the inlet of expansion valve 104. The opening side of relief valve 114 is disposed outdoor. In addition, in FIG. 19, description of each temperature detecting portion and each pressure detecting portion which are described by using FIG. 14, is omitted.

By performing a control method (for example, a control method for controlling the opening degree of expansion valve 104 so that a value obtained by subtracting the working fluid temperature measured by the two-phase tube of condenser 103 from the critical temperature of the working fluid containing R1123 is equal to or greater than 5K, or a control method for performing the control so that a difference between the critical pressure of the working fluid and the pressure detected by high-pressure side pressure detecting portion 115a is equal to or greater than 0.4 MPa) described in the second embodiment, even in a case where the opening degree of expansion valve 104 is high, there is a possibility that a case where the decrease in pressure is not improved, or a situation in which a speed of decrease in pressure is desired to be raised, occur.

Here, in a case where the above-described situation is generated, by opening the opening and closing valve provided in bypass pipe 113 of the embodiment, and by allowing the refrigerant to flow to bypass pipe 113, the pressure of the working fluid on a high pressure side rapidly decreases and it is possible to suppress damage of refrigeration cycle device 130.

Furthermore, in addition to the control of increasing the opening degree of expansion valve 104, and the control of the opening and closing valve provided in bypass pipe 113, the control is more preferable since damage of refrigeration cycle device 130 is prevented if compressor 102 is emergency-stopped. In addition, in a case where compressor 102 is emergency-stopped, it is preferable not to stop fluid machineries 107a and 107b since the pressure of the working fluid on the high-pressure side rapidly decreases.

Even in a case where the above-described response is performed, a case where a disproportionation reaction is not suppressed, specifically, a case where a difference between the critical temperature of the working fluid and the condensation temperature detected by condensation temperature detecting portion 110a is less than 5K, or a case where a difference between the critical pressure of the working fluid and the pressure detected by high-pressure side pressure detecting portion 115a is less than 0.4 MPa, are assumed. In this case, since there is a concern that the pressure of the refrigerant in the inside of refrigeration cycle device 130 increases, a necessity of releasing the refrigerant of which the pressure is high to the outside, and preventing damage of refrigeration cycle device 130, is generated. Here, relief valve 114 which purges the working fluid containing R1123 in the inside of refrigeration cycle device 130 to an outer space, is controlled to open.

Here, it is preferable that an installation position of relief valve 114 in refrigeration cycle device 130 is on a high-pressure side. Furthermore, it is particularly preferable that relief valve 114 is installed from the outlet of condenser 103 illustrated in the embodiment to the inlet of expansion valve 104 (at this position, since the working fluid is in a high-pressure overcooling liquid state, a water hammering action which causes a result of rapid pressure rise according to a disproportionation reaction is likely to occur), or relief valve 114 is installed from the discharge portion of compressor 102 to the inlet of condenser 103 (at this position, since the working fluid is present in a high-temperature and high-pressure gas state, a molecular motion becomes active, and a disproportionation reaction is likely to occur).

Relief valve 114 is provided on the outdoor unit side. In this case, the aspect is called an aspect which is considered not to directly influence a human and commodity, since a configuration in which the working fluid is not emitted to a residential space on the indoor side in a case of the air conditioner, and the working fluid is not emitted to a product display side, such as a showcase, in a case of a freezing and refrigeration unit, is possible.

In addition, it is preferable to turn off a power source, for example, to open relief valve 114 and stop refrigeration cycle device 130, from the viewpoint of safety.

(Fourth Embodiment)

Next, a fourth embodiment of the present invention will be described.

Figure 20:
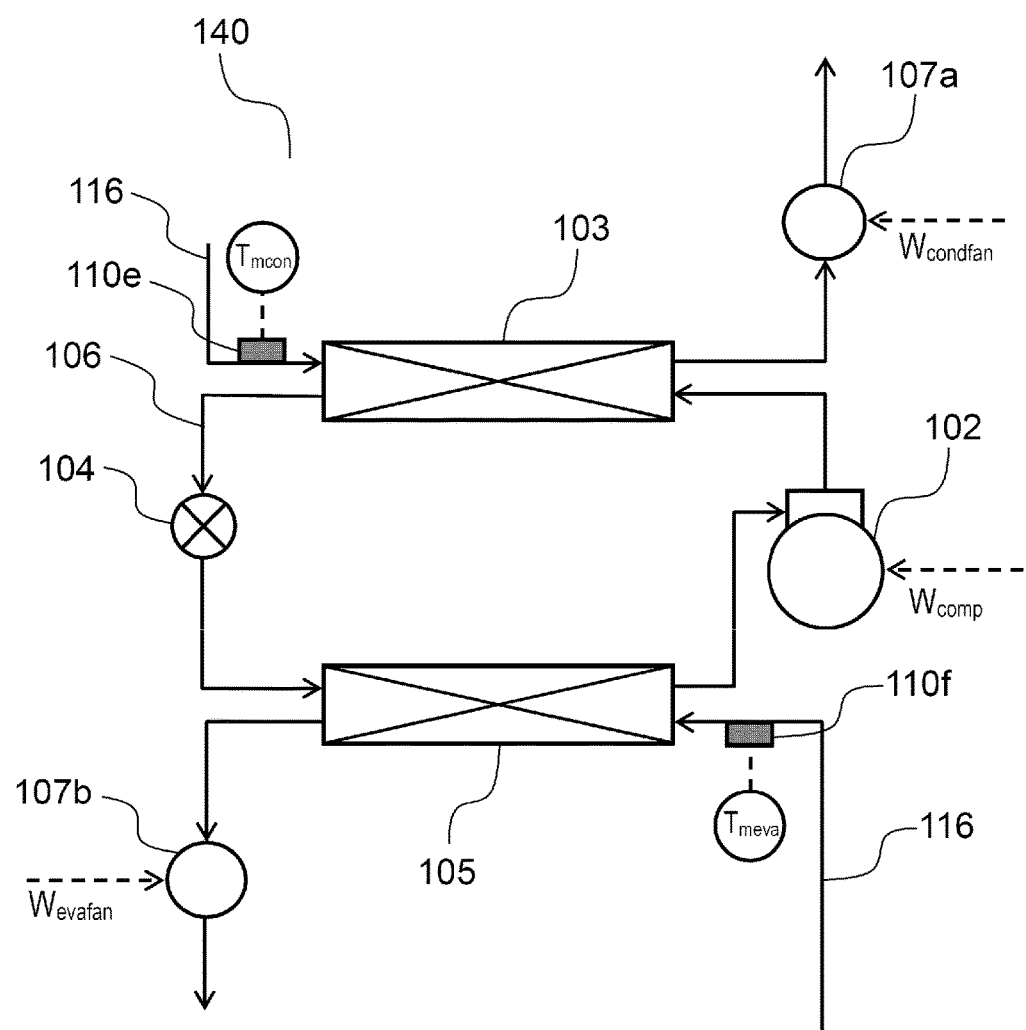
FIG. 20 is a view illustrating a configuration of a refrigeration cycle device according to a fourth embodiment of the present invention.

FIG. 20 is a view illustrating a configuration of refrigeration cycle device 140 according to the fourth embodiment of the present invention.

Refrigeration cycle device 140 illustrated in FIG. 20 and refrigeration cycle device 101 of the second embodiment are different from each other in that first medium temperature detecting portion 110e which detects the temperature of the first medium before flowing into condenser 103, and second medium temperature detecting portion 110f which detects the temperature of the second medium before flowing into evaporator 105, are provided. Furthermore, the detected values of each temperature detecting portion and each pressure detecting portion, and input power of compressor 102 and fluid machineries 107a and 107b, are stored in an electronic storage device (not illustrated) for a certain period of time.

Figure 21:
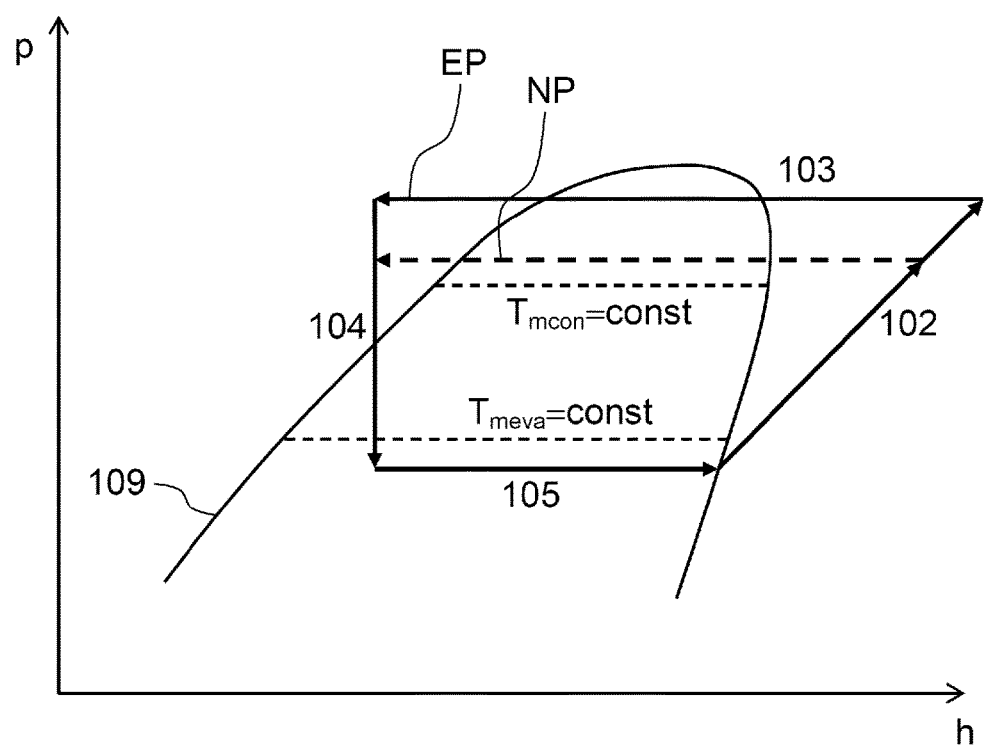
FIG. 21 is a view illustrating an operation of the refrigeration cycle device of the fourth embodiment of the present invention in a Mollier diagram.

FIG. 21 is a view illustrating an operation of refrigeration cycle device 140 of the fourth embodiment of the present invention in a Mollier diagram.

In FIG. 21, the refrigeration cycle illustrated by EP is the condensation pressure when a disproportionation reaction occurs, and the refrigeration cycle illustrated by NP indicates the refrigeration cycle when the normal operation is performed. In addition, in FIG. 21, in order to make the description simple, a cycle change (example: a difference in evaporation pressures between NP and EP) when the condensation pressure increases is not described.

As a reason of a rapid increase in the condensation temperature of the working fluid containing R1123 which is measured in the two-phase pipe in the inside of condenser 103, (1) a rapid increase in surrounding medium temperatures $T_{mcon}$ and $T_{meva}$, (2) a pressure rise action due to an increase in power of compressor 102, and (3) a change in flow (a change in power of any of fluid machineries 107a and 107b which drives the surrounding medium) of the surrounding medium, are considered. In addition, as a specific phenomenon of the working fluid containing R1123, (4) a pressure rise action due to a disproportionation reaction is employed. Here, in the embodiment, in order to specify that a disproportionation reaction occurs of (4), the control is performed after determining that phenomenon of (1) to (3) does not occur.

Here, in the control method of the embodiment, in a case where an amount of change in the condensation temperature of the working fluid containing R1123 with respect to an amount of change in temperature or input power of (1) to (3), expansion valve 104 is controlled to open.

Hereinafter, a specific control method will be described. First, since it is difficult to compare the amount of change in temperature and the amount of change in input power value with each other under the same standard, when measuring the amount of change in temperature, the input power is controlled not to change. In other words, when measuring the amount of change in temperature, a motor rotation speed of compressor 102 and fluid machineries 107a and 107b are maintained to be constant.

For example, the amount of change in temperature is measured at a certain time interval, for example, for 10 seconds to 1 minute. Before the measurement, for example, approximately 10 seconds to 1 minute ago, the amount of input power of compressor 102 and fluid machineries 107a and 107b is controlled to be maintained to a certain value. At this time, an amount of change per unit time of the amount of input power of compressor 102 and fluid machineries 107a and 107b substantially becomes zero. Here, the amount is "substantially" zero because a change in a suctioned state of compressor 102 due to deviation of refrigerant in compressor 102, or a slight change in input power due to influence of blowing of wind or the like in a case where the first medium and the second medium are surrounding air in fluid machineries 107a and 107b, are generated. In other words, the "substantially zero" means that the amount of change includes a slight behavior and is smaller than a predetermined value determined in advance.

Under the above-described condition, in a case where the amount of change per unit time of the condensation temperature measured by condensation temperature detecting portion 110a is greater than any of the amount of change per unit time of the temperature of the first medium detected by first medium temperature detecting portion 110e, and the amount of change per unit time of the temperature of the second medium detected by second medium temperature detecting portion 110f, it is considered that a disproportionation reaction occurs, expansion valve 104 is controlled to open.

In addition, only in controlling the opening degree of expansion valve 104, to be prepared for a case where the pressure rise generated according to a disproportionation reaction cannot be controlled, similar to the third embodiment, bypass pipe 113 may be provided in parallel with expansion valve 104, compressor 102 may be emergency-stopped, and further, means, such as relief valve 114, which reduces the pressure by emitting the refrigerant to the outside may be provided.

In addition, in the embodiment, a control example of expansion valve 104 in which control is performed considering the amount of change of the temperature detecting portion installed in the two-phase pipe of condenser 103 as a standard, but an amount of change in pressure at any point from the discharge portion of compressor 102 to the inlet of expansion valve 104 may be considered as a standard, and an amount of change in overcooling degree of the inlet of expansion valve 104 may be considered as a standard.

In addition, using the embodiment being combined with any of the above-described second embodiment or the third embodiment, is preferable since it is possible to further improve the reliability.

(Fifth Embodiment)

Next, a fifth embodiment of the present invention will be described.

Figure 22:
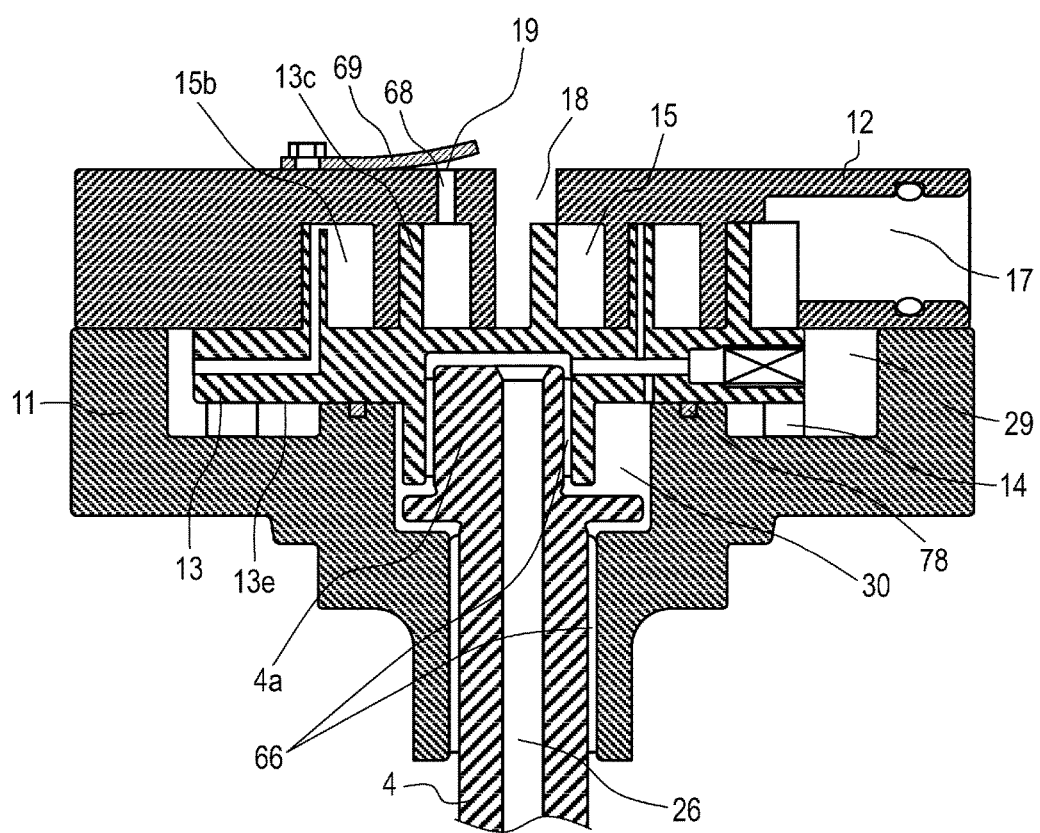
FIG. 22 is a view in which main portions of a compression mechanism portion of a scroll compressor according to a fifth embodiment of the present invention are enlarged.

FIG. 22 is a view in which main portions of compression mechanism portion 2 of scroll compressor 200 according to the fifth embodiment of the present invention are enlarged.

Since the embodiment is the same as the first embodiment except the presence and absence of reed valve 19 provided in discharge hole 18, description of configurations other than this will be omitted.

In the first embodiment, similar to bypass hole 68, reed valve 19 (check valve) is provided in discharge hole 18, but in the embodiment, reed valve 19 is not provided in discharge hole 18. Therefore, discharge chamber 31 always communicates with compression chamber 15 in the vicinity thereof via discharge hole 18, and discharge chamber 31 and compression chamber 15 are placed in a substantially same pressure state. In addition, in the embodiment, since reed valve 19 is not provided in discharge hole 18, valve stop 69 is also not provided, either.

Since a condition in which a disproportionation reaction is particularly likely to occur is a condition under an excessive high temperature and high pressure, there is a case where a state where the condition is not a predetermined operation condition, for example, a state where the refrigerant piping in the refrigeration cycle circuit is blocked, blowing of the condenser is stopped, and the discharge pressure (high-pressure side of the refrigeration cycle circuit) excessively increases due to forgetting of opening of two-way valve or three-way valve, or a state where the compression mechanism does not perform compression work of increasing the pressure of the refrigerant due to insufficient torque of an electric motor (motor portion 3) of the compressor, is generated.

Under the condition, when the power continues to be supplied to scroll compressor 200, a current is excessively supplied to the electric motor which configures scroll compressor 200, and the electric motor generates heat. As a result, the electric motor in scroll compressor 200 is used as a heating element with respect to the refrigerant, and the pressure and the temperature of the refrigerant in the inside excessively increases. As a result, an insulator of the winding wire which configures a stator of the electric motor is dissolved, core wires (conducting wire) of the winding wire come into contact with each other, and a phenomenon which is called layer short-circuit occurs. Since high energy is instantaneously transferred to the surrounding refrigerant, the layer short-circuit can become a starting point of a disproportionation reaction.

Here, in the embodiment, even in a case where the power continues to be supplied to the electric motor while the compression mechanism does not perform a pressure rise operation, an aspect in which the pressure rise of airtight container 1 which accommodates the electric motor, that is, on the high-pressure side of the refrigeration cycle, is suppressed, and a condition of occurrence of a disproportionation reaction is avoided by the pressure, is achieved. Specifically, discharge chamber 31 is configured to always communicate with compression chamber 15 in the vicinity via discharge hole 18.

As described above, according to the embodiment, in a case where the power continues to be supplied to the electric motor while the compression mechanism does not perform the compression operation, the electric motor heats the refrigerant in the inside of airtight container 1 as a heating element. However, for example, even when the pressure of the refrigerant increases due to the heating, the pressure acts on compression chamber 15 via discharge hole 18, it is possible to release the pressure in the inside of airtight container 1 to the low-pressure side of the refrigeration cycle circuit by reversely rotating the compression mechanism, and therefore, it is possible to avoid an abnormal pressure rise which becomes a condition of occurrence of a disproportionation reaction.

As described above, in a first aspect illustrated from the first embodiment to the fifth embodiment of the present invention, a compression chamber which is formed in both directions by meshing the fixed scroll and the revolving scroll in which a spiral lap from the end plate rises with each other by using a refrigerant containing 1,1,2-trifluoroethylene as a working fluid, and by using the polyol ester oil as a compressor lubricating oil, is provided. In addition, at the center position of the end plate of the fixed scroll, the discharge hole which is open to the discharge chamber, and the bypass hole which communicates with the compression chamber and the discharge chamber before the compression chamber communicates with the discharge hole, on the end plate of the fixed scroll. Furthermore, in the bypass hole, the check valve which allows the flow from the compression chamber side to the discharge chamber side is provided.

According to this configuration, since it is possible to suppress the temperature rise due to excessive compression in the refrigerant immediately before being ejected from the discharge hole, it is possible to suppress a disproportionation reaction of R1123. In addition, since a carbonyl group of the polyol ester oil captures the radicals that become a cause of start of a disproportionation reaction, it is possible to suppress a disproportionation reaction of R1123.

In addition, a plurality of bypass holes may be provided. Accordingly, a section in which the bypass hole and the compression chamber communicate with each other becomes a wider range, and only by the total area of flow path of the bypass hole which is effective at the same time, it is possible to reduce each resistance of the flow path, and it is possible to obtain an effect of reliably suppressing the temperature rise caused by the excessive compression.

In addition, among the bypass holes, at least one bypass hole may be a circular communication hole. Accordingly, it is possible to minimize the resistance of the flow path with respect to the area of the bypass hole, and to obtain an effect of further suppressing the temperature rise caused by the excessive compression.

In addition, among the bypass holes, at least one bypass hole may be provided at a position at which the bypass hole is open in any of the first compression chamber which is formed on the lap outer wall side of the revolving scroll, or the second compression chamber which is formed on the lap inner wall side of the revolving scroll.

Accordingly, each of the compression chambers reaches the discharge pressure, and opens the check valve of a bypass hole, the bypass hole can be provided at an appropriate position, and it is possible to obtain an effect of minimizing the temperature rise caused by the excessive compression.

In addition, among the bypass holes, at least one bypass hole may be provided at a position at which the bypass hole is open in both of the first compression chamber which is formed on the lap outer wall side of the revolving scroll and the second compression chamber which is formed on the lap inner wall side of the revolving scroll, and the bypass hole may have a size and a shape which is not open in the first and second compression chambers at the same time.

Accordingly, the first compression chamber and the second compression chamber communicate with each other via the bypass hole, the working refrigerant re-expands from the pressure difference, and it is possible to prevent the temperature in the inside of the compression chamber from increasing.

In addition, among the bypass holes, when a diameter of bypass hole is D and a length in the thickness direction of the end plate is L, at least one bypass hole may be configured to be D/L is in a range of 2.4 to 7.2.

Accordingly, it is possible to provide a compressor which optimize a ratio between loss in pressure of the working refrigerant that communicates with the bypass hole, and loss caused by re-expansion of the working fluid in the inside of the bypass hole, and which high efficiently suppresses the temperature rise in the inside of the compression chamber.

Next, a second aspect may be a configuration in which the check valve is the reed valve provided on the end plate surface of the fixed scroll in the check valve in the first aspect.

Accordingly, compared to the check valve provided with a spring or the like in the inside of the bypass hole, it is possible to obtain an effect of suppressing the resistance of the flow path and thereby suppressing the temperature rise caused by the excessive compression.

In addition, in a third aspect, in the first aspect or the second aspect, the working fluid may be a mixed working fluid containing difluoromethane, and difluoromethane may be 30% by weight to 60% by weight. In addition, the working fluid may be a mixed working fluid containing tetrafluoroethane, and tetrafluoroethane may be 30% by weight to 60% by weight. In addition, the working fluid may be a mixed working fluid containing difluoromethane and tetrafluoroethane, and difluoromethane may be mixed with tetrafluoroethane, and proportions of difluoromethane and tetrafluoroethane may be 30% by weight to 60% by weight.

According to this, it is possible to suppress a disproportionation reaction of R1123, and to improve a refrigeration performance or COP.

In a fourth aspect, in any one aspect among the first to third aspects, the polyol ester oil may be at least one type selected from the group of neopentylglycol, trimethylolpropane, pentaerythritol, and dipentaerythritol as a constituent alcohol.

According to this, since it is possible to freely adjust viscosity of the refrigerator oil, it is possible to ensure the oil film between the vane and the piston, and to suppress generation of sliding heat.

In a fifth aspect, in any one aspect among the first to third aspects, the polyol ester oil may contain the phosphate ester anti-wear agent.

Accordingly, by reducing wear as the anti-wear agent is adsorbed to the front surface of the sliding portion, it is possible to suppress heat generation, and to suppress self-degradable reaction of the refrigerant R1123.

In a sixth aspect, in any one aspect of the first to third aspects, the polyol ester oil may contain the phenolic antioxidant.

According to this, since the phenolic antioxidant rapidly captures the radicals generated by the sliding portion, it is possible to prevent the radicals from reacting to the refrigerant R1123.

In a seventh aspect, in any one of the first to third aspects, the polyol ester oil may be lubricating oil which is obtained by a mixing lubricating oil having a higher viscosity than that of a base oil with a terpene type or a terpenoid type of which an amount is equal to or greater than 1% and less than 50%, or is obtained by mixing a lubricating oil having a super-high viscosity of which an amount is equal to or greater than that of a terpene type or a terpenoid type in advance therewith, and by mixing an oil additive of which the viscosity is adjusted to be equivalent to that of the base oil with the base oil.

According to this, it is possible to suppress a disproportionation reaction of R1123.

In an eighth aspect, in any one of the first to third aspects, a motor portion which drives the revolving scroll may be provided, and the motor portion may use an electrical wire which is obtained by coating a conductor with the thermosetting insulating material and baking with the insulating film therebetween, as a coil.

According to this, by coating the winding wire of the coil for the electric motor in the compressor with the thermosetting insulating material, while maintaining high resistance between the winding wire even in a state where the coil infiltrates into the liquid refrigerant, it is possible to suppress the discharge, and as a result, to suppress decomposition of the refrigerant R1123.

In a ninth aspect, in any one of the first to third aspects, an airtight container which accommodates the compression chamber and the motor portion therein, may be provided, and the airtight container may include a power supply terminal which is installed in a mouth portion via the insulating member, and the connection terminal for connecting the power supply terminal to a lead wire. In addition, the doughnut-like insulating member which adheres to the insulating member may be pipe-connected to the power supply terminal on an inner side of the airtight container.

According to this, since the insulating member is added to the power supply terminal on the inner side of the metal housing, by extending the shortest distance between conductors, it is possible to suppress an insulation defect of the power supply terminal, and to prevent ignition due to the discharge energy of R1123. In addition, it is possible to prevent a hydrogen fluoride generated when R1123 is decomposed from coming into contact with a glass insulating material, and to prevent the glass insulating material from corroding and being damaged.

In a tenth aspect, in the first to ninth aspects, the refrigeration cycle device is a refrigeration cycle device, in which the compressor of any one of aspects; the condenser which cools a refrigerant gas that is compressed by the compressor and has a high pressure; the throttle mechanism which reduces the pressure of the high-pressure refrigerant which is liquefied by the condenser; and the evaporator which gasifies the refrigerant of which the pressure is reduced by the throttle mechanism, are linked to each other by the piping.

According to this, it is possible to suppress a disproportionation reaction of R1123, to improve a refrigeration performance and COP.

In an eleventh aspect, in the tenth aspect, the condensation temperature detecting portion provided in the condenser may be provided, and a difference between the critical temperature of the working fluid and the condensation temperature detected by the condensation temperature detecting portion may control the opening degree of the throttle mechanism to become equal to or greater than 5K.

According to this, by making the working fluid temperature measured by the temperature detecting portion correspond to the pressure, it is possible to suppress the opening degree of the throttle mechanism to limit the working fluid temperature (pressure) on a high-pressure side to be equal to or greater than 5K considering a margin of safety from the critical pressure. Accordingly, since it is possible to prevent the higher condensation pressure from excessively increasing, as a result (result in which the distance by which the molecules approach each other), it is possible to suppress a disproportionation reaction which suppresses a disproportionation reaction which is a concern to be generated, and to ensure the reliability of the device.

In a twelfth aspect, in the tenth aspect, the high-pressure side pressure detecting portion provided between the discharge portion of the compressor and the inlet of the throttle mechanism, may be provided, and the difference between the critical pressure of the working fluid and the pressure detected by the high-pressure side pressure detecting portion may control the degree of the throttle mechanism to be equal to or greater than 0.4 MPa.

According to this, regarding the working fluid containing R1123, in particular, in a case where a non-zeotropic refrigerant having a large temperature gradient is used, it is possible to more accurately detect the pressure of the refrigerant, and further, to decrease the pressure (condensation pressure) on the high-pressure side in the refrigeration cycle device by performing the control of the opening degree of the throttle mechanism by using the detection result. Accordingly, it is possible to suppress a disproportionation reaction, and to improve the reliability of the device.

In a thirteenth aspect, in the tenth aspect, the condenser outlet temperature detecting portion provided between the condenser and the throttle mechanism may be provided, and may control the opening degree of the throttle mechanism so that the difference between the condensation temperature detected by the condensation temperature detecting portion and the condenser output temperature detected by the condenser outlet temperature detecting portion is equal to or less than 15K.

According to this, by using the detection result of the overcooling degree illustrated by the difference between the condensation temperature detecting portion and the condenser outlet temperature detecting portion, it is possible to perform the control of the opening degree of the throttle mechanism, and to prevent the pressure of the working fluid in the inside of the refrigeration cycle device from excessively increasing. Accordingly, it is possible to suppress a disproportionation reaction, and to improve the reliability of the device.

In a fourteenth aspect, in the tenth aspect, the first transporting portion which transports the first medium that exchanges the heat in the condenser, a second transporting portion which transports the second medium that exchanges the heat in the evaporator, the condensation temperature detecting portion which is provided in the condenser, the first medium temperature detecting portion which detects the temperature of the first medium before flowing into the condenser, and the second medium temperature detecting portion which detects the temperature of the second medium before flowing into the evaporator, are provided. In addition, a case where at least any one of the amount of change per unit time of the input of the compressor, the amount of change per unit time of the input of the first transporting portion, and the amount of change per unit time of the input of the second transporting portion, is smaller than a predetermined value determined in advance. In addition, in a case where the amount of change per unit time of the temperature of the first medium detected by the first medium temperature detecting portion is greater than any one of the amount of change per unit time of the condensation temperature detected by the condensation temperature detecting portion, and the amount of change per unit time of the temperature of the second medium detected by the second medium temperature detecting portion, the throttle mechanism may be controlled in the opening direction.

According to this, in a case where an aspect of the surrounding medium does not change, and in a case where the condensation temperature rapidly changes, since it is considered that the pressure increases due to a disproportionation reaction, the opening degree of the throttle mechanism can be controlled to be high. Accordingly, it is possible to improve the reliability of the device.

In a fifteenth aspect, in any one of the tenth to fourteenth aspects, the outer circumference of the joint of the piping which configures the refrigeration cycle circuit may be covered with a sealing compound containing the polymerization promoter.

According to this, in a case where the working fluid leaks from the joint, the polymerization product is generated as polymerization reaction is performed with respect to the polymerization promoter contained in the sealing compound and the working fluid containing R1123. Accordingly, the leakage is likely to be visually confirmed, the polymerization product acts to prevent the flow of the refrigerant emitted to the outside, and it is possible to suppress the leakage of the refrigerant.

In a sixteenth aspect, in any one of the first to ninth aspects, the discharge chamber may always communicate with the compression chamber via the discharge hole.

According to this, the power is supplied to the electric motor while the compression mechanism does not perform the compression operation, the electric motor heats the refrigerant in the inside of the airtight container as the heat element, and even when the pressure of the refrigerant increases, the pressure acts on the compression chamber via the discharge hole, and the pressure in the inside of the airtight container is released to the low-pressure side of the refrigeration cycle circuit by reversely rotating the compression mechanism. Therefore, it is possible to avoid the abnormal pressure rise which becomes a condition of occurrence of a disproportionation reaction.

(Sixth Embodiment)

Next, a sixth embodiment of the present invention will be described.

Figure 23:
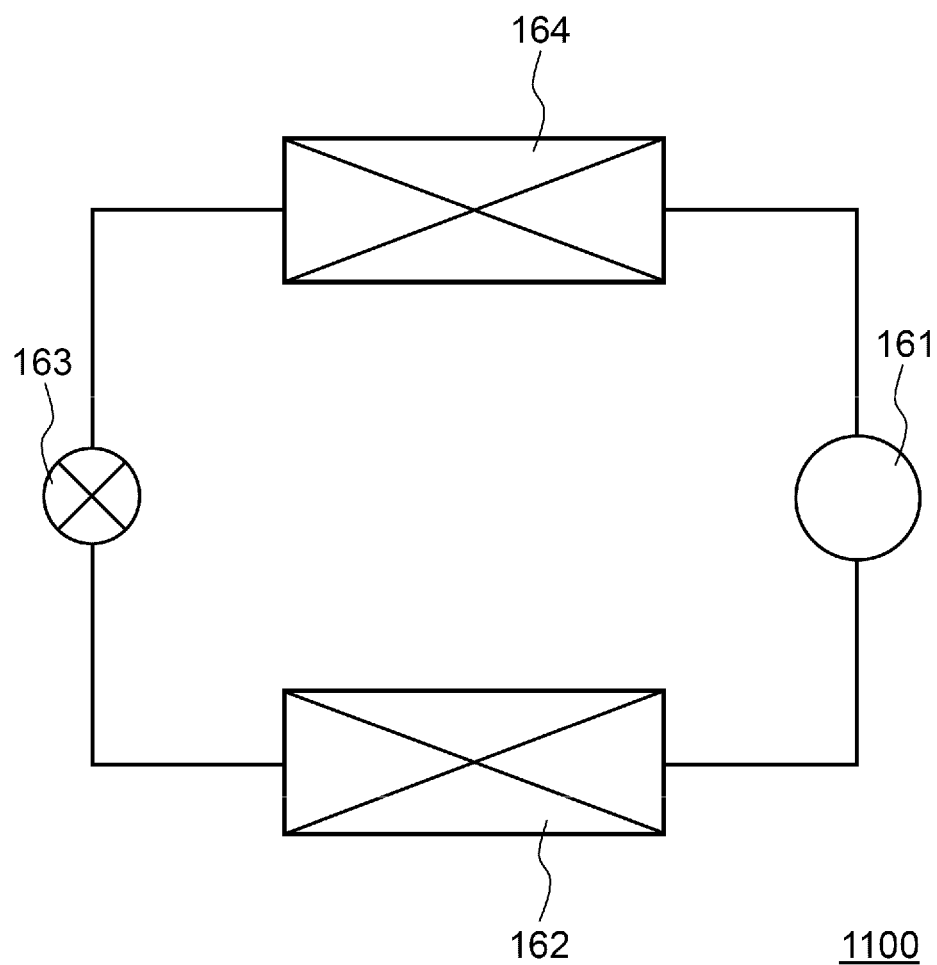
FIG. 23 is a system configuration view of a refrigeration cycle device which uses a compressor according to a sixth embodiment of the present invention.

FIG. 23 is a system configuration view of refrigeration cycle device 1100 which uses compressor 161 according to the sixth embodiment of the present invention.

As illustrated in FIG. 23, refrigeration cycle device 1100 of the embodiment is mainly configured of compressor 161, condenser 162, throttle mechanism 163, and evaporator 164, for example, in a case of a cycle exclusively for cooling. In addition, the equipment is linked to each other so that a working fluid (refrigerant) circulates by piping.

In refrigeration cycle device 1100 configures as described above, the refrigerant changes to liquid by at least any of pressurizing and cooling, and changes to gas by at least any of pressurizing and heating. Compressor 161 is driven by the motor, and transports the low-temperature and low-pressure gas refrigerant to condenser 162 by pressurizing the refrigerant to the high-temperature and high-pressure gas refrigerant. In condenser 162, the high-temperature and high-pressure gas refrigerant is cooled by air blown by a fan or the like, is condensed, and becomes the low-temperature and high-pressure liquid refrigerant. The pressure of the liquid refrigerant is reduced by throttle mechanism 163, a part of the liquid refrigerant becomes the low-temperature and low-pressure gas refrigerant, a remaining part becomes the low-temperature and low-pressure liquid refrigerant, and the liquid refrigerant is transported to evaporator 164. In evaporator 164, the low-temperature and low-pressure liquid refrigerant is heated and evaporated by the air blown by the fan or the like, becomes the low-temperature and low-pressure gas refrigerant, is suctioned to compressor 161 again, and is pressurized. The cycle is repeatedly performed.

In addition, in the description above, refrigeration cycle device 1100 exclusively for cooling is described, but by using reversing valve or the like, it is certainly possible to operate refrigeration cycle device as a cycle device for heating.

In addition, it is desirable that the heat transfer pipe which configures the refrigerant flow path of the heat exchanger in at least any of condenser 162 and evaporator 164, is the aluminum refrigerant pipe including aluminum or aluminum alloy. In particular, it is desirable that the heat transfer pipe is the flattened pipe provided with the plurality of refrigerant flows hole on a condition that the condensation temperature decreases or the evaporation temperature increases.

The working fluid (refrigerant) which is sealed in refrigeration cycle device 1100 of the embodiment is a two-component mixed working fluid made of (1) R1123 (1,1,2-trifluoroethylene) and (2) R32 (difluoromethane), and in particular, is a mixed working fluid in which there is 30% by weight to 60% by weight of R32.

In a case of employment to scroll compressor 1200 which will described later, by mixing 30% by weight or more of R32 with R1123, it is possible to suppress a disproportionation reaction of R1123. As a concentration of R32 increases, it is possible to further suppress a disproportionation reaction. This is because it is possible to suppress a disproportionation reaction of R1123 by an action of reducing a chance of a disproportionation reaction due to integrated behaviors during a phase change, such as condensation and evaporation since an action of R32 for mitigating a disproportionation reaction by small polarization to a fluorine atom, and physical properties of R1123 and R32 are similar to each other.

In addition, the mixed refrigerant of R1123 and R32 can be handled as a single refrigerant since the mixed refrigerant of R1123 and R32 has an azeotropic point when R32 is 30% by weight and R1123 is 70% by weight, and the temperature does not slip. In addition, when 60% by weight or more of R32 is mixed with R1123, the temperature slide increases, and since there is a possibility that it is difficult to handle the single refrigerant in a similar manner, it is desirable to mix 60% by weight or less of R32 with R1123. In particular, in order to prevent disproportionation, to further reduce the temperature slide when approaching the azeotropic point, and to easily design the equipment, it is desirable that R32 is mixed at a ratio of 40% by weight to 50% by weight with R1123.

FIGS. 24 and 25 are views comparing R410A and R1123 with each other by computing a refrigeration performance in a case where a pressure and a temperature in the refrigeration cycle, and a displacement volume of the compressor are the same, and cycle efficiency (COP), at proportions of 30% by weight to 60% by weight of R32, in a mixed working fluid of R1123 and R32 in the sixth embodiment of the present invention.

First, the computation condition of FIGS. 24 and 25 will be described. In recent years, in order to improve the cycle efficiency of the equipment, the performance of the heat exchanger is improved, and in an actual operation state, there is a tendency for the condensation temperature to decrease, and for the evaporation temperature to increase, and there is also a tendency for the discharge temperature to decrease. Therefore, considering the actual operation condition, the cooling computation condition of FIG. 24 is a condition which corresponds to the time when the cooling operation of the air conditioner (the indoor dry-bulb temperature is 27° C., the wet-bulb temperature is 19° C., and the outdoor dry-bulb temperature is 35° C.) is performed, and the evaporation temperature is 15° C., the condensation temperature is 45° C., the overheating degree of suctioned refrigerant of the compressor is 5° C., and the overcooling degree of an outlet of the condenser is 8° C.

In addition, the heating computation condition of FIG. 25 is a computation condition which corresponds to the time when the heating operation of the air conditioner (the indoor dry-bulb temperature is 20° C., the outdoor dry-bulb temperature is 7° C., and the dry-bulb temperature is 6° C.) is performed, the evaporation temperature is 2° C., the condensation temperature is 38° C., the overheating degree of suctioned refrigerant of the compressor is 2° C., and the overcooling degree of an outlet of the condenser is 12° C.

As illustrated in FIGS. 24 and 25, by mixing R32 at a ratio of 30% by weight to 60% by weight with R1123, when performing the cooling operation and the heating operation, comparing with R410A, it is ascertained that a refrigeration performance increases approximately by 20%, the cycle efficiency (COP) is 94 to 97%, and the global warming potential can be reduced to 10 to 20% of R410A.

As described above, in a two-component system of R1123 and R32, when comprehensively considering prevention of disproportionation, the size of temperature slide, a performance when the cooling operation is performed and when the heating operation is performed, and COP (that is, when specifying the proportions employed in the air conditioner which uses scroll compressor 1200 that will be described later), the mixture containing R32 at a ratio of 30% by weight to 60% by weight is desirable. More desirably, the mixture containing R32 at a ratio of 40% by weight to 50% by weight is desirable.

<Modification Example 1 of Working Fluid>

In addition, the working fluid sealed in refrigeration cycle device 1100 of the embodiment is a two-component mixed working fluid made of (1) R1123 (1,1,2-trifluoroethylene) and (2) R125 (tetrafluoroethane), and in particular, is a mixed working fluid in which there is 30% by weight to 60% by weight of R125.

In a case of employment to scroll compressor 1200 which will described later, by mixing 30% by weight or more of R125 with R1123, it is possible to suppress a disproportionation reaction of R1123. As a concentration of R125 increases, it is possible to further suppress a disproportionation reaction. This is because it is possible to suppress a disproportionation reaction of R1123 by an action of reducing a chance of a disproportionation reaction due to integrated behaviors during a phase change, such as condensation and evaporation since an action of R125 for mitigating a disproportionation reaction by small polarization to a fluorine atom, and physical properties of R1123 and R125 are similar to each other. In addition, since R125 is a nonflammable refrigerant, R125 can reduce flammability of R1123.

FIGS. 26 and 27 are views comparing R410A and R1123 with each other by computing a refrigeration performance in a case where a pressure and a temperature in the refrigeration cycle, and a displacement volume of the compressor are the same, and cycle efficiency (COP), at proportions of 30% by weight to 60% by weight of R125, in a mixed working fluid of R1123 and R125 in the sixth embodiment of the present invention. In addition, each of the computation conditions of FIGS. 26 and 27 is similar to those of FIGS. 24 and 25.

As illustrated in FIGS. 26 and 27, by mixing R125 at a ratio of 30% by weight to 60% by weight with R1123, comparing with R410A, it is ascertained that a refrigeration performance increases by 96% to 110%, and the cycle efficiency (COP) is 94 to 97%.

In particular, by mixing R125 at a ratio of 40% by weight to 50% by weight with R1123, since disproportionation of R1123 can be prevented and the discharge temperature can be lowered, a design of the equipment when the high-load operation is performed and when freezing and refrigerating are performed for increasing the discharge temperature becomes easy. Furthermore, the global warming potential can be reduced to 50 to 100% of R410A.

As described above, in a two-component system of R1123 and R125, when comprehensively considering prevention of disproportionation, reduction of flammability, a performance when the cooling operation is performed and when the heating operation is performed, COP, and the discharge temperature (that is, when specifying the proportions employed in the air conditioner which uses scroll compressor 1200 that will be described later), a mixture containing R125 at a ratio of 30% by weight to 60% by weight is desirable. More desirably, a mixture containing R125 at a ratio of 40% by weight to 50% by weight is desirable.

<Modification Example 2 of Working Fluid>

In addition, the working fluid sealed in the refrigeration cycle device of the embodiment may be a three-component mixed working fluid made of (1) R1123 (1,1,2-trifluoroethylene), (2) R32 (difluoromethane), and (3) R125 (tetrafluoroethane). In particular, the working fluid is a mixed working fluid in which the proportions of R32 and R125 is equal to or greater than 30% and less than 60% by weight, and the proportions of R1123 is equal to or greater than 40% by weight and less than 70% by weight.

In a case of employment to the scroll compressor 1200 which will described later, by making proportions of R32 and R125 be equal to or greater than 30% by weight, it is possible to suppress a disproportionation reaction of R1123. In addition, as proportions of R32 and R125 increases, it is possible to further suppress a disproportionation reaction. In addition, R125 can reduce flammability of R1123.

FIGS. 28 and 29 are views comparing R410A and R1123 with each other by computing a refrigeration performance in a case where a pressure and a temperature in the refrigeration cycle, and a displacement volume of the compressor are the same, and cycle efficiency (COP), in a case where proportions of each of R32 and R125 is fixed to 50% by weight, and R32 and R125 are mixed with R1123 in the sixth embodiment of the present invention. In addition, each of the computation conditions of FIGS. 28 and 29 is similar to those of FIGS. 24 and 25.

As illustrated in FIGS. 28 and 29, by making proportions of each of R32 and R125 30% by weight to 60% by weight, comparing with R410A, it is ascertained that a refrigeration performance becomes 107 to 116%, and the cycle efficiency (COP) is 93 to 96%.

In particular, by making proportions of R32 and R125 40% by weight to 50% by weight, disproportionation can be prevented, the discharge temperature can be lowered, and flammability can be reduced. Furthermore, the global warming potential can be reduced to 60 to 30% of R410A.

In addition, in <Modification Example 2 of Working Fluid>, it is described that proportions of each of R32 and R125 of three-component working fluid is made to be 50% by weight, but proportions of R32 may be 0% by weight to 100% by weight, and proportions of R32 may be raised in a case where the refrigeration performance is desired to be improved. On the contrary, when reducing proportions of R32 and increasing proportions of R125, the discharge temperature can be lowered, and additionally, flammability can be reduced.

As described above, in a three-component system of R1123, R32, and R125, when comprehensively considering prevention of disproportionation, reduction of flammability, a performance when the cooling operation is performed and when the heating operation is performed, COP, and the discharge temperature (that is, when specifying the proportions employed in the air conditioner which uses scroll compressor 1200 that will be described later), a mixture in which R32 and R125 are mixed and a sum of R32 and R125 is 30% by weight to 60% by weight is desirable. More desirably, a mixture in which a sum of R32 and R125 is 40% by weight to 50% by weight is desirable.

Next, a configuration of scroll compressor 1200 which is an example of compressor 161 according to the embodiment will be described.

Figure 30:
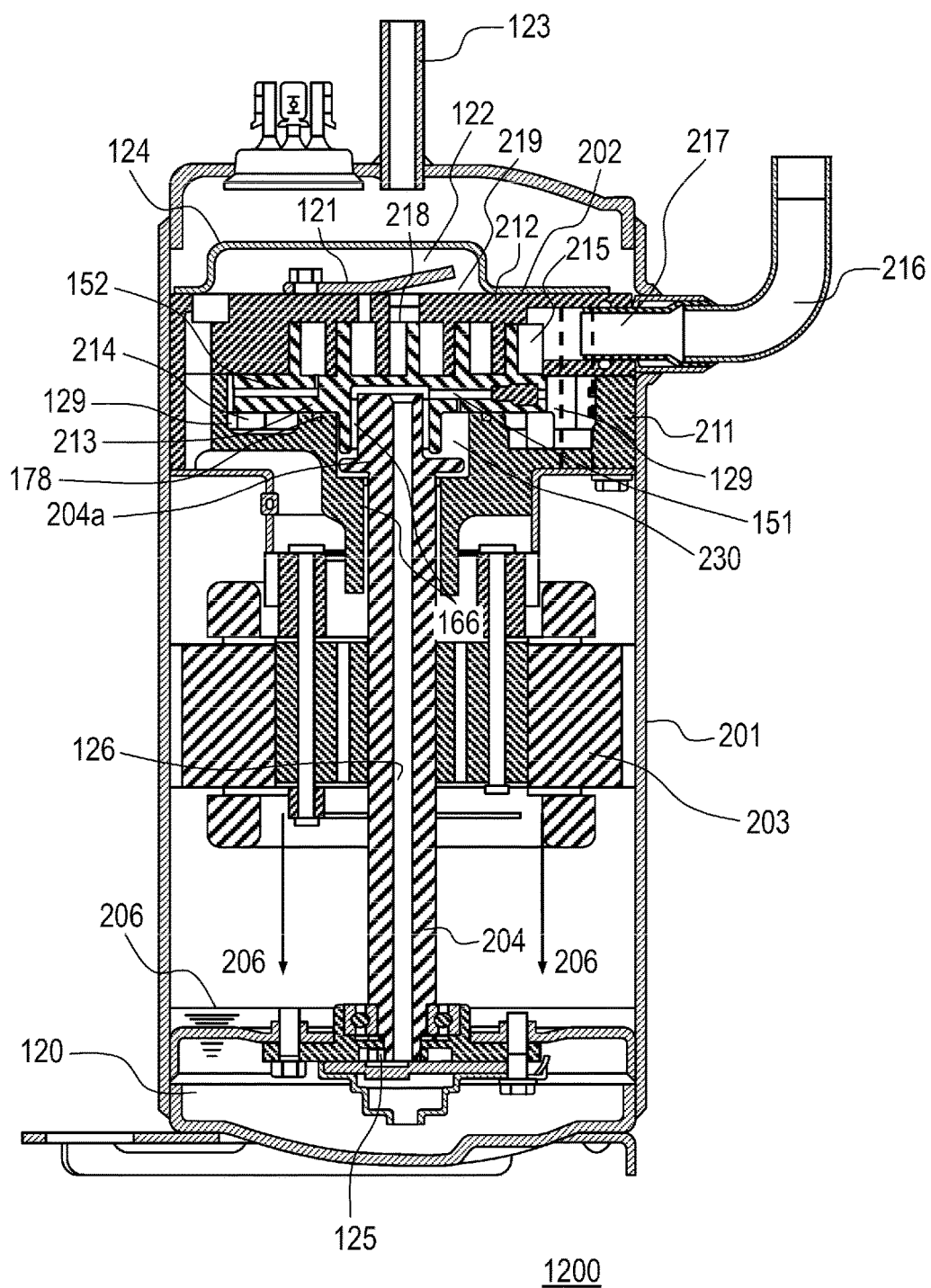
FIG. 30 is a longitudinal sectional view of a scroll compressor according to the sixth embodiment of the present invention.
Figure 31:
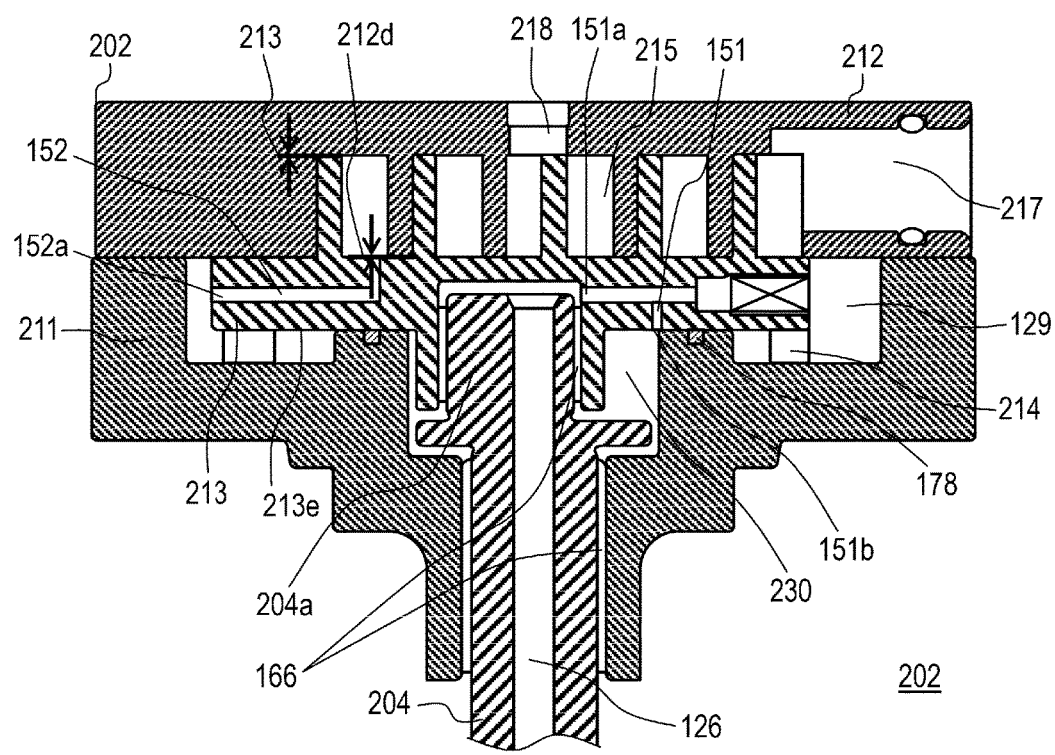
FIG. 31 is a sectional view in which main portions of a compression mechanism portion of the scroll compressor according to the sixth embodiment of the present invention are enlarged.

FIG. 30 is a longitudinal sectional view of scroll compressor 1200 according to the sixth embodiment of the present invention, and FIG. 31 is a sectional view in which main portions of compression mechanism portion 202 of the same scroll compressor 1200. Hereinafter, the configuration, the operation, and the action of scroll compressor 1200 will be described.

As illustrated in FIG. 30, scroll compressor 1200 of the sixth embodiment of the present invention includes airtight container 201, compression mechanism portion 202 in the inside thereof, motor portion 203, and oil storage portion 120.

By using FIG. 31, compression mechanism portion 202 will be described in detail. Compression mechanism portion 202 includes main bearing member 211 which is fixed to the inside of airtight container 201 by welding or shrink-fitting, and has shaft 204. In addition, compression mechanism portion 202 is configured as revolving scroll 213 which meshes with fixed scroll 212 is interposed between fixed scroll 212 bolted on main bearing member 211 and main bearing member 211. Fixed scroll 212 and revolving scroll 213 respectively have a structure in which a spiral lap rises (protrudes) from an end plate.

Between revolving scroll 213 and main bearing member 211, rotation restraining mechanism 214 using an Oldham ring or the like, which guides revolving scroll 213 to be operated following a circular orbit by preventing rotation of revolving scroll 213, is provided. It is possible to operate the revolving scroll 213 following a circular orbit by eccentrically driving the revolving scroll 213 using eccentric shaft portion 204a which is at an upper end of shaft 204.

Accordingly, compression chamber 215 which is formed between fixed scroll 212 and revolving scroll 213 performs compression after suctioning and confining the working refrigerant in compression chamber 215 via suction pipe 216 which passes through the outside of airtight container 201 and suction port 217 of an outer circumferential portion of fixed scroll 212 by moving the working fluid toward a center portion from an outer circumferential side while contracting an interval volume. The working fluid of which a pressure reaches a predetermined pressure is discharged to discharge chamber 122 by pushing and opening reed valve 219 from discharge hole 218 formed at the center portion of fixed scroll 212.

Discharge chamber 122 is a space which is provided on the end plate surface of fixed scroll 212 to cover discharge hole 218, and is formed by muffler 124. The working refrigerant discharged to discharge chamber 122 is discharged to the inside of airtight container 201 via a communication path provided in compression mechanism portion 202. Working refrigerant discharged to the inside of airtight container 201 is discharged to refrigeration cycle device 1100 from airtight container 201 via discharge pipe 123.

In addition, in order to avoid damage due to excessive deformation of reed valve 219, valve stop 121 which suppresses a lift amount is provided. In addition, reed valve 219 is provided, for example, on an end plate surface at a position at which discharge hole 218 of the end plate of fixed scroll 212 is formed.

Figure 32:
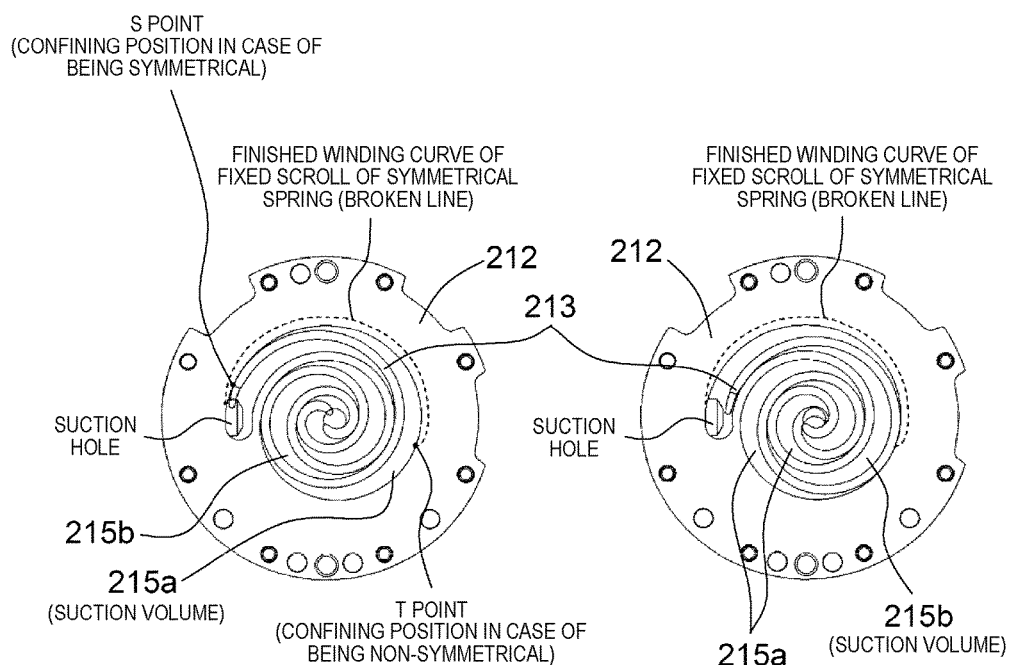
FIG. 32 is a view illustrating a state where a revolving scroll meshes with a fixed scroll in the sixth embodiment of the present invention.

FIG. 32 is a view illustrating a state where revolving scroll 213 meshes with fixed scroll 212 in the sixth embodiment of the present invention. A left side of FIG. 32 is a view illustrating a state where the first compression chamber contains the working fluid, and a right side of FIG. 32 is a view illustrating a state where the second compression chamber contains the working fluid.

As illustrated in FIG. 32, in compression chamber 215 which is formed by fixed scroll 212 and the revolving scroll 213, first compression chamber 215a formed on a lap outer wall side of revolving scroll 213 and second compression chamber 215b which is formed on a lap inner wall side, are present. A suction volume of first compression chamber 215a is greater than a suction volume of second compression chamber 215b. In other words, since the timing at which the working fluid is contained varies, a corresponding pressure of first compression chamber 215a and a pressure of second compression chamber 215b also vary.

Figure 33:
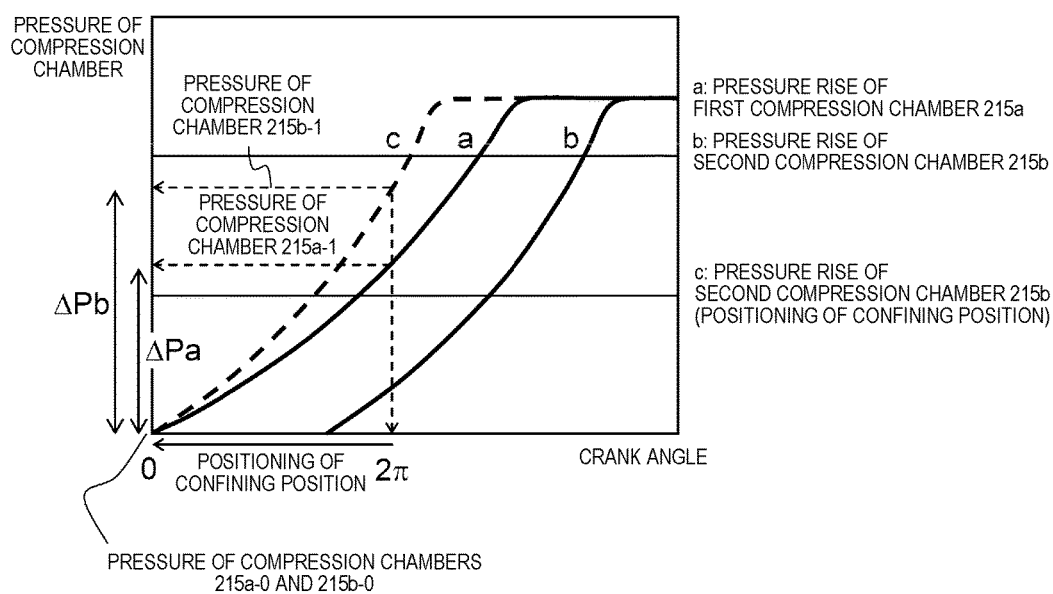
FIG. 33 is a view illustrating a pressure rise curve of a first compression chamber and a second compression chamber in the sixth embodiment of the present invention.

FIG. 33 is a view illustrating a pressure rise curve of first compression chamber 215a and second compression chamber 215b in the sixth embodiment of the present invention.

Originally, in first compression chamber 215a and second compression chamber 215b, since the timing of containment varies, a starting point of the pressure curve does not match. However, here, in order to make the difference apparent, a graph which matches the timings of containment is used in the description. As illustrated in FIG. 33, it is ascertained that a rate of pressure change of second compression chamber 215b having a small suction volume is greater than that of first compression chamber 215a. In other words, pressure difference $\Delta Pb$ between second compression chamber 215b-1 which is formed one before, and second compression chamber 215b-0 which is formed next, becomes greater than pressure difference $\Delta Pa$ of the same first compression chamber 215a, regarding second compression chamber 215b, the working fluid is likely to leak via a contact portion in the radial direction of the lap.

Returning to FIG. 30, pump 125 is provided at one end of shaft 204, and the suction portion of pump 125 is disposed to be present in oil storage portion 120. Since pump 125 is driven at the same time with scroll compressor 1200, it is possible to reliably suction up compressor lubricating oil 206 (oil, refrigerator oil) in oil storage portion 120 provided on the bottom portion of airtight container 201 regardless of the pressure condition and the operation speed, and a concern about shortage of oil is solved.

Compressor lubricating oil 206 which is suctioned up by pump 125 is supplied to compression mechanism portion 202 through oil supply hole 126 (refer to FIG. 31) which penetrates the inside of shaft 204. In addition, before compressor lubricating oil 206 is suctioned up by pump 125, or after compressor lubricating oil 206 is suctioned up, by removing foreign materials by an oil filter or the like, it is possible to prevent the foreign materials from being incorporated into compression mechanism portion 202, and further, to improve the reliability.

Compressor lubricating oil 206 guided to compression mechanism portion 202 also becomes a backpressure source with respect to revolving scroll 213, which has a pressure having substantially equivalent to the discharge pressure of scroll compressor 1200. Accordingly, revolving scroll 213 stably achieves a predetermined compression performance without being separated from or abuts against fixed scroll 212 being biased. Furthermore, by the supply pressure and the self-weight, a part of the compressor lubricating oil 206 infiltrates into a fitting portion between eccentric shaft portion 204a and revolving scroll 213, and into bearing portion 166 between shaft 204 and main bearing member 211, by obtaining a means of escape, and after each part is lubricated, the part of compressor lubricating oil 206 is dropped and returns to oil storage portion 120.

In addition, regarding a position at which the working fluid is contained in first compression chamber 215a and second compression chamber 215b, as illustrated by a broken line (a curve of a finished winding of the fixed scroll of a symmetrical spring) of FIG. 32 in a general symmetrical scroll, a spiral finished winding portion of fixed scroll 212 release to the outside, and revolving scroll 213 is formed not to have a contact point. In this case, a containing position of first compression chamber 215a becomes a T point (non-symmetrical taking-in position) on the left side of FIG. 32, the working fluid is heated on a route which reaches the T point, and since the stability of R1123 is low compared to the refrigerant of the related art, such as R410A, there is a concern that a disproportionation reaction occurs according to polymerization reaction and large amount of heat emitted.

Here, in the embodiment, a spiral lap is configured so that a position at which the working fluid is confined in first compression chamber 215a and in second compression chamber 215b is shifted by substantially 180 degrees. Specifically, in a state where fixed scroll 212 and revolving scroll 213 mesh with each other, the spiral lap of fixed scroll 212 extends to an extent equivalent to the spiral lap of revolving scroll 213. In this case, the position at which first compression chamber 215a confines the working fluid becomes an S point (non-symmetrical taking-in position) on the left side of FIG. 32, and after the working fluid is confined in first compression chamber 215a, the rotation of shaft 204 advances by approximately 180 degrees, and then, the second compression chamber 215b confines the working fluid. Accordingly, it is possible to minimize the influence of increase in refrigerant temperature caused by suctioning and heating, and further, to ensure the maximum suction volume with respect to first compression chamber 215a. In other words, it is possible to set a lap height to be low, and as a result, since it is possible to reduce a void (=section of leakage) of the contact portion in the radial direction of the lap, it is possible to further reduce leakage loss.

In addition, as illustrated in FIG. 31, on rear surface 213e of revolving scroll 213, high-pressure region 230 and backpressure chamber 129 which is set to have an intermediate pressure which is between a high pressure and a low pressure, are formed, and a plurality of oil supply paths are provided, and at a part or in all of the oil supply paths are configured to pass via backpressure chamber 129. By adding a pressure from rear surface 213e, revolving scroll 213 is stably pressed to fixed scroll 212, the leakage to compression chamber 215 from backpressure chamber 129 is reduced, and a stable operation can be performed.

Furthermore, by providing the plurality of oil supply paths, it is possible to supply oil only by a necessary amount to a necessary location. For example, in a suction stroke before confining compression chamber 215, a certain degree of seal oil is required, suctioning and overheating of working fluid occur when a large amount oil is supplied, and volumetric efficiency deteriorates. In addition, similar to that in the middle of compression, when the oil is massively supplied, an input increases due to viscosity loss. Here, it is ideal to supply the oil only by a necessary amount to each location, and in order to realize this, the plurality of oil supply paths are formed. In addition, by supplying the oil via backpressure chamber 129, it is possible to reduce the pressure difference between the oil supply path and compression chamber 215 to which the oil is supplied. For example, while in the middle of suction stroke or compression, since the pressure difference in a case where the oil is supplied from backpressure chamber 129 set to have an intermediate pressure is lower than that in a case where the oil is directly supplied from high-pressure region 230, it is possible to supply an extremely small amount of oil which is a necessary minimum limit. In this manner, it is possible to prevent excessive supply of oil, and it is possible to suppress deterioration of performance caused by suctioning and heating, and an increase in input caused by viscosity loss.

In addition, by disposing seal member 178 on rear surface 213e of revolving scroll 213, an inner side of seal member 178 is defined as high-pressure region 230, and an outer side of seal member 178 is defined as backpressure chamber 129. In addition, at least one oil supply path is configured of backpressure chamber oil supply path 151 from high-pressure region 230 to backpressure chamber 129, and compression chamber oil supply path 152 from backpressure chamber 129 to second compression chamber 215b. In this manner, since it is possible to completely separate a pressure of high-pressure region 230 and a pressure of backpressure chamber 129 from each other by using seal member 178, it is possible to stably control a pressure load from rear surface 213e of revolving scroll 213.

In addition, by providing backpressure chamber oil supply path 151 from high-pressure region 230 to backpressure chamber 129, it is possible to supply compressor lubricating oil 206 to a sliding portion of rotation restraining mechanism 214 and a thrust sliding portion of fixed scroll 212 and revolving scroll 213. In addition, by providing compression chamber oil supply path 152 from backpressure chamber 129 to second compression chamber 215b, it is possible to actively increase an amount of oil supplied to second compression chamber 215b, and to suppress leakage loss in second compression chamber 215b.

In addition, one opening end 151b of backpressure chamber oil supply path 151 is formed on rear surface 213e of revolving scroll 213, opening end 151b comes and goes to the outside and the inside of seal member 178, and the other opening end 151a is always open to high-pressure region 230. Accordingly, the oil can be intermittently supplied.

Figure 34:
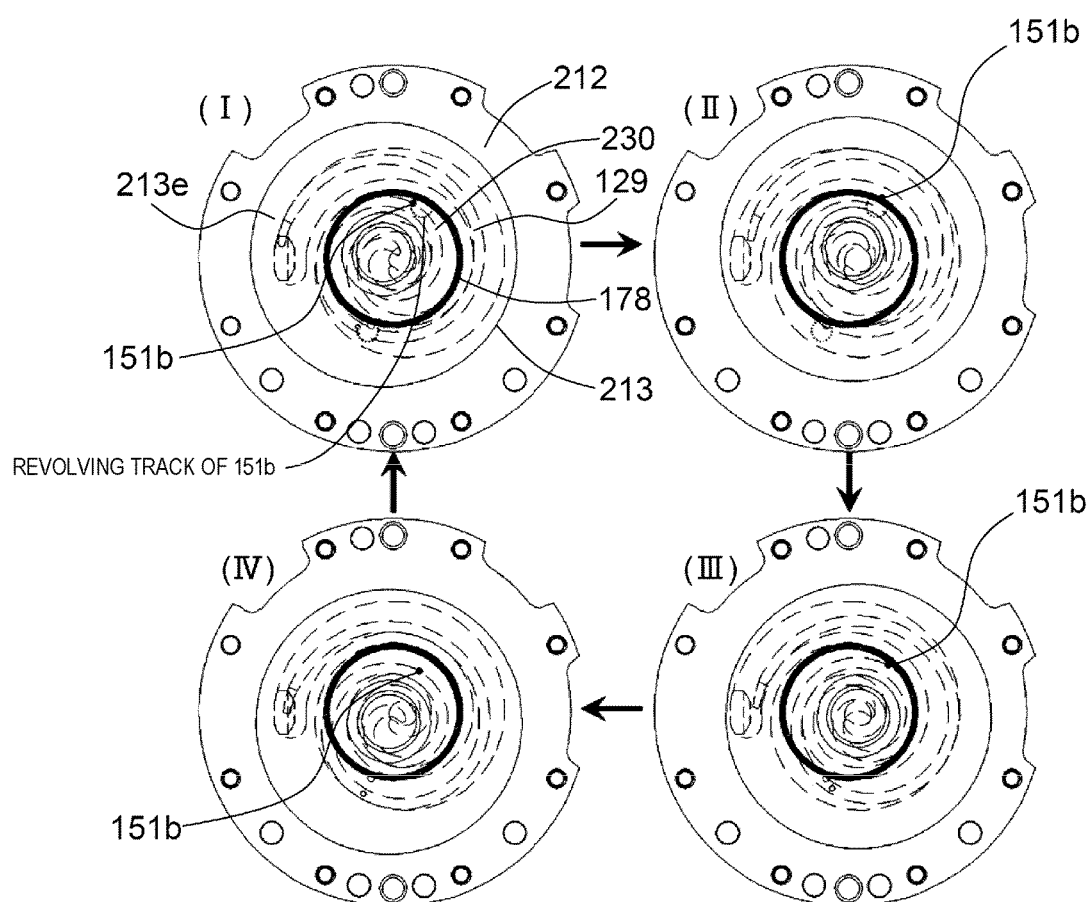
FIG. 34 is a view illustrating a state where the revolving scroll meshes with the fixed scroll and viewed from a rear surface of the revolving scroll, in the sixth embodiment of the present invention.

FIG. 34 is a view illustrating a state where revolving scroll 213 meshes with fixed scroll 212 and viewed from the rear surface of revolving scroll 213, in the sixth embodiment of the present invention. In addition, four sections of FIG. 34 are views in which the phase is shifted by 90 degrees.

As illustrated in FIG. 34, by seal member 178, the rear surface region of revolving scroll 213 is divided into high-pressure region 230 on the inner side, and backpressure chamber 129 on the outer side. In a state (II), since opening end 151b is open to backpressure chamber 129 which is on the outside of seal member 178, the oil is supplied. Meanwhile, in states (I), (III), and (IV), since opening end 151b is open to the inner side of seal member 178, the oil is not supplied.

In other words, one opening end 151b of backpressure chamber oil supply path 151 comes and goes to high-pressure region 230 and backpressure chamber 129 to each other, but only when the pressure difference is generated in both of opening ends 151a and 151b of backpressure chamber oil supply path 151, compressor lubricating oil 206 is supplied to backpressure chamber 129. By this configuration, since the amount of oil supplied can be adjusted by a ratio by which opening end 151b comes and goes (across) seal member 178, it is possible to configure a passage diameter of backpressure chamber oil supply path 151 by a dimension which is ten times greater than that of oil filter.

Accordingly, a concern that a foreign material is engaged with the passage and blocks the passage is solved. Accordingly, at the same time when applying a stabilized backpressure, it is possible to maintain an excellent state of lubrication of the thrust sliding portion and rotation restraining mechanism 214, and to provide scroll compressor 1200 which realizes high efficiency and high reliability. In addition, in the embodiment, a case where opening end 151a is always in high-pressure region 230, and opening end 151b comes and goes to high-pressure region 230 and backpressure chamber 129, is described as an example. However, even in case where opening end 151a comes and goes to high-pressure region 230 and backpressure chamber 129, and opening end 151b is always in backpressure chamber 129, since a pressure difference is generated between opening ends 151a and 151b, it is possible to realize intermittent oil supply, and to achieve similar effects.

In a case where the addition of the pressure from rear surface 213e of revolving scroll 213 is not sufficiently applied, there is a concern that a tilting phenomenon in which revolving scroll 213 is separated from fixed scroll 212 occurs. In the tilting phenomenon, since the working fluid to compression chamber 215 before being confined leaks from backpressure chamber 129, volumetric efficiency deteriorates. In order to prevent this, it is necessary that backpressure chamber 129 maintains a predetermined pressure. Here, compression chamber oil supply path 152 is configured so that second compression chamber 215b after confining the working fluid and backpressure chamber 129 communicate with each other. Accordingly, since the pressure of backpressure chamber 129 becomes a predetermined pressure which is higher than a suction pressure, it is possible to prevent the tilting phenomenon, and to realize high efficiency. In addition, even when the tilting is generated, since it is possible to guide the pressure of second compression chamber 215b to backpressure chamber 129, early return to a normal operation is possible.

In the embodiment, the suction volume of first compression chamber 215a formed on the lap outer wall side of revolving scroll 213 is greater than the suction volume of second compression chamber 215b formed on the lap inner wall side of revolving scroll 213. Accordingly, since it is possible to configure to shorten the path until reaching the confining position of first compression chamber 215a, and to heat the refrigerant before starting compression, it is possible to suppress a disproportionation reaction of R1123.

In addition, in the compressor of the embodiment, as the compressor lubricating oil (refrigerator oil), the polyol ester oil is used. Polyol ester of the present invention is not limited to a specific type, but by using at least one type selected from the group of neopentylglycol, trimethylolpropane, pentaerythritol, and dipentaerythritol as a constituent alcohol, it is possible to adjust viscosity of the refrigerator oil across a wide width. According to this configuration, since it is possible to freely adjust the viscosity of the refrigerator oil, it is possible to ensure an oil film between a vane and a piston, and to suppress generation of sliding heat. In addition, a carbonyl group of the polyol ester oil captures radicals which are a cause of start of a disproportionation reaction, it is possible to suppress a disproportionation reaction of R1123.

In addition, a constituent fatty acid of polyol ester of the present invention is not limited to a specific type, and it is appropriate to use a fatty acid having 6 to 12 carbons. The constituent fatty acid may be a straight chain fatty acid and may be branched-chain fatty acid, but since a carbonyl group is not three-dimensionally shielded with an alkyl group in the straight chain fatty acid, a performance of trapping the radicals is high.

In addition, as an additive which is added to compressor lubricating oil 206, it is possible to use an anti-wear agent, an antioxidant, a polymerization inhibitor, or a reactant adsorbent. As the anti-wear agent, a phosphate ester, phosphorous acid ester, or thiophosphate may be employed, but the phosphate ester which is unlikely to give a negative influence to the refrigeration cycle device is appropriate.

Specific examples of the phosphate ester include tributylphosphate, tripentyl phosphate, trihexyl phosphate, triheptyl phosphate, trioctyl phosphate, trinonyl phosphate, tridecyl phosphate, triundecylic phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyl diphenyl phosphate, and diphenyl xylenyl phosphate. In general, by adding 0.1 to 3 wt % of the phosphate ester anti-wear agent into the refrigerator oil, by effectively adsorbing the phosphate ester anti-wear agent to a front surface of a sliding portion, and by creating a film having a small shearing force on a sliding surface, it is possible to obtain an anti-wear effect.

According to this configuration, as the anti-wear agent is adsorbed to the front surface of the sliding portion and the friction is reduced, it is possible to suppress heat generation, and to suppress self-degradable reaction of the refrigerant R1123.

In addition, specific examples of a phenolic antioxidant include propyl gallate, 2,4,5-trihydroxybutyrophenone, t-butylhydroquinone, nonlihydroguaiaretic acid, butyl hydroxyanisole, 4-hydroxymethyl-2, 6-di-t-butylphenol, octyl gallate, butylhydroxytoluene, and dodecyl gallate. By adding 0.1 to 1 wt % of antioxidant to base oil, it is possible to effectively captures the radicals, and to prevent the reaction. In addition, minimize coloring of the base oil itself due to the antioxidant.

According to this configuration, as the phenolic antioxidant effectively captures the radicals generated in the inside of airtight container 201, it is possible to obtain an effect of suppressing a disproportionation reaction of R1123.

In addition, limonene may be added in an amount of approximately 5% of the refrigerant amount of R1123 in order to prevent the reaction of highly reactive molecules containing a double bond and fluorine atom like R1123. Scroll compressor 1200 of the embodiment and refrigeration cycle device 1100 which uses the same have a closed system, and as described above, the lubricating oil is sealed as the base oil. In general, the viscosity of the lubricating oil which becomes the base oil sealed in scroll compressor 1200 is generally approximately 32 mm$^2$/s to 68 mm$^2$/s. Meanwhile, the viscosity of limonene is very low which is approximately 0.8 mm$^2$/s. Therefore, the viscosity of the lubricating oil rapidly decreases to be 60 mm$^2$/s in a case where approximately 5% of limonene is mixed therein, 48 mm$^2$/s in a case where 15% of limonene is mixed therein, and 32 mm$^2$/s in a case where 35% of limonene is mixed therein. Therefore, in order to prevent the reaction of R1123, when a large amount of limonene is mixed therein, the reliability of scroll compressor 1200 and refrigeration cycle device 1100 is influenced by the decrease in viscosity of the lubricating oil, for example, wear due to a lubricating defect and generation of metallic soap due to a contact state of metal on the sliding surface.

Meanwhile, in order to compensate for the decrease in viscosity of the base oil caused by mixing limonene having an amount appropriate for preventing the reaction therein, by employing high-viscosity lubricating oil as a base, or by mixing super-high-viscosity lubricating oil having an amount which is equal to or greater than a mixing amount of limonene, the lubricating oil of scroll compressor 1200 of the embodiment ensures appropriate viscosity of the lubricating oil.

Specifically, when lubricating oil of which the viscosity is 78 mm$^2$/s in a case where 5% of limonene is mixed therein, and lubricating oil of which the viscosity is approximately 230 mm$^2$/s in a case where 35% of limonene is mixed therein, are selected, it is possible to ensure 68 mm$^2$/s in viscosity after the mixing. In addition, in order to maximize an effect of preventing the reaction of R1123 using limonene, an extreme example, such as increase in the mixing amount of limonene to 70% or 80%, is also considered. However, in this case, the viscosity of the high-viscosity lubricating oil which becomes the base becomes 8500 mm$^2$/s or 25000 mm$^2$/s, respectively, and exceeds 3200 mm$^2$/s that is the maximum value of ISO standard. In addition, since it is also difficult to uniform mix limonene therein, actual employment is difficult to be considered.

In addition, in a case where super-high viscosity lubricating oil is mixed with limonene by an amount equivalent to each other, by mixing 800 mm$^2$/s to 1000 mm$^2$/s of lubricating oil with limonene, viscosity of 32 mm$^2$/s to 68 mm$^2$/s is obtained. In addition, in a case where the limonene and the super-high viscosity oil which have different viscosity are mixed with each other, when performing the mixing while adding the super-high viscosity oil to the limonene little by little, lubricating oil of which composition viscosity is relatively uniform, can be obtained.

In addition, limonene is described as an example in the embodiment, but similar effects can also be obtained by a terpene type or a terpenoid type. For example, it is possible to select hemiterpene type isoprene, prenol, 3-methyl butanoic acid and monoterpene type geranyl diphosphate, cineole, farnesyl diphosphate of pinene and sesquiterpene, artemisinin, bisabolol, diterpene type geranylgeranyl diphosphate, retinol, retinal, phytol, paclitaxel, forskolin, aphidicolin and triterpene type squalene, and lanosterol, in accordance with a use temperature of scroll compressor 1200 and refrigeration cycle device 1100, and required viscosity of the lubricating oil.

In addition, the exemplified viscosity is a specific example in scroll compressor 1200 having a high-pressure container, but in scroll compressor 1200 which uses the lubricating oil having comparatively low viscosity of 5 mm$^2$/s to 32 mm$^2$/s, and has a low-viscosity container, similar embodiment is also possible, and similar effects can be obtained.

In addition, the terpene type and the terpenoid type, such as limonene, has solubility with respect to plastic, but when limonene having an amount which is equal to or less than 30% is mixed therein, the influence thereof is small, and electric insulation required for plastic in scroll compressor 1200 does not have a problem. However, in a case where there is a problem, for example, in a case where the reliability is required for a long period of time, and in a case where a general use temperature is high, it is desirable to use polyimide, polyimidoamide, or polyphenylene sulfide which has chemical resistant properties.

In addition, a winding wire of motor portion 203 of scroll compressor 1200 of the embodiment, a conductor is coated with varnish (thermosetting insulating material) and baked with an insulating film therebetween. Examples of the thermosetting insulating material include a polyimide resin, an epoxy resin, and an unsaturated polyester resin. Among these, the polyimide resin can be obtained by coating in a state of polyamic acid which is a precursor, and baking the polyamic acid approximately at 300° C. to achieve polyimidation. It is known that imide reaction occurs due to reaction between amine and carboxylic acid anhydride. Since there is a possibility that the refrigerant R1123 also reacts in a short circuit between electrodes, by coating a motor winding wire with polyimidic acid varnish (polyimide precursor which can allow aromatic diamine and aromatic tetracarboxylic dianhydride to react is a main component), it is possible to prevent a short circuit between electrodes.

Therefore, even in a state where a coil of motor portion 203 infiltrates into a liquid refrigerant, it is possible to maintain high resistance between winding wires, to suppress discharge between winding wires, and to obtain an effect of suppressing self-degradable reaction of the refrigerant R1123.

Figure 35:
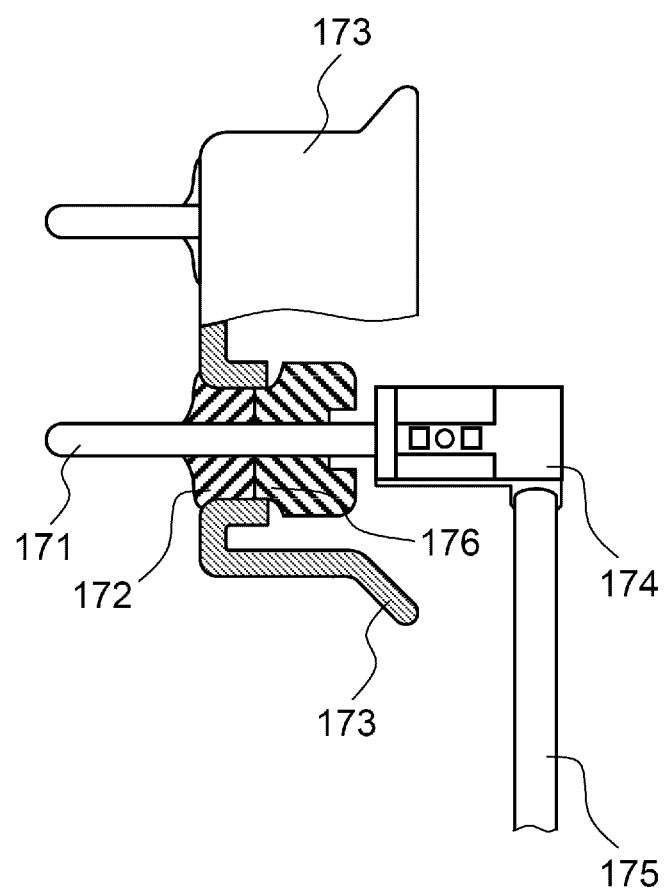
FIG. 35 is a partial sectional view illustrating a structure in the vicinity of a power supply terminal of the scroll compressor according to the sixth embodiment of the present invention.

FIG. 35 is a partial sectional view illustrating a structure in the vicinity of a power supply terminal of scroll compressor 1200 according to the sixth embodiment of the present invention.

In FIG. 35, power supply terminal 171, glass insulating material 172, metal lid body 173 which holds the power supply terminal, flag terminal 174 which is connected to the power supply terminal, and lead wire 175, are illustrated. In scroll compressor 1200 according to the embodiment, a doughnut-like insulating member 176 which adheres to glass insulating material 172 which is an insulating member, is pipe-connected onto power supply terminal 171 on an inner side of airtight container 201 of scroll compressor 1200. As doughnut-like insulating member 176, a member which maintains insulation properties and has resistance against fluorinated acid, is appropriate. For example, a ceramic insulator or a HNBR rubber doughnut-like spacer is employed. It is mandatory that doughnut-like insulating member 176 adheres to glass insulating material 172, but it is preferable doughnut-like insulating member 176 also adheres to a connection terminal.

In power supply terminal 171 configured in this manner, due to doughnut-like insulating member 176, a creeping distance on the power supply terminal and an inner surface of scroll compressor 1200 of a lid body becomes long, terminal tracking can be prevented, and ignition caused by discharge energy of R1123 can be prevented. In addition, it is possible to prevent fluorinated acid generated by decomposing R1123 from corroding glass insulating material 172.

In addition, scroll compressor 1200 of the embodiment may be a so-called high-pressure shell type compressor in which discharge hole 218 is open to the inside of airtight container 201, and the inside of airtight container 201 is filled with refrigerant compressed in compression chamber 215. Meanwhile, scroll compressor 1200 may be a so-called low-pressure shell type scroll compressor 1200 in which suction hole 118 is open to the inside of airtight container 201, and the inside of airtight container 201 is filled with refrigerant which is before being pressed in compression chamber 215. This case is desirable because the temperature substantially decreases due to the introduction of a low-temperature refrigerant in compression chamber 215, and a disproportionation reaction of R1123 is suppressed, in a configuration in which a temperature is likely to increase until the refrigerant is heated in the inside of airtight container 201 and is introduced to compression chamber 215.

In addition, in high-pressure shell type scroll compressor 1200, after the refrigerant discharged from discharge hole 218 passes through the periphery of motor portion 203, and is heated by motor portion 203 in the inside of airtight container 201, the refrigerant may be discharged to the outside of airtight container 201 from discharge pipe 123. This configuration is desirable because a disproportionation reaction of R1123 is suppressed since it is possible to decrease the temperature of the refrigerant in compression chamber 215, even when the temperature of the refrigerant discharged from discharge pipe 123 is equivalent.

(Seventh Embodiment)

Next, a seventh embodiment of the present invention will be described.

Figure 36:
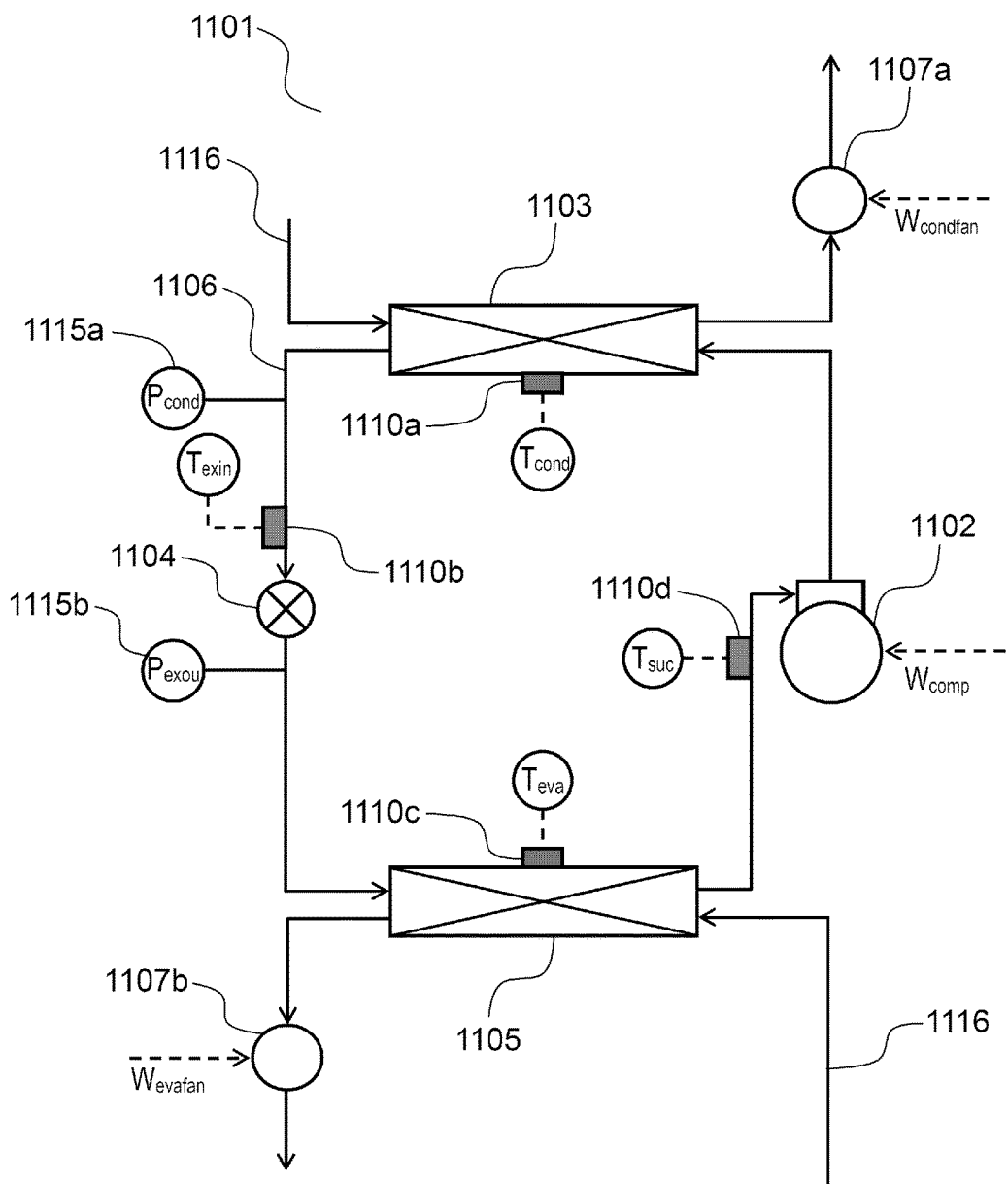
FIG. 36 is a view illustrating a configuration of a refrigeration cycle device according to a seventh embodiment of the present invention.

FIG. 36 is a view illustrating a configuration of a refrigeration cycle device 1101 according to the seventh embodiment of the present invention.

Refrigeration cycle device 1101 of the embodiment is connected to compressor 1102, condenser 1103, expansion valve 1104 which is a throttle mechanism, and evaporator 1105 in order by refrigerant piping 1106, and a refrigeration cycle circuit is configured. In the refrigeration cycle circuit, the working fluid (refrigerant) is sealed.

Next, a configuration of refrigeration cycle device 1101 will be described.

As condenser 1103 and evaporator 1105, in a case where a surrounding medium is air, a fin and tube type heat exchanger or a parallel flow type (micro tube type) heat exchanger are used.

Meanwhile, as condenser 1103 and evaporator 1105 in a case where the surrounding medium is brine or a refrigerant of two-dimensional type refrigeration cycle device, a double pipe heat exchanger, a plate type heat exchanger, or a shell and tube type heat exchanger, are used.

As expansion valve 1104, for example, an electronic expansion valve which uses a pulse motor driving method, or the like is used.

In refrigeration cycle device 1101, in condenser 1103, fluid machinery 1107a which is a first transporting portion and drives (flows) the surrounding medium (first medium) which exchanges heat with the refrigerant to a heat exchanging surface of condenser 1103, is installed. In addition, in evaporator 1105, fluid machinery 1107b which is a second transporting portion and drives (flows) the surrounding medium (second medium) which exchanges heat with the refrigerant to a heat exchanging surface of evaporator 1105, is installed. In addition, flow path 1116 of the surrounding medium is provided in each of the surrounding mediums.

Here, as the surrounding medium, when the air in the atmosphere is used, there is a case where water or brine, such as ethylene glycol, is used. In addition, in a case where refrigeration cycle device 1101 is the two-dimensional type refrigeration cycle device, a refrigerant which is preferable for the refrigeration cycle circuit and a working temperature region, for example, hydrofluorocarbons (HFC), hydrocarbons (HC), or carbon dioxide, is used.

As fluid machineries 1107a and 1107b which drive the surrounding medium, in a case where the surrounding medium is air, an axial flow blower, such as a propeller fan, a cross flow fan, or a centrifugal blower, such as a turbo blower, is used, and in a case where the surrounding medium is brine, a centrifugal pump is used. In addition, in a case where refrigeration cycle device 1101 is a two-dimensional type refrigeration cycle device, as fluid machineries 1107a and 1107b for transporting the surrounding medium, compressor 1102 plays a role thereof.

In condenser 1103, at a location (hereinafter, in the specification, referred to as "two-phase pipe of condenser") at which the refrigerant that flows in the inside thereof flows in two phases (a state where gas and liquid are mixed with each other), condensation temperature detecting portion 1110a is installed, and it is possible to measure the temperature of the refrigerant.

In addition, between an outlet of condenser 1103 and an inlet of expansion valve 1104, condenser outlet temperature detecting portion 1110b is installed. Condenser outlet temperature detecting portion 1110b can detect overcooling degree (a value obtained by subtracting the temperature of condenser 1103 from an inlet temperature of expansion valve 1104) of inlet of expansion valve 1104.

In evaporator 1105, at a location (hereinafter, in the specification, referred to as "two-phase pipe of evaporator") at which the refrigerant that flows in the inside thereof flows in two phases, evaporation temperature detecting portion 1110c is provided, and it is possible to measure the temperature of the refrigerant in the inside of evaporator 1105.

In a suction portion (between an outlet of evaporator 1105 and an inlet of compressor 1102) of compressor 1102, suction temperature detecting portion 1110d is provided. Accordingly, it is possible to measure the temperature (suction temperature) of the refrigerant suctioned to compressor 1102.

In a case where, for example, an electronic thermostat which is connected to the working fluid in a contact state at the piping in which the refrigerant flows or an outer pipe of a heat transfer pipe is used as each of the above-described temperature detecting portion, there is also a case where a sheath pipe type electronic thermostat which directly comes into contact with the working fluid, is used.

Between the outlet of condenser 1103 and the inlet of expansion valve 1104, high-pressure side pressure detecting portion 1115a which detects a pressure on a high pressure side (a region in which the refrigerant from the outlet of compressor 1102 to the inlet of expansion valve 1104 is present at a high pressure) of the refrigeration cycle circuit, is installed.

At the outlet of expansion valve 1104, low-pressure side pressure detecting portion 1115b which detects a pressure on a low pressure side (a region in which the refrigerant from the outlet of expansion valve 1104 to the inlet of compressor 1102 is present at a low pressure) of the refrigeration cycle circuit, is installed.

As high-pressure side pressure detecting portion 1115a and low-pressure side pressure detecting portion 1115b, for example, a member which converts displacement of a diaphragm into an electric signal, or the like is used. In addition, instead of high-pressure side pressure detecting portion 1115a and low-pressure side pressure detecting portion 1115b, a differential pressure gauge (measuring means for measuring a pressure difference between the outlet and the inlet of expansion valve 1104), may be used.

In addition, in the above-described description of the configuration, an example in which refrigeration cycle device 1101 is provided with all of each temperature detecting portion and each pressure detecting portion, is described, but in control which will be described later, a detecting portion which does not use a detected value can be omitted.

Next, a control method of refrigeration cycle device 1101 will be described. First, control when a general operation is performed will be described.

When a general operation is performed, the overheating degree of the working fluid at the suction portion of compressor 1102, which is a temperature difference between suction temperature detecting portion 110d and evaporation temperature detecting portion 110c, is computed. In addition, expansion valve 1104 is controlled so that the overheating degree becomes a target overheating degree (for example, 5K) determined in advance.

In addition, at a discharge portion of compressor 1102, a discharge temperature detecting portion (not illustrated) is further provided, and it is possible to perform the control by using the detected vale. In this case, the overheating degree of the working fluid at the discharge portion of compressor 1102, which is a temperature difference between the discharge temperature detecting portion and condensation temperature detecting portion 1110a, is computed. In addition, expansion valve 1104 is controlled so that the overheating degree becomes a target overheating degree determined in advance.

Next, control in a case where a possibility of occurrence of a disproportionation reaction increases, and a special operation state is achieved, will be described.

In the embodiment, in a case where a temperature detected value of condensation temperature detecting portion 1110a becomes excessive, control of opening expansion valve 1104, and decreasing the pressure and the temperature of the high-pressure side working fluid in the inside of refrigeration cycle device 1101, is performed.

In general, it is necessary to perform the control so that a supercritical condition which exceeds a critical point (a point described as $T_{cri}$ in FIG. 37 which will be described later) is not achieved by the refrigerant excluding carbon dioxide. This is because, in a supercritical state, a material is placed in a state where either gas or liquid is not present, and the behavior thereof is unstable and active.

Here, in the embodiment, considering a temperature (critical temperature) at the critical point as one criterion, using the temperature, an opening degree of expansion valve 1104 is controlled so that the condensation temperature does not approach approximately a value (5K) determined in advance. In addition, in a case where the working fluid (mixed refrigerant) containing R1123 is used, by using the critical temperature of the mixed refrigerant, the control is performed so that the temperature of the working fluid does not become equal to or greater than the critical temperature (−5° C.).

Figure 37:
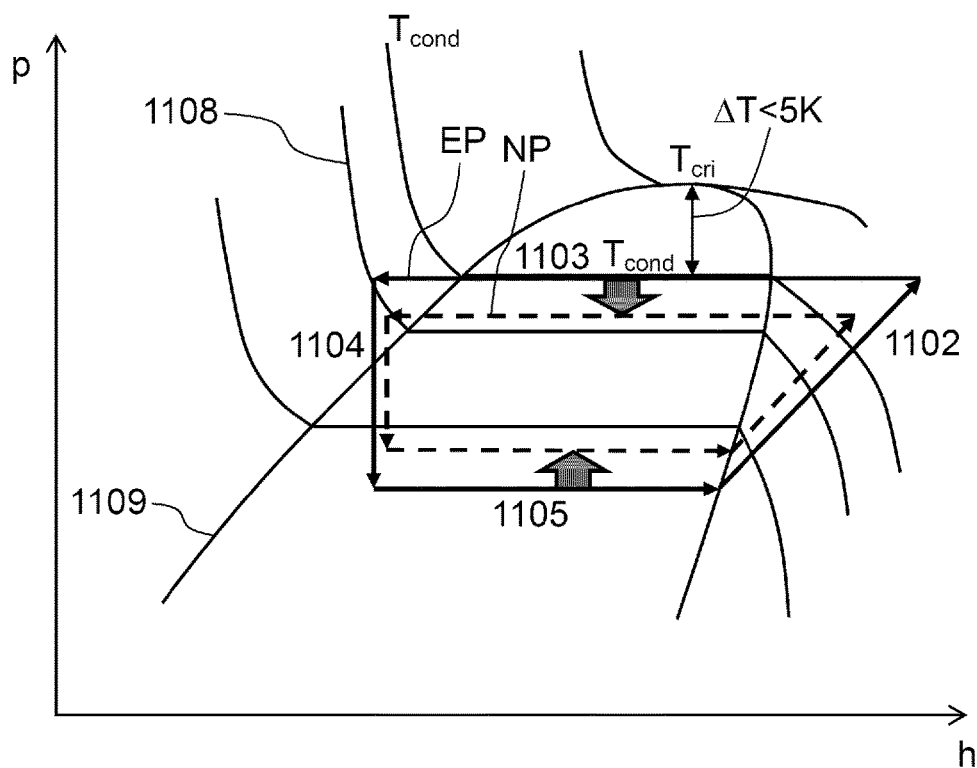
FIG. 37 is a Mollier diagram illustrating an operation of the refrigeration cycle device in the seventh embodiment of the present invention.

FIG. 37 is a Mollier diagram illustrating an operation of refrigeration cycle device 1101 in the seventh embodiment of the present invention. In FIG. 37, isotherm 1108 and saturation liquid line and saturation vapor line 1109 are illustrated.

In FIG. 37, a refrigeration cycle which is under an excessive pressure condition which becomes a cause of occurrence of a disproportionation reaction, is illustrated by a solid line (EP), and a refrigeration cycle which is under a normal operation condition, is illustrated by a broken line (NP).

If a temperature value in condensation temperature detecting portion 1110a provided in two-phase pipe of condenser 1103 is equal to or less than 5K (EP in FIG. 37) with respect to the critical temperature stored in a control device in advance, the control device controls the opening degree of expansion valve 1104 to be high. As a result, similar to NP of FIG. 37, since the condensation pressure which is on the high-pressure side of refrigeration cycle device 1101 decreases, it is possible to suppress a disproportionation reaction which occurs due to an excessive pressure rise of the refrigerant, or to suppress the pressure rise even in a case where a disproportionation reaction occurs.

In addition, the above-described control method is a method for controlling the opening degree of expansion valve 1104 by indirectly grasping the pressure in the inside of condenser 1103 from the condensation temperature measured by condensation temperature detecting portion 1110a. The method is particularly preferable since it is possible use the condensation temperature as a target instead of the condensation pressure in a case where the working fluid containing R1123 is azeotrope or pseudoazeotrope, and a temperature difference (temperature gradient) between a dew point and a boiling point of the working fluid containing R1123 in condenser 1103, is zero or small.

<Modification Example 1 of Control Method>

In addition, as described above, by comparing the critical temperature and the condensation temperature, by indirectly detecting a high pressure state (the pressure of the refrigerant in the inside of condenser 1103) of refrigeration cycle device 1101, instead of the control method which commands an appropriate operation to expansion valve 1104 or the like, based on the pressure which is directly measured, a method for controlling the opening degree of expansion valve 1104 may be used.

Figure 38:
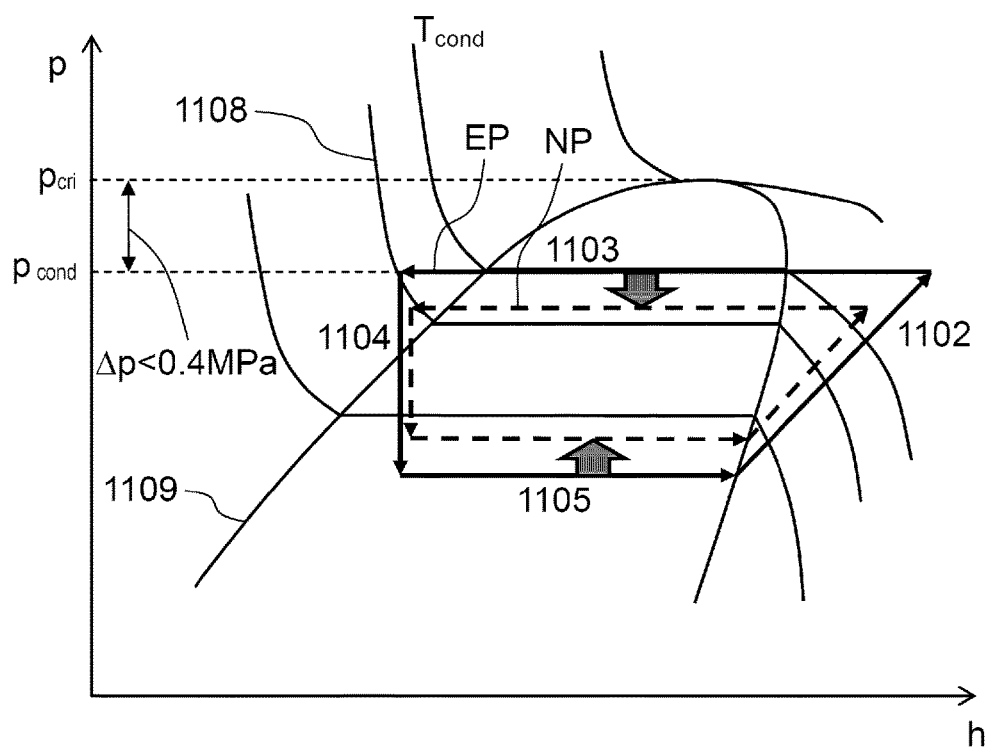
FIG. 38 is a Mollier diagram illustrating a control operation of Modification Example 1 in the seventh embodiment of the present invention.

FIG. 38 is a Mollier diagram illustrating a control operation of Modification Example 1 in the seventh embodiment of the present invention.

In FIG. 38, from the discharge portion of compressor 1102 to the inlets of condenser 1103 and expansion valve 1104, the refrigeration cycle in a state where an excessive pressure rise continues to be generated, is illustrated by a solid line (EP), and the refrigeration cycle in a state which is out of the above-described excessive-pressure state, is illustrated by a broken line (NP).

In the operation, in a case where a pressure difference obtained by subtracting, for example, a pressure P cond at the outlet of condenser 1103 detected by high-pressure side pressure detecting portion 1115a from a pressure (critical pressure) $P_{cond}$ at the critical point stored in the control device in advance, is smaller than a value (for example, $\Delta p=0.4$ MPa) determined in advance (EP of FIG. 38), from the discharge port of compressor 102 to the inlet of expansion valve 1104, by determining that a disproportionation reaction occurs in the working fluid containing R1123, or there is a concern about occurrence of a disproportionation reaction, the opening degree of expansion valve 1104 is controlled to be high to avoid continuity under the high-pressure condition.

As a result, as illustrated by NP in FIG. 38, the refrigeration cycle in FIG. 38 acts on the high pressure (compression pressure) to decrease, and it is possible to suppress the pressure rise that causes occurrence of a disproportionation reaction and occurs after a disproportionation reaction.

In the working fluid containing R1123, it is preferable to use the control method in a case of a non-azeotropic state, in particular, in a case where a temperature gradient is large in the condensation pressure.

<Modification Example 2 of Control Method>

In addition, instead of the control method using the above-described critical temperature or the critical pressure as a standard, a control method based on the overcooling degree may be used.

Figure 39:
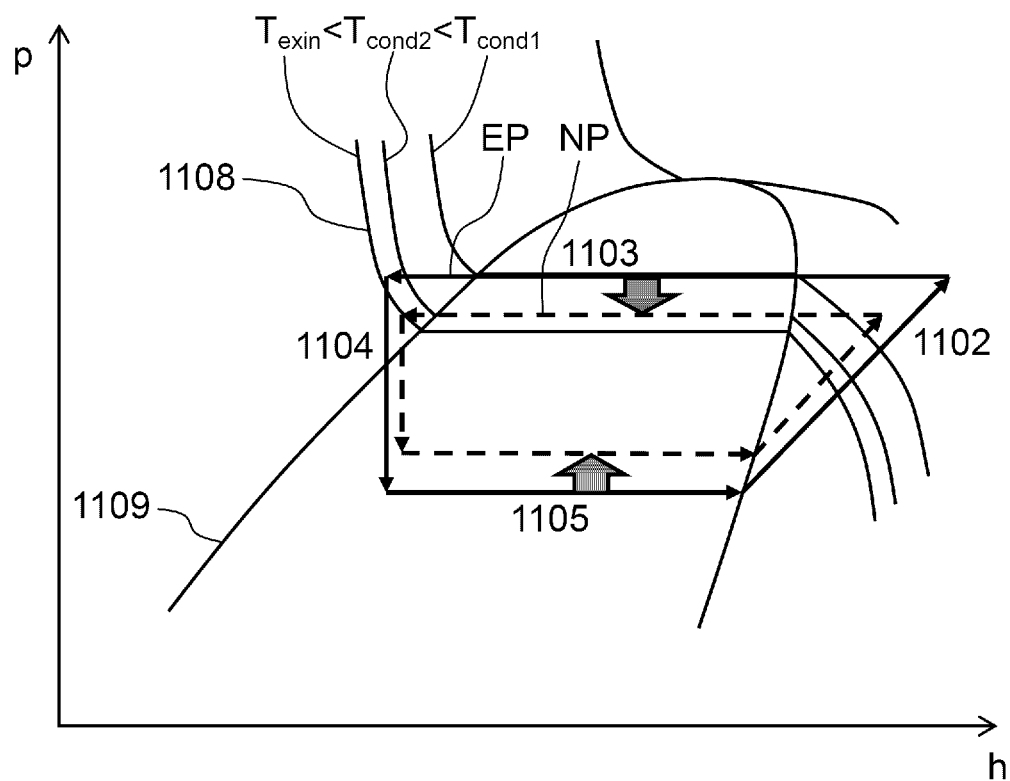
FIG. 39 is a Mollier diagram illustrating a control operation of Modification Example 2 of a control method of the refrigeration cycle device in the seventh embodiment of the present invention.

FIG. 39 is a Mollier diagram illustrating a control operation of Modification Example 2 of a control method of refrigeration cycle device 1101 in the seventh embodiment of the present invention.

In FIG. 39, the refrigeration cycle which is under an excessive pressure condition which is a cause of occurrence of a disproportionation reaction, is considered as EP, and is illustrated by a solid line, and the refrigeration cycle which is under a normal operation is considered as NP, and is illustrated by a broken line.

In general, in refrigeration cycle device 1101, by appropriately controlling the refrigeration cycle of expansion valve 1104 or compressor 1102, and by making the size of the heat exchanger and the refrigerant filling amount appropriate, the temperature of the refrigerant in the inside of condenser 1103 is set so that the temperature increases by a certain degree with respect to the surrounding medium. In addition, in general, the overcooling degree is a value which is approximately 5K. Even in the working fluid which is similarly used in refrigeration cycle device 1101 and contains R1123, similar measures are taken.

In refrigeration cycle device 1101 in which the above-described measure is taken, if the pressure of refrigerant is excessively high, there is also a tendency for the overcooling degree of the inlet of expansion valve 1104 to increase as illustrated by EP of FIG. 39. In addition, in the embodiment, considering the overcooling degree of the refrigerant of the inlet of expansion valve 1104 as a standard, the opening degree of expansion valve 1104 is controlled.

In addition, in the embodiment, considering the overcooling degree of the refrigerant at the inlet of expansion valve 1104 when the normal operation is performed as 5K, using 15K which is three times the value as a criterion, the opening degree of expansion valve 1104 is controlled. The overcooling degree which is a threshold value is three times the value, because there is a possibility that the overcooling degree changes within the range according to the operation condition.

Specifically, first, the overcooling degree is calculated from the detected value of condensation temperature detecting portion 1110a and the detected value of condenser outlet temperature detecting portion 1110b. The overcooling degree is a value obtained by subtracting the detected value of condenser outlet temperature detecting portion 1110b from the detected value of condensation temperature detecting portion 1110a. In addition, when the overcooling degree at the inlet of expansion valve 1104 reaches the value (15K) determined in advance, an operation of controlling the opening degree of expansion valve 1104 to be high is performed, and the condensation pressure at a high-pressure part of refrigeration cycle device 1101 is controlled to decrease (from a solid line to a broken line of FIG. 39).

Since the decrease in condensation pressure is the same as the decrease in condensation temperature, the condensation temperature decreases from $T_{cond1}$ to $T_{cond2}$, and the overcooling degree at the inlet of expansion valve 1104 decreases from $T_{cond1}-T_{exin}$ to $T_{cond2}-T_{exin}$ (here, a working fluid temperature of the inlet of expansion valve 1104 does not change, and is $T_{exin}$). As described above, since the overcooling degree also decreases according to the decrease in condensation pressure in the inside of refrigeration cycle device 1101, it is ascertained that the control in condensation pressure in the inside of refrigeration cycle device 1101 even in a case where the overcooling degree is considered as a standard.

Figure 40:
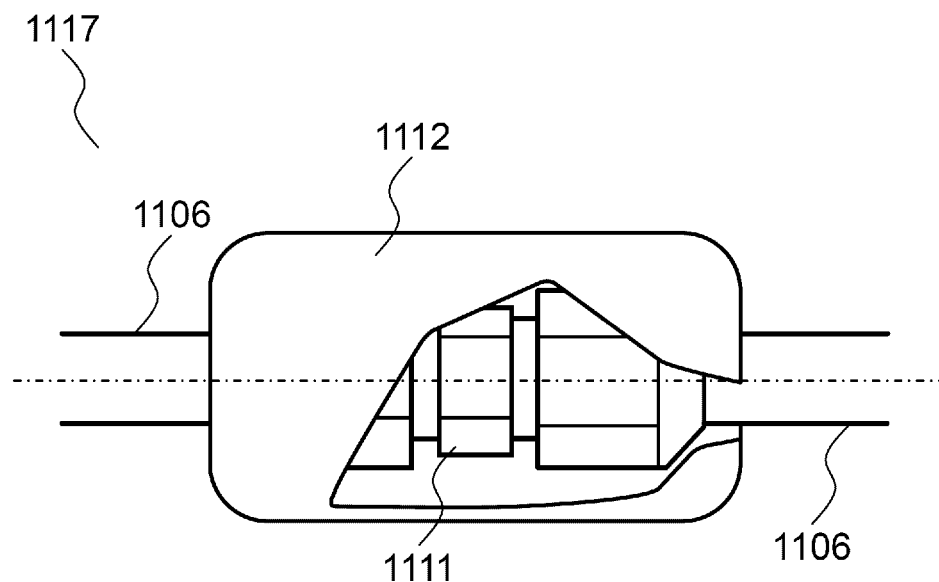
FIG. 40 is a view illustrating a piping joint which configures a part of piping of the refrigeration cycle device of the seventh embodiment of the present invention.

FIG. 40 is a view illustrating piping joint 1117 which configures a part of piping of refrigeration cycle device 1101 of the seventh embodiment of the present invention.

In a case where refrigeration cycle device 1101 of the present invention is used, for example, in home spilt type air conditioner (air conditioner), the refrigeration cycle device 1101 is configured of an outdoor unit including an outdoor heat exchanger and an indoor unit including an indoor heat exchange. The outdoor unit and the indoor unit cannot be integrated with each other in the configuration. Accordingly, by using a mechanical joint which is illustrated in FIG. 40 similar to union flare 1111, the outdoor unit and the indoor unit are connected to each other at an installation location.

If a connection state of the mechanical joint deteriorates due to a cause when the work is not sufficient, or the like, the refrigerant leaks from the joint part, and this causes the negative influence on the equipment performance. In addition, since the working fluid containing R1123 itself is greenhouse gas having a greenhouse effect, there is also a concern about a negative influence on global environment. Accordingly, the refrigerant leakage is rapidly detected and repaired.

Examples of a method for detecting the refrigerant leakage include a method of coating the part with a detection agent, and detecting whether or not bubbles are generated, and a method of using a detection sensor, but it takes time and effort in each method.

Here, in the embodiment, by winding seal 1112 containing a polymerization promoter on an outer circumference of union flare 1111, the detection of refrigerant leakage becomes easy, and reduction of leakage amount is achieved.

Specifically, in the working fluid containing R1123, when polymerization reaction occurs, generation of polytetrafluoroethylene which is one of a fluorinated carbon resin is used. Specifically, by intentionally bringing the working fluid containing R1123 and polymerization promoter into contact with each other at the location of leakage, at the location of leakage, polytetrafluoroethylene is configured to be extracted and solidified. As a result, since the leakage is likely to be detected easily and visually, it is possible to shorten the time which is taken for finding the leakage and performing the repair.

Furthermore, since a part at which polytetrafluoroethylene is generated is a part of leakage of the working fluid containing R1123, spontaneously, since a polymerization product is generated and adheres to a part at which the leakage is prevented, it is also possible to reduce the leakage amount.

(Eighth Embodiment)

Next, an eighth embodiment of the present invention will be described.

Figure 41:
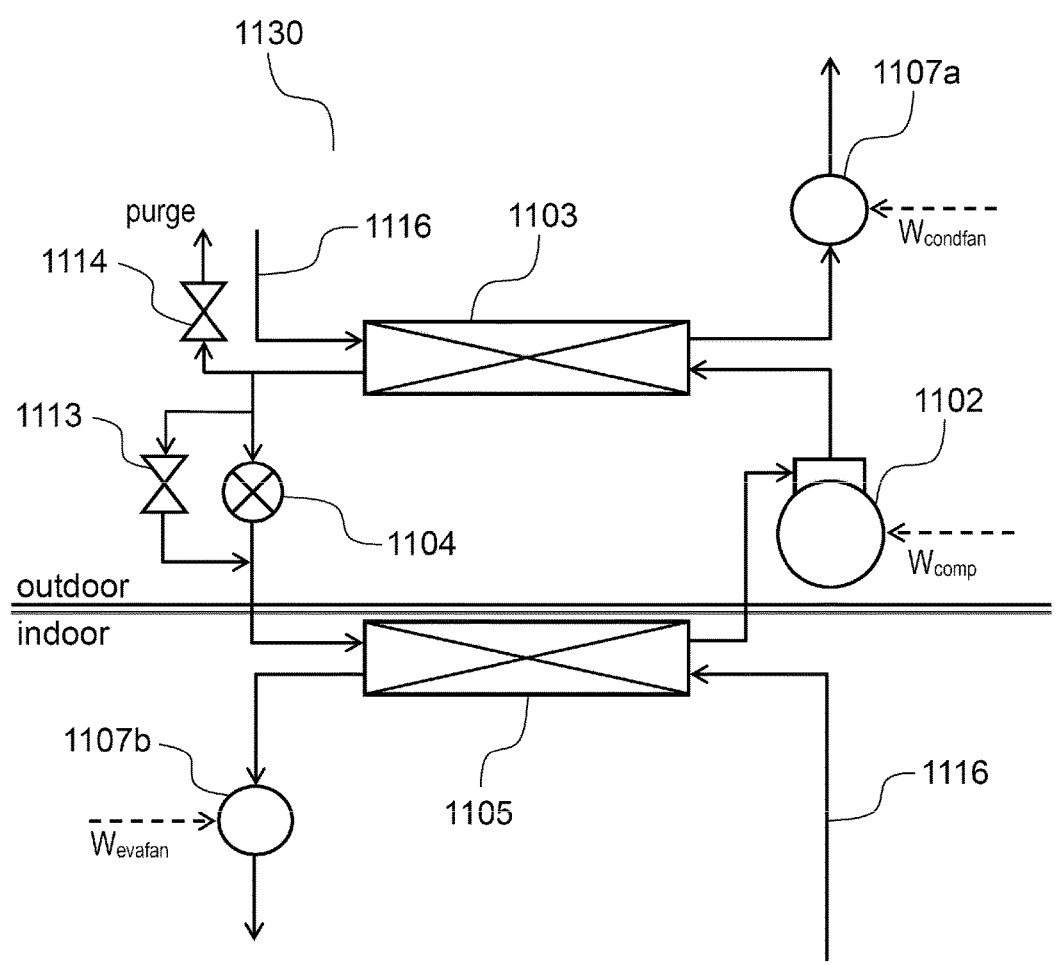
FIG. 41 is a view illustrating a configuration of a refrigeration cycle device according to an eighth embodiment of the present invention.

FIG. 41 is a view illustrating a configuration of refrigeration cycle device 1130 according to the eighth embodiment of the present invention.

Refrigeration cycle device 1130 illustrated in FIG. 41 and refrigeration cycle device 1101 of the seventh embodiment, are different from each other in that bypass pipe 1113 provided with an opening and closing valve, and is connected to the inlet and the outlet of expansion valve 1104 is newly installed. In addition, refrigeration cycle device 1130 and refrigeration cycle device 1101 are also different from each other in that a purge line having relief valve 1114 is provided between the outlet of condenser 1103 and the inlet of expansion valve 1104. The opening side of relief valve 1114 is disposed outdoor. In addition, in FIG. 41, description of each temperature detecting portion and each pressure detecting portion which are described by using FIG. 36, is omitted.

By performing a control method (for example, a control method for controlling the opening degree of expansion valve 1104 so that a value obtained by subtracting the working fluid temperature measured by the two-phase tube of condenser 1103 from the critical temperature of the working fluid containing R1123 is equal to or greater than 5K, or a control method for performing the control so that a difference between the critical pressure of the working fluid and the pressure detected by high-pressure side pressure detecting portion 1115*a* is equal to or greater than 0.4 MPa) described in the seventh embodiment, even in a case where the opening degree of expansion valve 1104 is high, there is a possibility that a case where the decrease in pressure is not improved, or a situation in which a speed of decrease in pressure is desired to be raised, occur.

Here, in a case where the above-described situation is generated, by opening the opening and closing valve provided in bypass pipe 1113 of the embodiment, and by allowing the refrigerant to flow to bypass pipe 1113, the pressure of the working fluid on a high pressure side rapidly decreases and it is possible to suppress damage of refrigeration cycle device 1130.

Furthermore, in addition to the control of increasing the opening degree of expansion valve 1104, and the control of the opening and closing valve provided in bypass pipe 1113, the control is more preferable since damage of refrigeration cycle device 1130 is prevented if compressor 1102 is emergency-stopped. In addition, in a case where compressor 1102 is emergency-stopped, it is preferable not to stop fluid machineries 1107*a* and 1107*b* since the pressure of the working fluid on the high-pressure side rapidly decreases.

Even in a case where the above-described response is performed, a case where a disproportionation reaction is not suppressed, specifically, a case where a difference between the critical temperature of the working fluid and the condensation temperature detected by condensation temperature detecting portion 1110*a* is less than 5K, or a case where a difference between the critical pressure of the working fluid and the pressure detected by high-pressure side pressure detecting portion 1115*a* is less than 0.4 MPa, are assumed. In this case, since there is a concern that the pressure of the refrigerant in the inside of refrigeration cycle device 1130 increases, a necessity of releasing the refrigerant of which the pressure is high to the outside, and preventing damage of refrigeration cycle device 1130, is generated. Here, relief valve 1114 which purges the working fluid containing R1123 in the inside of refrigeration cycle device 1130 to an outer space, is controlled to open.

Here, it is preferable that an installation position of relief valve 1114 in refrigeration cycle device 1130 is on a high-pressure side. Furthermore, it is particularly preferable that relief valve 1114 is installed from the outlet of condenser 1103 illustrated in the embodiment to the inlet of expansion valve 1104 (at this position, since the working fluid is in a high-pressure overcooling liquid state, a water hammering action which causes a result of rapid pressure rise according to a disproportionation reaction is likely to occur), or relief valve 1114 is installed from the discharge portion of compressor 1102 to the inlet of condenser 1103 (at this position, since the working fluid is present in a high-temperature and high-pressure gas state, a molecular motion becomes active, and a disproportionation reaction is likely to occur).

Relief valve 1114 is provided on the outdoor unit side. In this case, the aspect is called an aspect which is considered not to directly influence a human and commodity, since a configuration in which the working fluid is not emitted to a residential space on the indoor side in a case of the air conditioner, and the working fluid is not emitted to a product display side, such as a showcase, in a case of a freezing and refrigeration unit, is possible.

In addition, it is preferable to turn off a power source, for example, to open relief valve 1114 and stop refrigeration cycle device 1130, from the viewpoint of safety.

(Ninth Embodiment)

Next, a ninth embodiment of the present invention will be described.

Figure 42:
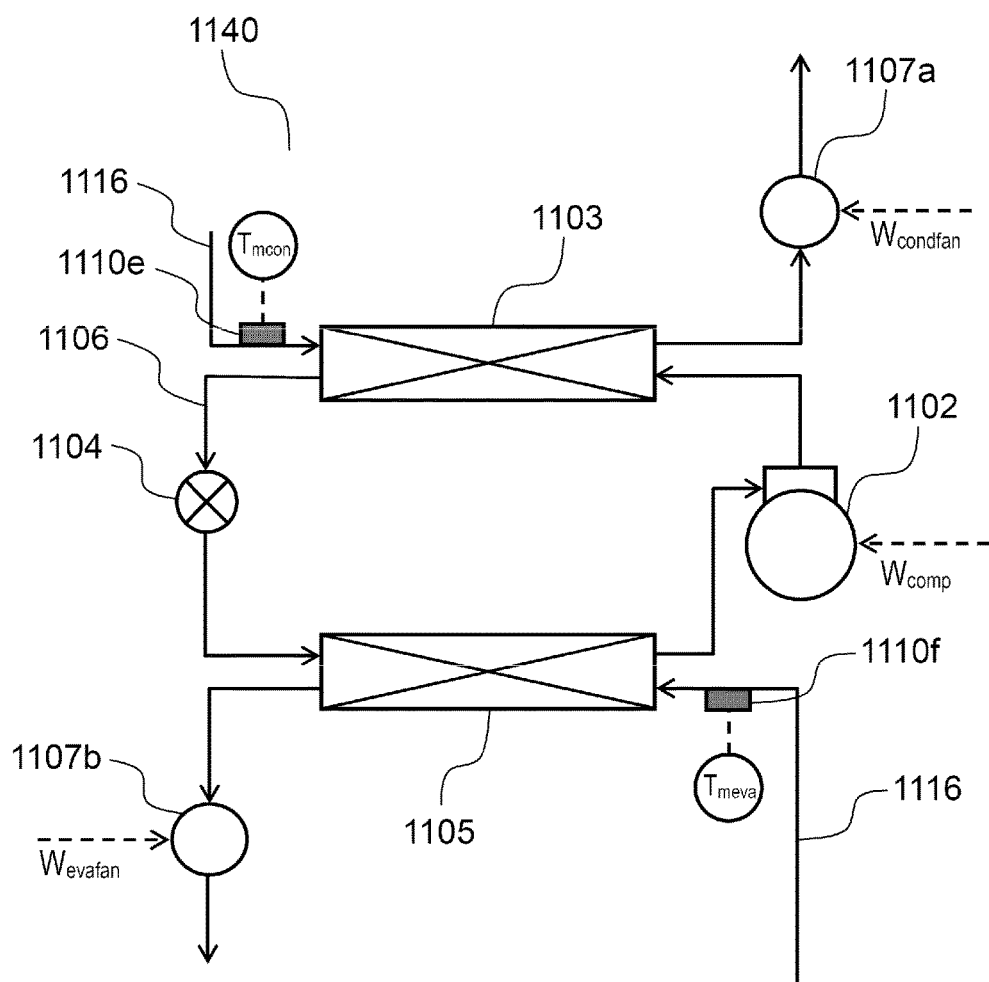
FIG. 42 is a view illustrating a configuration of a refrigeration cycle device according to a ninth embodiment of the present invention.

FIG. 42 is a view illustrating a configuration of refrigeration cycle device 1140 according to the ninth embodiment of the present invention.

Refrigeration cycle device 1140 illustrated in FIG. 42 and refrigeration cycle device 1101 of the seventh embodiment are different from each other in that first medium temperature detecting portion 1110*e* which detects the temperature of the first medium before flowing into condenser 1103, and second medium temperature detecting portion 1110*f* which detects the temperature of the second medium before flowing into evaporator 1105, are provided. Furthermore, the detected values of each temperature detecting portion and each pressure detecting portion, and input power of compressor 1102 and fluid machineries 1107a and 1107b, are stored in an electronic storage device (not illustrated) for a certain period of time.

Figure 43:
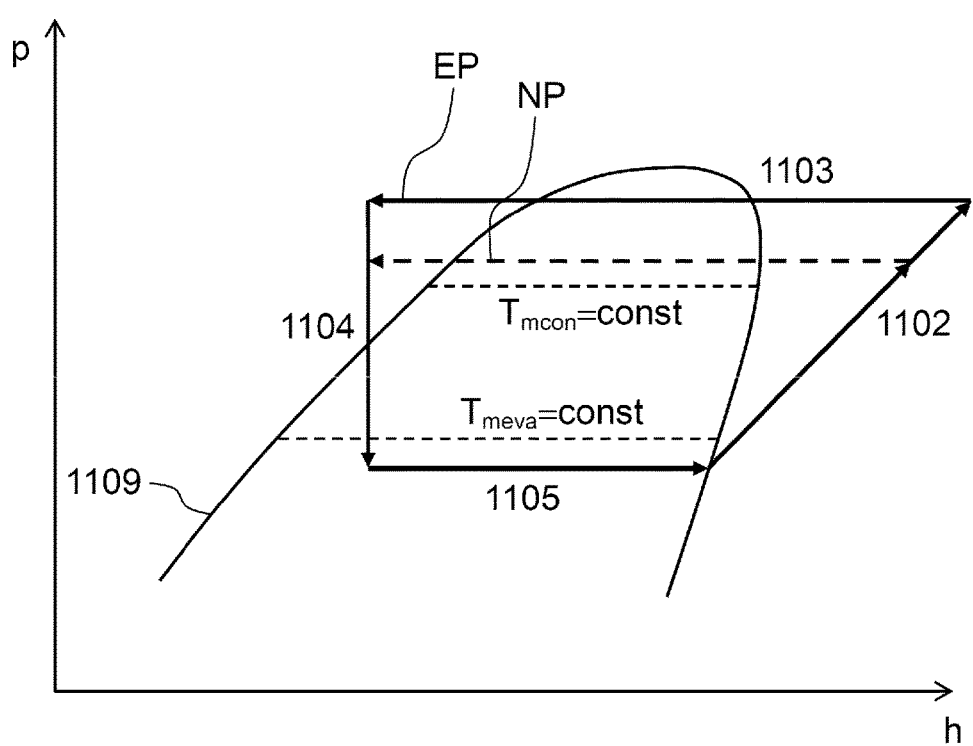
FIG. 43 is a view illustrating an operation of the refrigeration cycle device of the ninth embodiment of the present invention in a Mollier diagram.

FIG. 43 is a view illustrating an operation of refrigeration cycle device 1140 of the ninth embodiment of the present invention in a Mollier diagram.

In FIG. 43, the refrigeration cycle illustrated by EP is the condensation pressure when a disproportionation reaction occurs, and the refrigeration cycle illustrated by NP indicates the refrigeration cycle when the normal operation is performed. In addition, in FIG. 43, in order to make the description simple, a cycle change (example: a difference in evaporation pressures between NP and EP) when the condensation pressure increases is not described.

As a reason of a rapid increase in the condensation temperature of the working fluid containing R1123 which is measured in the two-phase pipe in the inside of condenser 1103, (1) a rapid increase in surrounding medium temperatures $T_{mcon}$ and $T_{meva}$, (2) a pressure rise action due to an increase in power of compressor 1102, and (3) a change in flow (a change in power of any of fluid machineries 1107a and 1107b which drives the surrounding medium) of the surrounding medium, are considered. In addition, as a specific phenomenon of the working fluid containing R1123, (4) a pressure rise action due to a disproportionation reaction is employed. Here, in the embodiment, in order to specify that a disproportionation reaction occurs of (4), the control is performed after determining that phenomenon of (1) to (3) does not occur.

Here, in the control method of the embodiment, in a case where an amount of change in the condensation temperature of the working fluid containing R1123 with respect to an amount of change in temperature or input power of (1) to (3), expansion valve 1104 is controlled to open.

Hereinafter, a specific control method will be described. First, since it is difficult to compare the amount of change in temperature and the amount of change in input power value with each other under the same standard, when measuring the amount of change in temperature, the input power is controlled not to change. In other words, when measuring the amount of change in temperature, a motor rotation speed of compressor 1102 and fluid machineries 1107a and 1107b are maintained to be constant.

For example, the amount of change in temperature is measured at a certain time interval, for example, for 10 seconds to 1 minute. Before the measurement, for example, approximately 10 seconds to 1 minute ago, the amount of input power of compressor 1102 and fluid machineries 1107a and 1107b is controlled to be maintained to a certain value. At this time, an amount of change per unit time of the amount of input power of compressor 1102 and fluid machineries 1107a and 1107b substantially becomes zero. Here, the amount is "substantially" zero because a change in a suctioned state of compressor 1102 due to deviation of refrigerant in compressor 1102, or a slight change in input power due to influence of blowing of wind or the like in a case where the first medium and the second medium are surrounding air in fluid machineries 1107a and 1107b, are generated. In other words, the "substantially zero" means that the amount of change includes a slight behavior and is smaller than a predetermined value determined in advance.

Under the above-described condition, in a case where the amount of change per unit time of the condensation temperature measured by condensation temperature detecting portion 1110a is greater than any of the amount of change per unit time of the temperature of the first medium detected by first medium temperature detecting portion 1110e, and the amount of change per unit time of the temperature of the second medium detected by second medium temperature detecting portion 110f, it is considered that a disproportionation reaction occurs, expansion valve 1104 is controlled to open.

In addition, only in controlling the opening degree of expansion valve 1104, to be prepared for a case where the pressure rise generated according to a disproportionation reaction cannot be controlled, similar to the eighth embodiment, bypass pipe 1113 may be provided in parallel with expansion valve 1104, compressor 1102 may be emergency-stopped, and further, means, such as relief valve 1114, which reduces the pressure by emitting the refrigerant to the outside may be provided.

In addition, in the embodiment, a control example of expansion valve 1104 in which control is performed considering the amount of change of the temperature detecting portion installed in the two-phase pipe of condenser 1103 as a standard, but an amount of change in pressure at any point from the discharge portion of compressor 1102 to the inlet of expansion valve 1104 may be considered as a standard, and an amount of change in overcooling degree of the inlet of expansion valve 1104 may be considered as a standard.

In addition, using the embodiment being combined with any of the above-described seventh embodiment or the eighth embodiment, is preferable since it is possible to further improve the reliability.

(Tenth Embodiment)

Next, a tenth embodiment of the present invention will be described.

Figure 44:
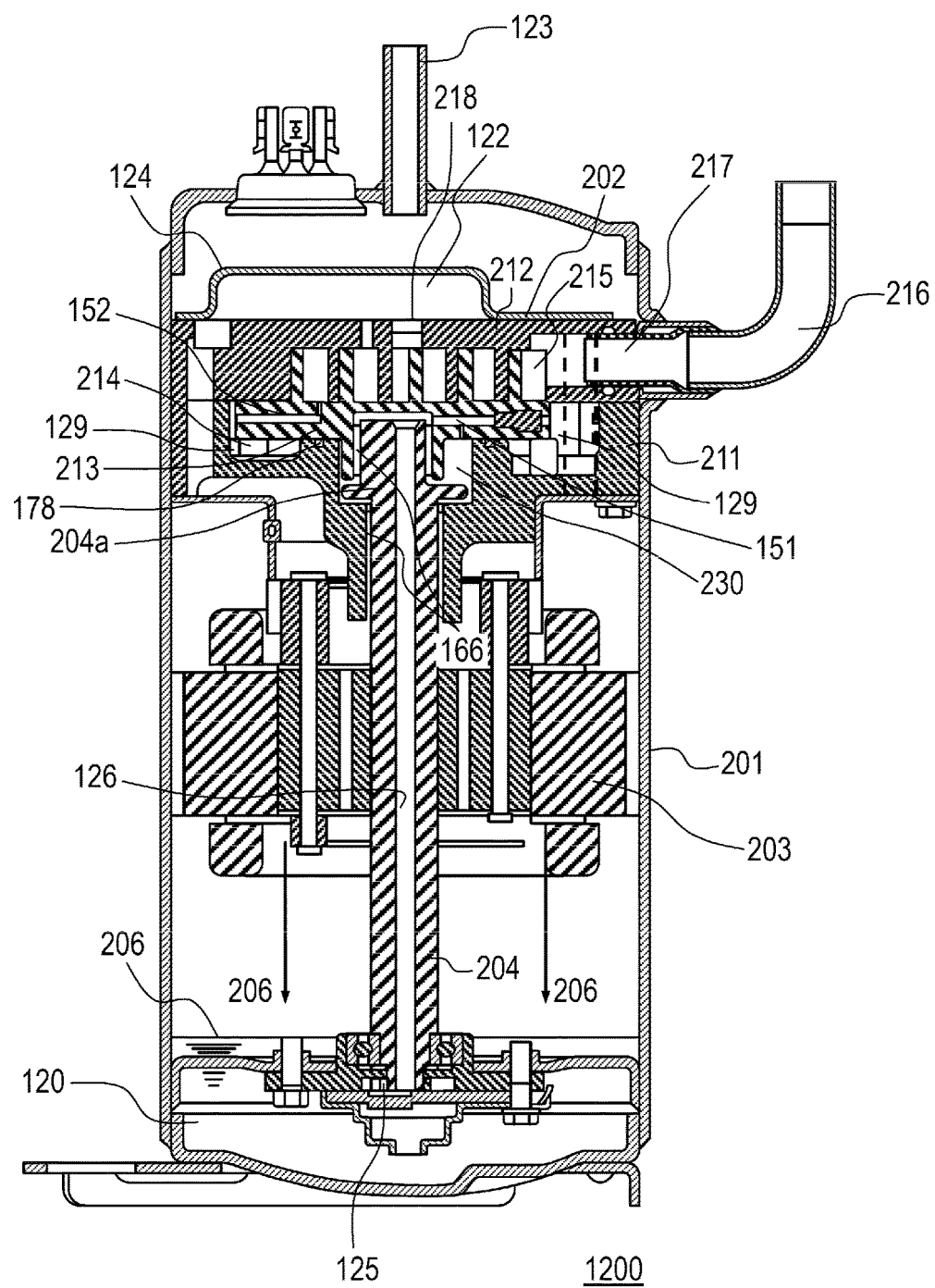
FIG. 44 is a sectional view of a scroll compressor according to a tenth embodiment of the present invention.

FIG. 44 is a sectional view of scroll compressor 1200 according to a tenth embodiment of the present invention.

Since the embodiment is the same as the sixth embodiment except the presence and absence of reed valve 219 provided in discharge hole 218, description of configurations other than this will be omitted.

In the sixth embodiment, discharge hole 218 is provided in reed valve 219 (check valve), but in the embodiment, reed valve 219 is not provided in discharge hole 218. Therefore, discharge chamber 122 always communicates with compression chamber 215 in the vicinity thereof via discharge hole 218, and discharge chamber 122 and compression chamber 215 are placed in a substantially same pressure state. In addition, in the embodiment, since reed valve 219 is not provided in discharge hole 218, valve stop 121 is also not provided, either.

Since a condition in which a disproportionation reaction is particularly likely to occur is a condition under an excessive high temperature and high pressure, there is a case where a state where the condition is not a predetermined operation condition, for example, a state where the refrigerant piping in the refrigeration cycle circuit is blocked, blowing of the condenser is stopped, and the discharge pressure (high-pressure side of the refrigeration cycle circuit) excessively increases due to forgetting of opening of two-way valve or three-way valve, or a state where the compression mechanism does not perform compression work of increasing the pressure of the refrigerant due to insufficient torque of an electric motor (motor portion 3) of the compressor, is generated.

Under the condition, when the power continues to be supplied to scroll compressor 1200, a current is excessively supplied to the electric motor which configures scroll compressor 1200, and the electric motor generates heat. As a result, the electric motor in scroll compressor 1200 is used as a heating element with respect to the refrigerant, and the pressure and the temperature of the refrigerant in the inside increases. As a result, an insulator of the winding wire which configures a stator of the electric motor is dissolved, core wires (conducting wire) of the winding wire come into contact with each other, and a phenomenon which is called layer short-circuit occurs. Since high energy is instantaneously transferred to the surrounding refrigerant, the layer short-circuit can become a starting point of a disproportionation reaction.

Here, in the embodiment, even in a case where the power continues to be supplied to the electric motor while the compression mechanism does not perform a pressure rise operation, an aspect in which the pressure rise of airtight container 201 which accommodates the electric motor, that is, on the high-pressure side of the refrigeration cycle, is suppressed, and a condition of occurrence of a disproportionation reaction is avoided by the pressure, is achieved. Specifically, discharge chamber 122 is configured to always communicate with compression chamber 215 in the vicinity via discharge hole 218.

As described above, according to the embodiment, in a case where the power continues to be supplied to the electric motor while the compression mechanism does not perform the compression operation, the electric motor heats the refrigerant in the inside of airtight container 201 as a heating element. However, for example, even when the pressure of the refrigerant increases due to the heating, the pressure acts on compression chamber 215 via discharge hole 218, it is possible to release the pressure in the inside of airtight container 201 to the low-pressure side of the refrigeration cycle circuit by reversely rotating the compression mechanism, and therefore, it is possible to avoid an abnormal pressure rise which becomes a condition of occurrence of a disproportionation reaction.

As described above, in a first aspect illustrated from the sixth embodiment to the tenth embodiment of the present invention, a compression chamber which is formed in both directions by meshing the fixed scroll and the revolving scroll in which a spiral lap from the end plate rises with each other by using a refrigerant containing 1,1,2-trifluoroethylene as a working fluid, and by using the polyol ester oil as a compressor lubricating oil, is provided. In addition, a suction volume of the first compression chamber formed on the lap outer wall side of the revolving scroll, is greater than a suction volume of the second compression chamber formed on the lap inner wall side of the revolving scroll.

According to this configuration, since it is possible to prevent the refrigerant from being heated in the path until reaching a confining position of first compression chamber 15a, it is possible to suppress a disproportionation reaction of R1123. In addition, since a carbonyl group of the polyol ester oil captures the radicals that becomes a cause of start of a disproportionation reaction, it is possible to suppress a disproportionation reaction of R1123.

In addition, in a second aspect, in the first aspect, the working fluid may be a mixed working fluid containing difluoromethane, and a ratio of difluoromethane may be 30% by weight to 60% by weight. In addition, the working fluid may be a mixed working fluid containing tetrafluoroethane, and a ratio of tetrafluoroethane may be 30% by weight to 60% by weight. In addition, the working fluid may be a mixed working fluid containing difluoromethane and tetrafluoroethane, difluoromethane and tetrafluoroethane may be mixed, and proportions of difluoromethane and tetrafluoroethane may be 30% by weight to 60% by weight.

According to this, it is possible to suppress a disproportionation reaction of R1123, and to improve a refrigeration performance or COP.

In a third aspect, in the first or the second aspect, the polyol ester oil may be at least one type selected from the group of neopentylglycol, trimethylolpropane, pentaerythritol, and dipentaerythritol as a constituent alcohol.

According to this, since it is possible to freely adjust viscosity of the refrigerator oil, it is possible to ensure the oil film between the vane and the piston, and to suppress generation of sliding heat.

In a fourth aspect, in any one aspect among the first to third aspects, the polyol ester oil may contain the phosphate ester anti-wear agent.

Accordingly, by reducing wear as the anti-wear agent is adsorbed to the front surface of the sliding portion, it is possible to suppress heat generation, and to suppress self-degradable reaction of the refrigerant R1123.

In a fifth aspect, in any one aspect of the first to third aspects, the polyol ester oil may contain the phenolic antioxidant.

According to this, since the phenolic antioxidant rapidly captures the radicals generated by the sliding portion, it is possible to prevent the radicals from reacting to the refrigerant R1123.

In a sixth aspect, in any one of the first to third aspects, the polyol ester oil may be lubricating oil which is obtained by mixing a lubricating oil having a higher viscosity than that of the base oil with a terpene type or a terpenoid type of which an amount is equal to or greater than 1% and less than 50%, or is obtained by mixing a lubricating oil having a super-high viscosity of which an amount is equal to or greater than that of a terpene type or a terpenoid type in advance therewith, and by mixing an oil additive of which the viscosity is adjusted to be viscosity equivalent to that of the base oil with the base oil.

According to this, it is possible to suppress a disproportionation reaction of R1123.

In a seventh aspect, in any one of the first to third aspects, a motor portion which drives the revolving scroll may be provided, and the motor portion may use an electrical wire which is obtained by coating a conductor with the thermosetting insulating material and baking with the insulating film therebetween, as a coil.

According to this, by coating the winding wire of the coil for the electric motor in the compressor with the thermosetting insulating material, while maintaining high resistance between the winding wires even in a state where the coil infiltrates into the liquid refrigerant, it is possible to suppress the discharge, and as a result, to suppress decomposition of the refrigerant R1123.

In an eighth aspect, in any one of the first to third aspects, an airtight container which accommodates the compression chamber and the motor portion therein, may be provided, and the airtight container may include a power supply terminal which is installed in a mouth portion via the insulating member, and the connection terminal for connecting the power supply terminal to a lead wire. In addition, the doughnut-like insulating member which adheres to the insulating member may be pipe-connected to the power supply terminal on an inner side of the airtight container.

According to this, since the insulating member is added to the power supply terminal on the inner side of the metal housing, by extending the shortest distance between conductors, it is possible to suppress an insulation defect of the power supply terminal, and to prevent ignition due to the discharge energy of R1123. In addition, it is possible to prevent a hydrogen fluoride generated when R1123 is decomposed from coming into contact with a glass insulating material, and to prevent the glass insulating material from corroding and being damaged.

In a ninth aspect, in the first to eighth aspects, the refrigeration cycle device is a refrigeration cycle device, in which the compressor of any one of aspects; the condenser which cools a refrigerant gas that is compressed by the compressor and has a high pressure; the throttle mechanism which reduces the pressure of the high-pressure refrigerant which is liquefied by the condenser; and the evaporator which gasifies the refrigerant of which the pressure is reduced by the throttle mechanism, are linked to each other by the piping.

According to this, it is possible to suppress a disproportionation reaction of R1123, to improve a refrigeration performance and COP.

In a tenth aspect, in the ninth aspect, the condensation temperature detecting portion provided in the condenser may be provided, and a difference between the critical temperature of the working fluid and the condensation temperature detected by the condensation temperature detecting portion may control the opening degree of the throttle mechanism to become equal to or greater than 5K.

According to this, by making the working fluid temperature measured by the temperature detecting portion correspond to the pressure, it is possible to suppress the opening degree of the throttle mechanism to limit the working fluid temperature (pressure) on a high-pressure side to be equal to or greater than 5K considering a margin of safety from the critical pressure. Accordingly, since it is possible to prevent the higher condensation pressure from excessively increasing, as a result (result in which the distance by which the molecules approach each other), it is possible to suppress a disproportionation reaction which suppresses a disproportionation reaction which is a concern to be generated, and to ensure the reliability of the device.

In an eleventh aspect, in the ninth aspect, the high-pressure side pressure detecting portion provided between the discharge portion of the compressor and the inlet of the throttle mechanism, may be provided, and the difference between the critical pressure of the working fluid and the pressure detected by the high-pressure side pressure detecting portion may control the opening degree of the throttle mechanism to be equal to or greater than 0.4 MPa.

According to this, regarding the working fluid containing R1123, in particular, in a case where a zeotropic refrigerant having a large temperature gradient is used, it is possible to more accurately detect the pressure of the refrigerant, and further, to decrease the pressure (condensation pressure) on the high-pressure side in the refrigeration cycle device by performing the control of the opening degree of the throttle mechanism by using the detection result. Accordingly, it is possible to suppress a disproportionation reaction, and to improve the reliability of the device.

In a twelfth aspect, in the ninth aspect, the condenser outlet temperature detecting portion provided between the condenser and the throttle mechanism may be provided, and may control the opening degree of the throttle mechanism so that the difference between the condensation temperature detected by the condensation temperature detecting portion and the condenser output temperature detected by the condenser outlet temperature detecting portion is equal to or less than 15K.

According to this, by using the detection result of the overcooling degree illustrated by the difference between the condensation temperature detecting portion and the condenser outlet temperature detecting portion, it is possible to perform the control of the opening degree of the throttle mechanism, and to prevent the pressure of the working fluid in the inside of the refrigeration cycle device from excessively increasing. Accordingly, it is possible to suppress a disproportionation reaction, and to improve the reliability of the device.

In a thirteenth aspect, in the ninth aspect, the first transporting portion which transports the first medium that exchanges the heat in the condenser, a second transporting portion which transports the second medium that exchanges the heat in the evaporator, the condensation temperature detecting portion which is provided in the condenser, the first medium temperature detecting portion which detects the temperature of the first medium before flowing into the condenser, and the second medium temperature detecting portion which detects the temperature of the second medium before flowing into the evaporator, are provided. In addition, a case where at least any one of the amount of change per unit time of the input of the compressor, the amount of change per unit time of the input of the first transporting portion, and the amount of change per unit time of the input of the second transporting portion, is smaller than a predetermined value determined in advance. In addition, in a case where the amount of change per unit time of the temperature of the first medium detected by the first medium temperature detecting portion is greater than any one of the amount of change per unit time of the condensation temperature detected by the condensation temperature detecting portion, and the amount of change per unit time of the temperature of the second medium detected by the second medium temperature detecting portion, the throttle mechanism may be controlled in the opening direction.

According to this, in a case where an aspect of the surrounding medium does not change, in a case where the condensation temperature rapidly changes, since it is considered that the pressure increases due to a disproportionation reaction, it is possible to control the opening degree of the throttle mechanism to be high. Accordingly, it is possible to improve the reliability of the device.

In a fourteenth aspect, in any one of the ninth to thirteenth aspects, the outer circumference of the joint of the piping which configures the refrigeration cycle circuit may be covered with a sealing compound containing the polymerization promoter.

According to this, in a case where the working fluid leaks from the joint, the polymerization product is generated as polymerization reaction is performed with respect to the polymerization promoter contained in the sealing compound and the working fluid containing R1123. Accordingly, the leakage is likely to be visually confirmed, the polymerization product acts to prevent the flow of the refrigerant emitted to the outside, and it is possible to control the leakage of the refrigerant.

In a fifteenth aspect, in any one of the first to eighth aspects, the discharge chamber may always communicate with the compression chamber via the discharge hole.

According to this, the power is supplied to the electric motor while the compression mechanism does not perform the compression operation, the electric motor heats the refrigerant in the inside of the airtight container as the heat element, and even when the pressure of the refrigerant increases, the pressure acts on the compression chamber via the discharge hole, and the pressure in the inside of the airtight container is released to the low-pressure side of the refrigeration cycle circuit by reversely rotating the compression mechanism. Therefore, it is possible to avoid the abnormal pressure rise which becomes a condition of occurrence of a disproportionation reaction.

INDUSTRIAL APPLICABILITY

As described above, the present invention is effective since it is possible to provide a compressor, lubricating oil, and a refrigeration cycle device which are more appropriate than using the working fluid containing R1123, and thus, it is also possible to be employed in use of a water heater, a car air conditioner, a refrigerator-freezer, and a dehumidifier.

REFERENCE MARKS IN THE DRAWINGS

1 AIRTIGHT CONTAINER
2 COMPRESSION MECHANISM PORTION
3 MOTOR PORTION
4 SHAFT
4a ECCENTRIC SHAFT PORTION
6 COMPRESSOR LUBRICATING OIL
11 MAIN BEARING MEMBER
12 FIXED SCROLL
13 REVOLVING SCROLL
13c REVOLVING SCROLL LAP
13e REAR SURFACE
14 ROTATION RESTRAINING MECHANISM
15 COMPRESSION CHAMBER
15a, 15a-1, 15a-2 FIRST COMPRESSION CHAMBER
15b, 15b-1, 15b-2 SECOND COMPRESSION CHAMBER
16 SUCTION PIPE
17 SUCTION PORT
18 DISCHARGE HOLE
19 REED VALVE
20 OIL STORAGE PORTION
25 PUMP
26 OIL SUPPLY HOLE
29 BACKPRESSURE CHAMBER
30 HIGH-PRESSURE REGION
31 DISCHARGE CHAMBER
32 MUFFLER
50 DISCHARGE PIPE
61 COMPRESSOR
62 CONDENSER
63 THROTTLE MECHANISM
64 EVAPORATOR
66 BEARING PORTION
68, 68a-1, 68a-2, 68b-1, 68b-2, 68ab-1, 68ab-2, 68ab-3 BYPASS HOLE
69 VALVE STOP
71 POWER SUPPLY TERMINAL
72 GLASS INSULATING MATERIAL
73 METAL LID BODY
74 FLAG TERMINAL
75 LEAD WIRE
76 INSULATING MEMBER
78 SEAL MEMBER
100, 101, 130, 140 REFRIGERATION CYCLE DEVICE
102 COMPRESSOR
103 CONDENSER
104 EXPANSION VALVE
105 EVAPORATOR
106 REFRIGERANT PIPING
107a, 107b FLUID MACHINERY
108 ISOTHERM
109 SATURATION LIQUID LINE AND SATURATION VAPOR LINE
110a CONDENSATION TEMPERATURE DETECTING PORTION
110b CONDENSER OUTLET TEMPERATURE DETECTING PORTION
110c EVAPORATION TEMPERATURE DETECTING PORTION
110d SUCTION TEMPERATURE DETECTING PORTION
110e FIRST MEDIUM TEMPERATURE DETECTING PORTION
110f SECOND MEDIUM TEMPERATURE DETECTING PORTION
111 UNION FLARE
112 SEAL
113 BYPASS PIPE
114 RELIEF VALVE
115a HIGH-PRESSURE SIDE PRESSURE DETECTING PORTION
115b LOW-PRESSURE SIDE PRESSURE DETECTING PORTION
116 FLOW PATH OF SURROUNDING MEDIUM
117 PIPING JOINT
120 OIL STORAGE PORTION
121 VALVE STOP
122 DISCHARGE CHAMBER
123 DISCHARGE PIPE
124 MUFFLER
125 PUMP
126 OIL SUPPLY HOLE
129 BACKPRESSURE CHAMBER
161 COMPRESSOR
162 CONDENSER
163 THROTTLE MECHANISM
164 EVAPORATOR
166 BEARING PORTION
168, 168a-1, 168a-2, 168b-1, 168b-2, 168ab-1, 168ab-2, 168ab-3 BYPASS HOLE
171 POWER SUPPLY TERMINAL
172 GLASS INSULATING MATERIAL
173 METAL LID BODY
174 FLAG TERMINAL
175 LEAD WIRE
176 INSULATING MEMBER
178 SEAL MEMBER
200 SCROLL COMPRESSOR
201 AIRTIGHT CONTAINER
202 COMPRESSION MECHANISM PORTION
203 MOTOR PORTION
204 SHAFT
204a ECCENTRIC SHAFT PORTION
206 COMPRESSOR LUBRICATING OIL
211 MAIN BEARING MEMBER
212 FIXED SCROLL
213 REVOLVING SCROLL
213e REAR SURFACE
214 ROTATION RESTRAINING MECHANISM
215 COMPRESSION CHAMBER
215a FIRST COMPRESSION CHAMBER
215b SECOND COMPRESSION CHAMBER
216 SUCTION PIPE
217 SUCTION PORT
218 DISCHARGE HOLE
219 REED VALVE
230 HIGH-PRESSURE REGION
1100, 1101, 1130, 1140 REFRIGERATION CYCLE DEVICE
1102 COMPRESSOR
1103 CONDENSER
1104 EXPANSION VALVE
1105 EVAPORATOR
1106 REFRIGERANT PIPING 1107a, 1107b FLUID MACHINERY
1108 ISOTHERM
1109 SATURATION LIQUID LINE AND SATURATION VAPOR LINE
1110a CONDENSATION TEMPERATURE DETECTING PORTION
1110b CONDENSER OUTLET TEMPERATURE DETECTING PORTION
1110c EVAPORATION TEMPERATURE DETECTING PORTION
1110d SUCTION TEMPERATURE DETECTING PORTION
1110e FIRST MEDIUM TEMPERATURE DETECTING PORTION
1110f SECOND MEDIUM TEMPERATURE DETECTING PORTION
1111 UNION FLARE
1112 SEAL
1113 BYPASS PIPE
1114 RELIEF VALVE
1115a HIGH-PRESSURE SIDE PRESSURE DETECTING PORTION
1115b LOW-PRESSURE SIDE PRESSURE DETECTING PORTION
1116 FLOW PATH OF SURROUNDING MEDIUM
1117 PIPING JOINT
1200 SCROLL COMPRESSOR

The invention claimed is:
1. A compressor which uses a refrigerant containing 1,1,2-trifluoroethylene as a working fluid, and uses a polyol ester oil as a compressor lubricating oil, comprising
a fixed scroll and a revolving scroll each having a spiral lap rising from an end plate;
a compression chamber which is formed by meshing the fixed scroll and the revolving scroll;
a discharge hole which is provided at a center position of the end plate of the fixed scroll, and is open to a discharge chamber;
a bypass hole which is provided in the end plate of the fixed scroll, and communicates with the compression chamber and the discharge chamber at a timing different from a timing at which the compression chamber communicates with the discharge hole; and
a check valve which is provided in the bypass hole, and allows a flow from a compression chamber side to a discharge chamber side,
wherein the working fluid is selected from the group consisting of
a mixed working fluid comprising 1,1,2-trifluoroethylene and difluoromethane, the difluoromethane being at least 30% by weight to at most 60% by weight in the mixed working fluid,
a mixed working fluid comprising 1,1,2-trifluoroethylene and tetrafluoroethane, the tetrafluoroethane being at least 30% by weight to at most 60% by weight in the mixed working fluid, and
a mixed working fluid comprising 1,1,2-trifluoroethylene, difluoromethane, and tetrafluoroethane, a combination of the difluoromethane and the tetrafluoroethane being at least 30% by weight to at most 60% by weight in the mixed working fluid,
wherein the polyol ester oil is a mixed lubricating oil which is a mixture of an oil additive and a base oil, a viscosity of the oil additive is adjusted to be equivalent to a viscosity of the base oil, and the oil additive is a mixture of:

a terpene type or a terpenoid type additive and a lubricating oil, an amount of the terpene type or the terpenoid type additive is equal to or greater than 1% and less than 50% of the mixed lubricating oil, and the lubricating oil has a higher viscosity than the viscosity of the base oil, or
the terpene type or the terpenoid type additive and the lubricating oil, the amount of the terpene type or the terpenoid type additive is equal to or greater than 1% and less than 50% of the mixed lubricating oil, the lubricating oil has a super-high viscosity, and an amount of the lubricating oil is equal to or greater than the amount of the terpene type or the terpenoid type additive.
2. The compressor of claim 1,
wherein the check valve is a reed valve provided on an end plate surface of the fixed scroll.
3. The compressor of claim 2,
wherein the discharge chamber always communicates with the compression chamber via the discharge hole.
4. The compressor of claim 1,
wherein the discharge chamber always communicates with the compression chamber via the discharge hole.
5. The compressor of claim 1,
wherein the polyol ester oil has at least one type selected from the group of neopentyl glycol, trimethylolpropane, pentaerythritol, and dipentaerythritol as a constituent alcohol.
6. The compressor of claim 1,
wherein the polyol ester oil contains a phosphate ester anti-wear agent.
7. The compressor of claim 1,
wherein the polyol ester oil contains a phenolic antioxidant.
8. The compressor of claim 1, further comprising:
a motor portion which drives the revolving scroll,
wherein the motor portion uses an electrical wire which is obtained by coating a conductor with a thermosetting insulating material and baking with an insulating film therebetween, as a coil.
9. The compressor of claim 1, further comprising:
an airtight container which accommodates the compression chamber and the motor portion,
wherein the airtight container includes a power supply terminal which is installed in a mouth portion via an insulating member, a connection terminal for connecting the power supply terminal to a lead wire, and a doughnut-like insulating member which is disposed to adhere to the insulating member on the power supply terminal on an inner side of the airtight container.
10. A refrigeration cycle device comprising:
the compressor of claim 1;
a condenser which cools a refrigerant gas that is compressed by the compressor and has a high pressure;
a throttle mechanism which reduces a pressure of a high-pressure refrigerant which is liquefied by the condenser;
an evaporator which gasifies the refrigerant of which the pressure is reduced by the throttle mechanism; and
piping which links the compressor, the condenser, the throttle mechanism, and the evaporator to each other.
11. The compressor of claim 1,
wherein in the working fluid, a combination of the 1,1,2-trifluoroethylene and the difluoromethane and/or the tetrafluoroethane is 100% by weight.

12. A compressor which uses a refrigerant containing 1,1,2-trifluoroethylene as a working fluid, and uses a polyol ester oil as a compressor lubricating oil, comprising:
   a fixed scroll and a revolving scroll each having a spiral lap rising from an end plate;
   a compression chamber which is formed by engaging the fixed scroll and the revolving scroll;
   a first compression chamber which is formed on an outer wall side of the lap of the revolving scroll; and
   a second compression chamber which is formed on an inner wall side of the lap of the revolving scroll,
   wherein a suction volume of the first compression chamber is greater than a suction volume of the second compression chamber,
   wherein the working fluid is selected from the group consisting of
      a mixed working fluid comprising 1,1,2-trifluoroethylene and difluoromethane, the difluoromethane being at least 30% by weight to at most 60% by weight in the mixed working fluid,
      a mixed working fluid comprising 1,1,2-trifluoroethylene and tetrafluoroethane, the tetrafluoroethane being at least 30% by weight to at most 60% by weight in the mixed working fluid, and
      a mixed working fluid comprising 1,1,2-trifluoroethylene, difluoromethane, and tetrafluoroethane, a combination of the difluoromethane and the tetrafluoroethane being at least 30% by weight to at most 60% by weight in the mixed working fluid,
   wherein the polyol ester oil is a mixed lubricating oil which is a mixture of an oil additive and a base oil, a viscosity of the oil additive is adjusted to be equivalent to a viscosity of the base oil, the oil additive is a mixture of:
      a terpene type or a terpenoid type additive and a lubricating oil, an amount of the terpene type or the terpenoid type additive is equal to or greater than 1% and less than 50% of the mixed lubricating oil, and the lubricating oil has a higher viscosity than the viscosity of the base oil, or
      the terpene type or the terpenoid type additive and the lubricating oil, the amount of the terpene type or the terpenoid type additive is equal to or greater than 1% and less than 50% of the mixed lubricating oil, the lubricating oil has a super-high viscosity, and an amount of the lubricating oil is equal to or greater than the amount of the terpene type or the terpenoid type additive.

13. The compressor of claim 12,
wherein a discharge chamber is provided in the end plate of the fixed scroll, and the discharge chamber always communicates with the compression chamber via a discharge hole.

14. The compressor of claim 12,
wherein the polyol ester oil has at least one type selected from the group of neopentyl glycol, trimethylolpropane, pentaerythritol, and dipentaerythritol as a constituent alcohol.

15. The compressor of claim 12,
wherein the polyol ester oil contains a phosphate ester anti-wear agent.

16. The compressor of claim 12,
wherein the polyol ester oil contains a phenolic antioxidant.

17. The compressor of claim 12, further comprising:
a motor portion which drives the revolving scroll,
wherein the motor portion uses an electrical wire which is obtained by coating a conductor with a thermosetting insulating material and baking with an insulating film therebetween, as a coil.

18. The compressor of claim 12, further comprising:
an airtight container which accommodates the compression chamber and the motor portion,
wherein the airtight container includes a power supply terminal which is installed in a mouth portion via an insulating member, a connection terminal for connecting the power supply terminal to a lead wire, and a doughnut-like insulating member which is disposed to adhere to the insulating member on the power supply terminal on an inner side of the airtight container.

19. A refrigeration cycle device comprising:
the pressor of claim 12;
a condenser which cools a refrigerant gas that is compressed by the compressor and has a high pressure;
a throttle mechanism which reduces a pressure of a high-pressure refrigerant which is liquefied by the condenser;
an evaporator which gasifies the refrigerant of which the pressure is reduced by the throttle mechanism; and
piping which links the compressor, the condenser, the throttle mechanism, and the evaporator to each other.

20. The compressor of claim 12,
wherein in the working fluid, a combination of the 1,1,2-trifluoroethylene and the difluoromethane and/or the tetrafluoroethane is 100% by weight.

* * * * *